(12) United States Patent
Kristensen et al.

(10) Patent No.: US 12,372,683 B2
(45) Date of Patent: Jul. 29, 2025

(54) AUTONOMOUS OPERATIONS IN OIL AND GAS FIELDS

(71) Applicant: Schlumberger Technology Corporation, Sugar Land, TX (US)

(72) Inventors: Morten Kristensen, Lysaker (NO); Marie LeFranc, Lysaker (NO); Bertrand Theuveny, Paris (FR); Hadrien Dumont, Paris (FR); Nikita Chugunov, Arlington, MA (US); Sebastien Roche, Paris (FR); Wiwin Yuliana, Beijing (CN); Zhenning Bao, Beijing (CN); Erwan Olliero, Houston, TX (US); Ram Sunder Kalyanraman, Houston, TX (US); Thomas Pfeiffer, Sugar Land, TX (US); Claude Signer, Paris (FR); Simon Edmundson, Houston, TX (US); Hua Yu, Beijing (CN); Ke Jiang, Beijing (CN); Vassilis Varveropoulos, Sugar Land, TX (US); Henri-Pierre Valero, Paris (FR); Eric Jeanson, Houston, TX (US); Guillaume Borrel, Paris (FR); Pierre Bettinelli, Bucharest (RO); Joel Le Calvez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 625 days.

(21) Appl. No.: 17/753,486

(22) PCT Filed: Sep. 4, 2020

(86) PCT No.: PCT/US2020/049428
§ 371 (c)(1),
(2) Date: Mar. 4, 2022

(87) PCT Pub. No.: WO2021/046366
PCT Pub. Date: Mar. 11, 2021

(65) Prior Publication Data
US 2022/0243575 A1   Aug. 4, 2022

Related U.S. Application Data

(60) Provisional application No. 62/939,047, filed on Nov. 22, 2019, provisional application No. 62/925,980, (Continued)

(51) Int. Cl.
*G06F 11/30*   (2006.01)
*E21B 41/00*   (2006.01)
(Continued)

(52) U.S. Cl.
CPC .............. *G01V 20/00* (2024.01); *E21B 41/00* (2013.01); *E21B 47/005* (2020.05); *G06F 30/28* (2020.01);
(Continued)

(58) Field of Classification Search
CPC .............................. G01V 20/00; G06F 30/28
See application file for complete search history.

(56) References Cited

U.S. PATENT DOCUMENTS

| | | | |
|---|---|---|---|
| 6,012,017 A | 1/2000 | Van Bemmel et al. | |
| 6,549,854 B1 | 4/2003 | Malinverno et al. | |

(Continued)

FOREIGN PATENT DOCUMENTS

| | | |
|---|---|---|
| CN | 110045417 A | 7/2019 |
| WO | 2016134018 A2 | 8/2016 |

(Continued)

OTHER PUBLICATIONS

Substantive Exam issued in Saudi Arabia Patent Application No. 522431815 dated Nov. 21, 2023, 12 pages with English translation.
(Continued)

*Primary Examiner* — Phuong Huynh
(74) *Attorney, Agent, or Firm* — Jeffrey D. Frantz

(57) ABSTRACT

The present disclosure relates to a system that is operable to receive an execution plan and execute a control operation on one or more equipment based operations within the execution plan. The one or more operations may include a data capturing operation associated with a resource site. In one embodiment, the system may be operable to execute at least (Continued)

a first operation in response to a success variable of the data capturing operation indicating a successful execution of the data capturing operation. The first operation may include a quality control operation that is executed by comparing at least one characteristic of the captured data to an expected characteristic to generate quality state data. The quality state data may have one of an acceptable status and an undesirable status. In response to the quality state data indicating an acceptable status for the quality control operation, executing at least a second operation.

21 Claims, 12 Drawing Sheets

Related U.S. Application Data filed on Oct. 25, 2019, provisional application No. 62/895,755, filed on Sep. 4, 2019.

(51) Int. Cl.
*E21B 47/005* (2012.01)
*G01V 20/00* (2024.01)
*G06F 30/28* (2020.01)
*G06F 113/08* (2020.01)

(52) U.S. Cl.
CPC ....... *E21B 2200/20* (2020.05); *G06F 2113/08* (2020.01)

(56) References Cited

U.S. PATENT DOCUMENTS

| | | | |
|---|---|---|---|
| 10,119,387 B2 | 11/2018 | Van Kuijk et al. | |
| 10,121,261 B2 | 11/2018 | Kherroubi et al. | |
| 10,203,428 B2 | 2/2019 | Morton et al. | |
| 2009/0168595 A1 | 7/2009 | Wu et al. | |
| 2009/0182541 A1 | 7/2009 | Crick et al. | |
| 2009/0299636 A1* | 12/2009 | Carnegie | E21B 47/00 702/6 |
| 2014/0129506 A1* | 5/2014 | Al-Yami | G06N 5/048 166/250.01 |
| 2016/0245946 A1 | 8/2016 | Kalyanraman et al. | |
| 2016/0356125 A1 | 12/2016 | Bello et al. | |
| 2017/0205388 A1 | 7/2017 | Thomas | |
| 2017/0370191 A1 | 12/2017 | Fox et al. | |
| 2018/0321421 A1* | 11/2018 | Halabe | G01V 11/00 |
| 2019/0025450 A1 | 1/2019 | Teague | |
| 2019/0106982 A1 | 4/2019 | Willerth | |
| 2019/0170899 A1 | 6/2019 | Morton et al. | |
| 2020/0291772 A1 | 9/2020 | Thiruvenkatanathan | |
| 2020/0370418 A1 | 11/2020 | Fries et al. | |

FOREIGN PATENT DOCUMENTS

| | | |
|---|---|---|
| WO | 2016179766 A1 | 11/2016 |
| WO | 2018236495 A1 | 12/2018 |
| WO | 2019055565 A1 | 3/2019 |
| WO | 2020112974 A1 | 6/2020 |
| WO | 2020185918 A1 | 9/2020 |
| WO | 2021046344 A1 | 3/2021 |
| WO | 2021046356 A1 | 3/2021 |
| WO | 2021046380 A1 | 3/2021 |
| WO | 2021046385 A1 | 3/2021 |

OTHER PUBLICATIONS

Communication Pursuant to Article 94(3) EPC issued in EP Application 20781136.5 dated Feb. 15, 2023, 5 pages.
Sharma PV, Environmental and Engineering Geophysics 1997, Cambridge University Press, Chapter 2, Gravity Surveying (pp. 11-64).
Sharma PV, Environmental and Engineering Geophysics 1997, Cambridge University Press, Chapter 4, Seismic Surveys (pp. 112-189).
Shaposhnikov, P. et al., "Advanced Techniques in Integrated Cement Evaluation", presented at the SPWLA 54th Annual Logging Symposium, New Orleans, Louisiana, U.S.A. 2013, 15 pages.
Hare, J. L. et al., "The 4-D microgravity method for waterflood surveillance: A model study for the Prudhoe Bay Reservoir, Alaska", Geophysics, 1999, 64(1), 78.
Bangerth, W. et al., "An Autonomic Reservoir Framework for the Stochastic Optimization of Well Placement", Cluster Computing, Kluwer Academic Publishers, BO, 2005, 8(4), pp. 255-269.
International Search Report and Written Opinion of International Patent Application No. PCT/US2020/049397 dated Feb. 8, 2021, 16 pages.
International Preliminary Report on Patentability of International Patent Application No. PCT/US2020/049397 dated Mar. 17, 2022, 13 pages.
International Search Report and Written Opinion of International Patent Application No. PCT/US2020/049416 dated Feb. 8, 2021, 21 pages.
International Search Report and Written Opinion of International Patent Application No. PCT/US2020/049416 dated Apr. 28, 2021, 24 pages.
International Preliminary Report on Patentability of International Patent Application No. PCT/US2020/049416 dated Mar. 17, 2022, 15 pages.
International Search Report and Written Opinion of International Patent Application No. PCT/US2020/049428 dated Dec. 21, 2020, 10 pages.
International Preliminary Report on Patentability of International Patent Application No. PCT/US2020/049428 dated Mar. 17, 2022, 8 pages.
International Search Report and Written Opinion of International Patent Application No. PCT/US2020/049449 dated Nov. 18, 2020, 10 pages.
International Preliminary Report on Patentability of International Patent Application No. PCT/US2020/049449 dated Mar. 17, 2022, 8 pages.
International Search Report and Written Opinion of International Patent Application No. PCT/US2020/049454 dated Dec. 9, 2020 (10 pages).
International Preliminary Report on Patentability of International Patent Application No. PCT/US2020/049454 dated Mar. 17, 2022, 8 pages.
Invitation to pay Additional Fees of International Patent Application PCT/US2020/049416, dated Dec. 17, 2020 (28 pages).
Communication Pursuant to Article 94(3) EPC issued in EP Application 20775988.7 dated Jan. 26, 2024, 8 pages.
First Exam Report issued in Kuwait Patent Application No. KW/P/2022/000191 received Feb. 22, 2024, 5 pages.
Office Action issued in U.S. Appl. No. 17/753,489 dated Mar. 21, 2024, 38 pages.

\* cited by examiner

AUTONOMOUS OPERATIONS IN OIL AND GAS FIELDS

CROSS-REFERENCES TO RELATED APPLICATIONS

This application is a 371 application from PCT Application No. PCT/US2020/049428 filed on Sep. 4, 2020, which claims priority to and the benefit of U.S. Provisional Patent Application Ser. No. 62/895,755 filed on Sep. 4, 2019, U.S. Provisional Patent Application Ser. No. 62/925,980 filed on Oct. 25, 2019, and U.S. Provisional Patent Application Ser. No. 62/939,047 filed on Nov. 22, 2019, all of which are hereby incorporated by reference in their entireties for all purposes.

BACKGROUND

During resource explorations and exploitations such as oil or gas explorations and exploitations, significant planning is conducted to assess different considerations related to the explorations and exploitations operations, such as well integrity or considerations that affect production at the resource site. These considerations may include estimates of how much resource is available to begin with, types of equipment and systems needed for site planning, specific equipment configuration parameters that enhance optimal resource extraction, feasibility of extracting the resource given geological data of the resource site, regulatory requirements for safely exploiting the resource, etc. Data associated with the resource or installation can provide experts with information regarding some of the aforementioned considerations.

While capturing data at the resource site with sensors has its own challenges, a major problem faced during oil or gas explorations, for example, is leveraging a plurality of data points from resource site data to more accurately characterize parameters of interest associated with, for instance, a given resource (e.g., hydrocarbon in place associated with an oil or natural gas reservoir). For example, when the operations at stake include production, a difficulty faced during such exploratory planning phases is accurately scaling production operations based on resource models derived from test process executions and test sensor data captured at the resource site during the initial planning process. Of paramount importance is the accuracy of resource models as this facilitates appropriate parameterizing of production equipment at the resource site. If initial resource models and/or updates to the initial resource models are flawed, it not only leads to loss of money, but also, significantly delays production at the resource site. Other parameters of interest may be monitored at the wellsite and a flawed assessment of such parameters may lead to non-productive time and loss of money. Examples of such parameters of interest may include parameters related to well integrity of one or more wellbores.

Moreover, manual processes for acquiring model data and configuring equipment are extremely cumbersome, expensive, and error-prone. Such manual processes often lack real-time or pseudo-real-time dynamic equipment configuration based on updates to the resource model.

Additionally, it is desirable during the initial planning phase to accurately model and test multiple scenarios such as flow and buildup sequences associated with the initial planning phase related to oil or gas production. This can help determine stability parameters for optimally and safely operating site equipment.

SUMMARY

The present disclosure relates to methods, services, processing procedures, techniques, and workflows for effective modeling and optimizing processes at a resource site. According to one embodiment of this disclosure, the service includes capturing sensor data at the resource site using at least one sensor and receiving an execution plan at the resource site. The execution plan includes one or more operations associated with executing the service. Each operation comprised in the one or more operations may be associated with at least one of a failure variable and a success variable. The service further includes executing the execution plan, at least in part, at the resource site. In one embodiment, this comprises executing a control operation comprised in the one or more operations on one or more equipment. The control operation may include a data capturing operation of data associated with the resource site such that the captured data includes sensor data. In response to the success variable indicating a successful execution of the data capturing operation, executing at least a first operation that includes a quality control operation on the captured data using the service. The quality control operation may include comparing at least one characteristic associated with the captured data to an expected characteristic to generate quality state data. The quality state data may have one of an acceptable status and an undesirable status. In response to the quality state data indicating an acceptable status, executing at least a second operation.

These and other implementations may each optionally include one or more of the following features. The execution plan may include a resource model representative of the resource site that includes at least one of a parameter value and an uncertainty value of one or more parameters of the resource model. The execution plan may also include an equipment model including at least a parameterization of the one or more equipment. Furthermore, the equipment model may include a parameterization of the at least one sensor. Moreover, the one or more operations may include parameterizing the at least one sensor based on the equipment model to capture data associated with the resource site. In one embodiment, the one or more operations include updating at least one of the resource model and the equipment model in response to the quality state data indicating an undesirable status for the quality control operation.

According to one implementation, the data capturing operation includes acquiring sensor data from at least a first target location of the resource site. In addition, executing the execution plan further comprises executing an operation that acquires sensor data from at least a second target location in response to the quality state data indicating an undesirable status such that the second target location is different from the first target location.

In one embodiment, the quality control operation includes evaluating an accuracy of the captured data using one of a machine learning system or an artificial intelligence system to confirm the accuracy of the captured data based on historical data associated with the resource site. The quality control operation may be executed based on a quality control (QC) model of the execution plan. The quality control model may include at least the expected characteristic.

In some instances, the data capturing operation includes acquiring the sensor data using at least one sensor at least at a first target location of the resource site such that quality control operation includes evaluating an accuracy of one or more acquisition parameters used during the data capturing operation. The acquisition parameters may include one or more sensor parameters. Furthermore, executing the execution plan includes at least one of: updating a parameter of at least one sensor, in response to the quality state data indicating an undesirable status; and acquiring sensor data from at least a second target location in response to the quality state data indicating an undesirable status. The second target location may be different from the first target location.

In some embodiments, executing the execution plan includes at least one of: transmitting the sensor data to a remote server in response to the quality state data indicating the acceptable status, and analyzing the sensor data to generate at least one of a parameter value and an uncertainty value for one or more parameters of a resource model.

Moreover, the data capturing operation may include analyzing the acquired sensor data to generate at least one of a parameter value and an uncertainty value of one or more parameters associated with a resource model of a wellbore. Furthermore, the quality control operation may include evaluating an accuracy of the parameter value and the uncertainty value of the one or more parameters. In some cases, the method further comprises at least one of: transmitting at least one of the generated parameter value and the uncertainty value of the one or more parameters to a remote server in response to the quality state data indicating an acceptable status for the quality control operation; and updating the resource model.

According to some implementations, executing the execution plan includes capturing the sensor data using the at least one sensor in at least one target location and in response to the success variable indicating a successful capturing of the sensor data, executing the quality control operation on the sensor data. Executing the quality control operation may include comparing at least a characteristic associated with the sensor data to an expected characteristic to generate quality state data. The quality state data may indicate one of an acceptable or undesirable status for the sensor data. In response to the quality state data indicating an acceptable status for the sensor data, analyzing the sensor data to generate at least one of a parameter value and an uncertainty for one or more parameters of a resource model. In addition, in response to a success variable indicating a successful generation of the at least one of the parameter value and the uncertainty value, executing a quality control operation on the at least one of the parameter value and the uncertainty value. The quality control operation may be executed by comparing at least a characteristic derived from the generated at least one of the parameter value and the uncertainty value such that a quality state data of the quality control operation indicates an acceptable status for at least one of the parameter value and the uncertainty value.

According to one implementation, the method further includes: receiving an updated execution plan that includes an updated set of operations; and executing the updated execution plan to control the one or more equipment according to the updated set of operations. In one embodiment, the execution plan is a first execution plan and the updated execution plan is transmitted to the resource site during execution of the first execution plan.

In one embodiment, executing the execution plan includes executing a lowering operation to lower a downhole tool that includes the at least one sensor to a first location within a wellbore at the resource site. In response to a success variable of the lowering operation indicating a successful execution of the lowering operation, executing at least a third operation comprising at least one of triggering the at least one sensor and parameterizing the at least one sensor according to an equipment model comprised in the execution plan.

In some embodiments, the at least one sensor includes at least one of a an electromagnetic sensor, a resistivity sensor, an acoustic sensor, an optical sensor, a pressure sensor, an accelerometer, a magnetometer, a temperature sensor, a chemical sensor, a nuclear sensor, a pH sensor, a viscosity sensor, a density sensor, a fluorescence sensor, a volume sensor, a level sensor, a weight sensor, a torque sensor, a microseismic sensor, a seismic sensor or a flow sensor. Moreover, the one or more equipment(s) include at least one of a winch, crane, pressure-control equipment, flowhead, flow meter, flare, choke, valve, packer, perforating gun, a downhole tool and components thereof, the at least one sensor, and a processor.

The present disclosure also relates to a system for performing a service at a resource site. The service includes capturing sensor data at the resource site using at least one sensor such that the system includes one or more processors and memory storing instructions that are executable by the one or more processors to receive an execution plan and execute a control operation on one or more equipment based on one or more operations of the execution plan. The one or more operations may include a data capturing operation associated with the resource site. In addition, the execution plan may include one or more operations associated with executing the service such that each operation comprised in the one or more operations is associated with at least one of a failure variable and a success variable. Moreover, the captured data may include the sensor data. In one embodiment, the instructions are executable by the one or more processors to execute at least a first operation in response to a success variable of the data capturing operation indicating a successful execution of the data capturing operation. The first operation may include a quality control operation that is executed by comparing at least one characteristic of the captured data to an expected characteristic to generate quality state data. The quality state data may have one of an acceptable status and an undesirable status. In response to the quality state data indicating an acceptable status for the quality control operation, executing at least a second operation.

In one embodiment, the one or more equipment include at least one of a winch, crane, pressure-control equipment (PCE), flowhead, flow meter, flare, choke, valve, packer, perforating gun, a downhole tool and components thereof, the at least one sensor, and a processor.

Furthermore, the execution plan may include a resource model representative of the resource site that includes at least one of a parameter value and an uncertainty value of one or more parameters of the resource model. The resource model may also include an equipment model that includes at least a parameterization of at least one equipment at the resource site. In addition, the resource model may include a quality control model that includes the expected characteristic.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
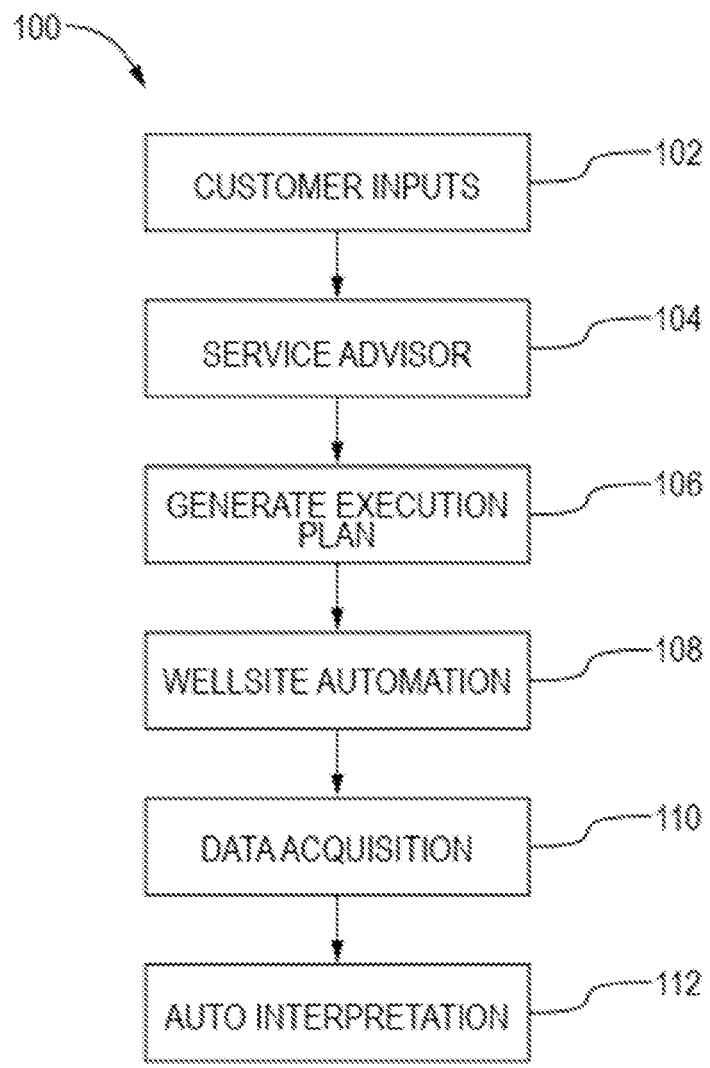
FIG. 1 shows a high-level wireline process for determining one or more answer products of a subterranean resource such as an oil or gas reservoir.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The systems, methods, processing procedures, techniques, and workflows disclosed herein are directed to effective modeling and optimizing processes at resource sites such as oil and gas fields. In some embodiments, various apparatuses and systems leverage a plurality of data associated with a given resource at a well site (such as oil or gas reservoir and/or well) to determine parameters that optimize operations. This may be accomplished using interconnected devices and systems to obtain data associated with parameters of interest and modeling the well site and/or operations based on the obtained data. In some cases, results from the modeling are automatically used to configure equipment as further discussed below. Additionally, the workflows/flowcharts described in this disclosure, according to the some embodiments, implicate a new processing approach (e.g., hardware, special purpose processors, and specially programmed general-purpose processors) because such analyses are too complex and cannot be done by a person in the time available or at all. Thus, the described systems and methods are directed to tangible implementations or solutions to specific technological problems in the oil, gas, and water well industries.

Attention is now directed to methods, techniques, infrastructure, and workflows for wellbore operations in oil and gas fields. Although various embodiments are directed to wellbore operations in a reservoir or well integrity domain, this in no way limits the context or environment where the disclosed embodiments may apply because the disclosed techniques are applicable outside the context of wireline, oil/gas wells, water wells, oil and gas reservoirs and other subterranean reservoirs. Some operations in the processing procedures, methods, techniques, and workflows disclosed herein may be combined while the order of some operations may be changed. Some embodiments include an iterative refinement of one or more resource models via feedback loops executed on an algorithmic basis, such as at a computing device, and/or through user control mechanisms that make determinations regarding whether a given action, template, or resource model is sufficiently accurate.

High-Level Process Overview

FIG. 1 shows a high-level wireline process 100 according to the disclosure. The process 100 includes obtaining customer inputs at 102, generating candidate services by a Service Advisor at 104, generating an execution plan for a selected service at 106, executing, for example autonomously, the execution plan at a resource site (e.g., wellsite, reservoir site, wellbore site, etc.) at 108, conducting data acquisition, for example autonomously using sensors disposed at the wellsite, at 110, and interpreting and/or optimizing site processes based on the acquired data, at 112. In some embodiments, generating the execution plan as discussed at 106 includes generating a LivePlan while executing the execution plan as referenced at 108 comprises executing a LivePlan. These aspects are further discussed in association with FIG. 9 where a LivePlan is clarified in greater detail. The wireline process of FIG. 1 may be executed in conjunction with one or more processes of a resource site such as processes executed at the oil field 200 of FIG. 2.

Resource Site

As previously noted, the systems and methods presently disclosed may be applicable to exploring subterranean resources such as oil, natural gas, water, and Salar brines. For the purposes of the foregoing, the systems and methods would be applied to oil exploration.

Figure 2:
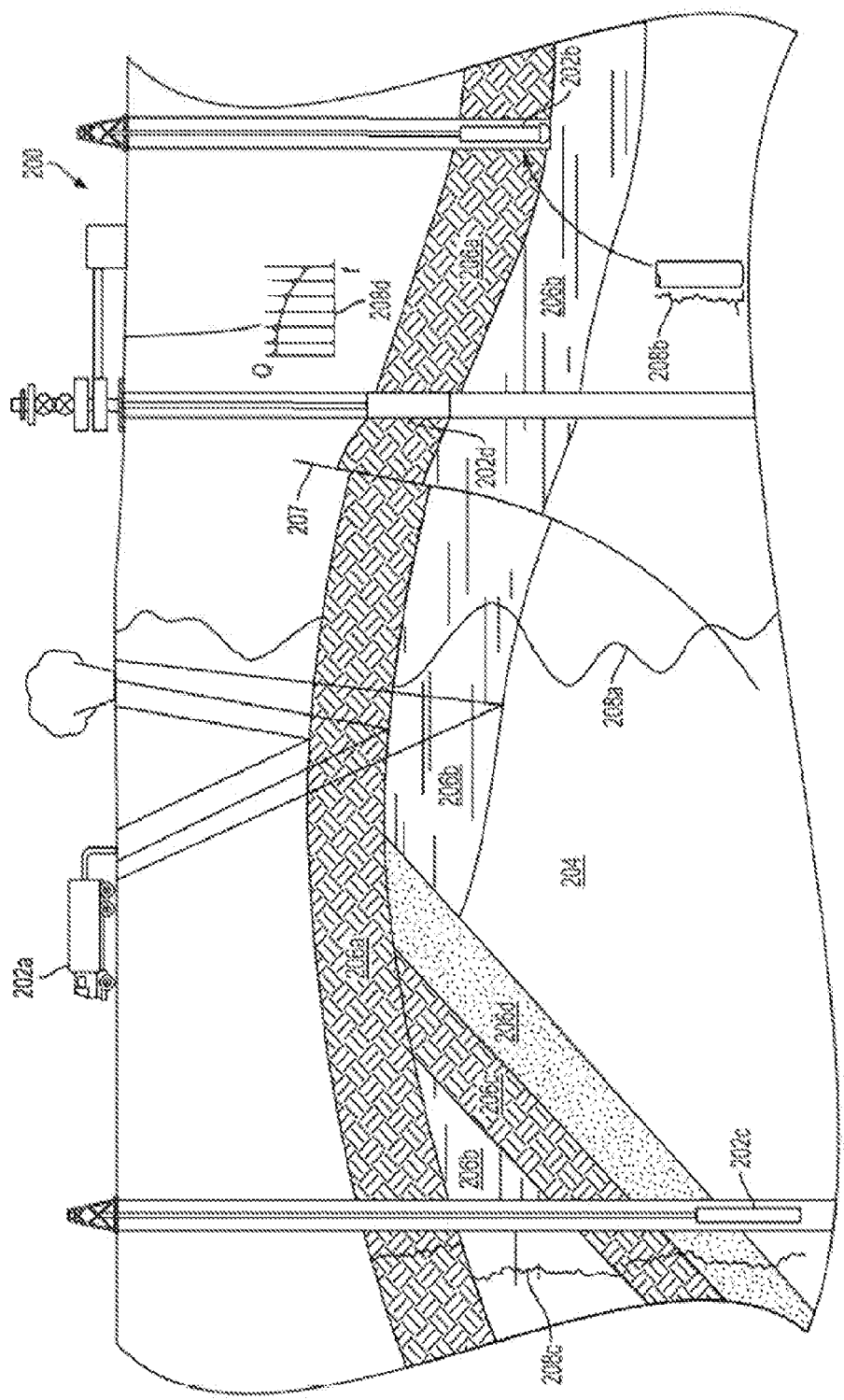
FIG. 2 shows a cross-sectional view of an oil field for which the wireline process of FIG. 1 may be implemented.

FIG. 2 shows a cross-sectional view of an oil field 200 for which the wireline process of FIG. 1 may be implemented. More specifically, FIG. 2 illustrates tools, equipment, and/or systems that may be used for oil exploration or exploitation processes at the oil field 200. Various measurement tools capable of sensing one or more parameters such as seismic two-way travel time, density, resistivity, production rate, etc., of a subterranean formation and/or geological formations of the oil field may be employed. As an example, wireline tools may be used to obtain measurement information related to attributes of a wellbore and/or reservoir including geophysical and/or geochemical information associated with the oil field 200. In some embodiments, various sensors may be located at various positions along a wellbore at the oil field 200 to monitor and collect data for executing the wireline process of FIG. 1.

Part, or all, of the oil field 200 may be on land or water. In addition, while a single oil field at a single location is depicted, the technology described herein may be utilized with any combination of one or more resource sites (e.g., multiple oil fields or multiple wellsites), one or more processing facilities, etc. As can be seen in FIG. 2, the oil field 200 may have data acquisition tools 202*a*, 202*b*, 202*c*, and 202*d* positioned at various locations within the oil field 200. The subterranean structure 204 may have a plurality of geological formations 206*a*-206*d*. As shown, this structure may have several formations or layers, including a shale layer 206*a*, a carbonate layer 206*b*, a shale layer 206*c*, and a sand layer 206*d*. A fault 207 may extend through the shale layer 206*a* and the carbonate layer 206*b*. The data acquisition tools, for example, may be adapted to take measurements and detect geophysical and/or geochemical characteristics of the various formations shown.

While a specific subterranean formation with specific geological structures is depicted, it is appreciated that the oil field 200 may contain a variety of geological structures and/or formations, sometimes having extreme complexity. In some locations of a given geological structure, for example below a water line relative to the given geological structure, fluid may occupy pore spaces of the formations. Each of the measurement devices may be used to measure properties of the formations and/or other geological features. While each data acquisition tool is shown as being in specific locations in FIG. 2, it is appreciated that one or more types of measurement may be taken at one or more locations across one or more oil fields 200 or other locations for comparison and/or analysis. The data collected from various sources at the oil field 200 may be processed and/or evaluated and/or incorporated into resource models and/or used as training data as further discussed below.

Data acquisition tool 202*a* is illustrated as a measurement truck, which may take measurements of the subsurface through sound vibrations such as, but not limited to, seismic measurements. Drilling tool 202*b* may include a downhole sensor adapted to perform logging while drilling (LWD) data collection. Wireline tool 202*c* may include a downhole sensor deployed in a wellbore or borehole. Production tool 202*d* may be deployed from a production unit or Christmas tree into a completed wellbore. Examples of parameters that may be measured include weight on bit, torque on bit, subterranean pressures (e.g., underground fluid pressure), temperatures, flow rates, compositions, rotary speed, particle count, voltages, currents, and/or other parameters of operations as further discussed below.

Sensors may be positioned about the oil field 200 to collect data relating to various oil field operations, such as sensors deployed by the data acquisition tools 202. The sensor may include any type of sensor such as a metrology sensor (e.g., temperature, humidity), an automation enabling sensor, an operational sensor (e.g., pressure sensor, $H_2S$ sensor, thermometer, depth, tension), evaluation sensors, that can be used for acquiring data regarding the formation, wellbore, formation fluid/gas, wellbore fluid, gas/oil/water comprised in the formation/wellbore fluid, or any other suitable sensor. For example, the sensors may include accelerometers, flow rate sensors, pressure transducers, electromagnetic sensors, acoustic sensors, temperature sensors, chemical agent detection sensors, nuclear sensor, and/or any additional suitable sensors. In one embodiment, the data captured by the one or sensors may be used to characterize, or otherwise generate one or more parameter values for a resource model.

Evaluation sensors may be featured in downhole tools such as tools 202*b*-202*d* and may include for instance electromagnetic, acoustic, nuclear, and optic sensors. Examples of tools including evaluation sensors that can be used in the framework of the current method include electromagnetic tools including imaging sensors such as FMI™ or QuantaGeo™ (mark of Schlumberger); induction sensors such as Rt Scanner™ (mark of Schlumberger), multifrequency dielectric dispersion sensor such as Dielectric Scanner™ (mark of Schlumberger); acoustic tools including sonic sensors, such as Sonic Scanner™ (mark of Schlumberger) or ultrasonic sensors, such as pulse-echo sensor as in UBI™ or PowerEcho™ (marks of Schlumberger) or flexural sensors PowerFlex™ (mark of Schlumberger); nuclear sensors such as Litho Scanner™ (mark of Schlumberger) or nuclear magnetic resonance sensors; fluid sampling tools including fluid analysis sensors such as InSitu Fluid Analyzer™ (mark of Schlumberger); distributed sensors including fiber optic. Such evaluation sensors may be used in particular for evaluating the formation in which the well is formed (i.e., determining petrophysical or geological properties of the formation), for verifying the integrity of the well (such as casing or cement properties) and/or analyzing the produced fluid (flow, type of fluid, etc.).

As shown, data acquisition tools 202*a*-202*d* may generate data plots or measurements 208*a*-208*d*, respectively. These data plots are depicted within the oil field 200 to demonstrate the data generated by some of the operations executed at the oil field 200.

Data plots 208*a*-208*c* are examples of static data plots that may be generated by data acquisition tools 202*a*-202*c*, respectively. However, it is herein contemplated that data plots 208*a*-208*c* may also be data plots that may be generated and updated in real time. These measurements may be analyzed to better define properties of the formation(s) and/or determine the accuracy of the measurements and/or check for and compensate for measurement errors. The plots of each of the respective measurements may be aligned and/or scaled for comparison and verification purposes. In some embodiments, base data associated with the plots may be incorporated into site planning, modeling a test reservoir of the oil field 200, modeling a test wellbore of the oil field 200, etc. The respective measurements that can be taken may be any of the above.

Other data may also be collected, such as historical data of the oil field 200 and/or sites similar to the oil field 200, user inputs, economic information associated with the oil field 200 and/or sites similar to the oil field 200, and/or other measurement data and other parameters of interest. Similar measurements may also be used to measure changes in formation aspects over time.

Figure 3:
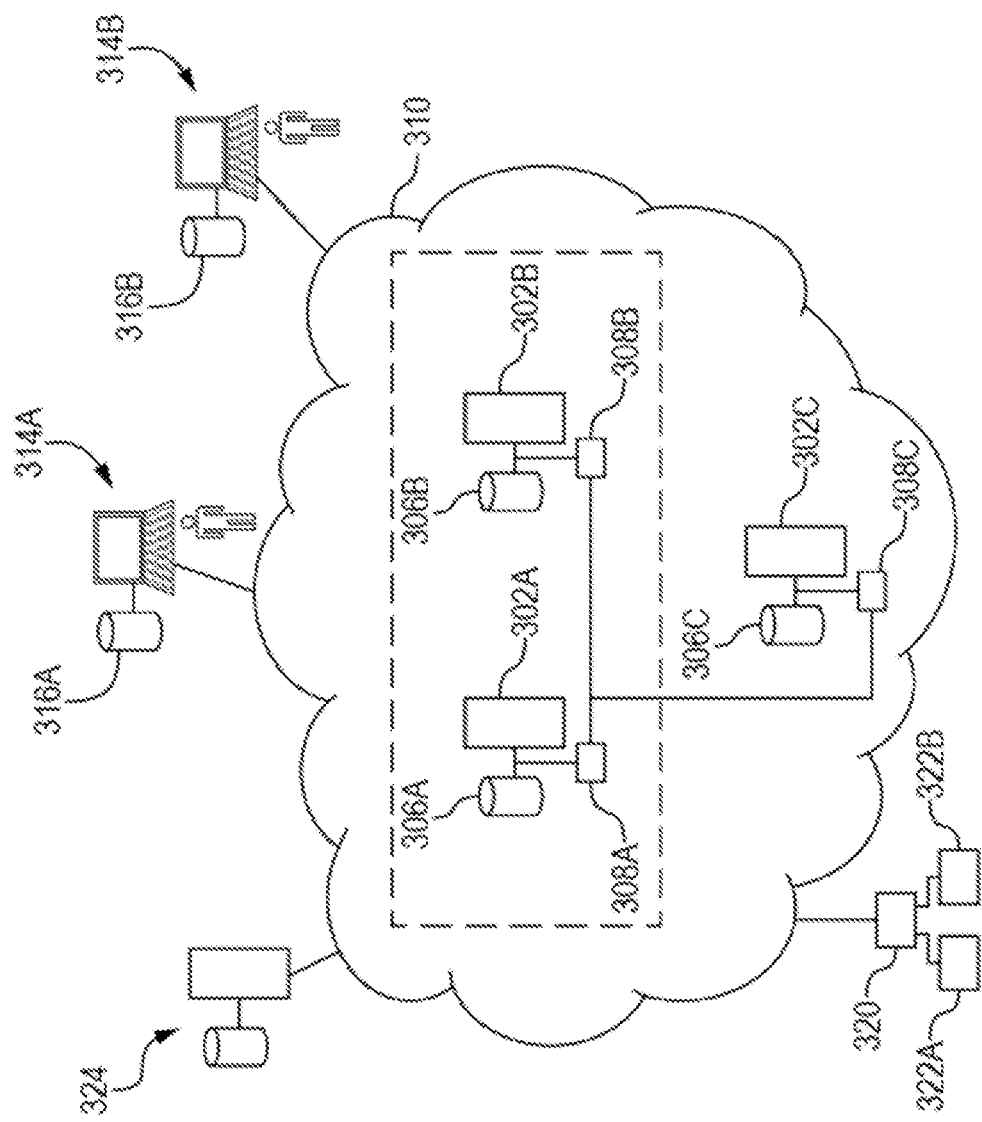
FIG. 3 shows a high-level networked system diagram illustrating a communicative coupling of devices or systems associated with the oil field of FIG. 2.

Computer facilities such as those discussed in association with FIG. 3 may be positioned at various locations about the oil field 200 (e.g., a surface unit) and/or at remote locations. A surface unit (e.g., one or more terminals 320) may be used to communicate with the onsite tools and/or offsite operations, as well as with other surface or downhole sensors. The surface unit may be capable of sending commands to the oil field equipment/systems, and receiving data therefrom. The surface unit may also collect data generated during production operations and can produce output data, which may be stored or transmitted for further processing.

The data collected by sensors may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis or for modeling purposes to optimize production processes at the oil field 200. In one embodiment, the data is stored in separate databases, or combined into a single database.

High-Level Networked System

FIG. 3 shows a high-level networked system diagram illustrating a communicative coupling of devices or systems associated with the oil field 200. The system shown in the figure may include a set of processors 302a, 302b, and 302c for executing one or more of the wireline process of FIG. 1. The set of processors 302 may be electrically coupled to one or more servers (e.g., computing systems) including memory 306a, 306b, and 306c that may store for example, program data, databases, and other forms of data. Each server of the one or more servers may also include one or more communication devices 308a, 308b, and 308c. The set of servers may provide a cloud-computing platform 310. In one embodiment, the set of servers includes different computing devices that are situated in different locations and may be scalable based on the needs and workflows associated with the oil field 200. The communication devices of each server may enable the servers to communicate with each other through a local or global network such as an Internet network. In some embodiments, the servers may be arranged as a town 312, which may provide a private or local cloud service for users. A town may be advantageous in remote locations with poor connectivity. Additionally, a town may be beneficial in scenarios with large networks where security may be of concern. A town in such large network embodiments can facilitate implementation of a private network within such large networks. The town may interface with other towns or a larger cloud network, which may also communicate over public communication links. Note that cloud-computing platform 310 may include a private network and/or portions of public networks. In some cases, a cloud-computing platform 310 may include remote storage and/or other application processing capabilities.

The system of FIG. 3 may also include one or more user terminals 314a and 314b each including at least a processor to execute programs, a memory (e.g., 316a and 316b) for storing data, a communication device and one or more user interfaces and devices that enable the user to receive, view, and transmit information. In one embodiment, the user terminals 314a and 314b is a computing system having interfaces and devices including keyboards, touchscreens, display screens, speakers, microphones, a mouse, styluses, etc. The user terminals 314 may be communicatively coupled to the one or more servers of the cloud-computing platform 310. The user terminals 314 may be client terminals or expert terminals, enabling collaboration between clients and experts through the system of FIG. 3.

The system of FIG. 3 may also include at least one or more oil fields 200 having, for example, a set of terminals 320, each including at least a processor, a memory, a communication device for communicating with other devices communicatively coupled to the cloud-computing platform 310. The oil field 200 may also have one or more sensors (e.g., one or more sensors described in association with FIG. 2) or sensor interfaces 322a and 322b communicatively coupled to the set of terminals 320 and/or directly coupled to the cloud-computing platform 310. In some embodiments, data collected by the one or more sensors/sensor interfaces 322a and 322b may be processed to generate a one or more resource models which may be displayed on a user interface associated with the set of terminals 320, and/or displayed on user interfaces associated with the set of servers of the cloud computing platform 310, and/or displayed on user interfaces of the user terminals 314. In some implementations, the one or more resource models that can simulate a reservoir and/or a wellbore, and/or an aquifer, and/or subterranean formations, and other geophysical and geochemical structures of the oil field 200. Furthermore, various equipment/devices discussed in association with the oil field 200 may also be communicatively coupled to the set of terminals 320 and or communicatively coupled directly to the cloud-computing platform 310. The equipment and sensors may also include one or more communication device(s) that may communicate with the set of terminals 320 to receive orders/instructions locally and/or remotely from the oil field 200 and also send statuses/updates to other terminals such as the user terminals 314.

The system of FIG. 3 may also include one or more client servers 324 including a processor, memory and communication device. For communication purposes, the client servers 324 may be communicatively coupled to the cloud-computing platform 310, and/or to the user terminals 314a and 314b, and/or to the set of terminals 320 at the oil field 200 and/or to sensors at the oil field, and/or to other equipment at the oil field.

A processor, as discussed with reference to the system of FIG. 3, may include a microprocessor, microcontroller, processor module or subsystem, programmable integrated circuit, programmable gate array, or another control or computing device.

The memory/storage media mentioned above can be implemented as one or more computer-readable or machine-readable storage media that are non-transitory. In some embodiments, storage media may be distributed within and/or across multiple internal and/or external enclosures of a computing system and/or additional computing systems. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that instructions can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). The storage medium or media can be located either in a computer system running the machine-readable instructions, or located at a remote site from which machine-readable instructions can be downloaded over a network for execution.

It is appreciated that the described system of FIG. 3 is an example that may have more or fewer components than shown, may combine additional components, and/or may have a different configuration or arrangement of the components. The various components shown may be implemented in hardware, software, or a combination of both, hardware and software, including one or more signal processing and/or application specific integrated circuits.

Further, the steps in the flowcharts described below may be implemented by running one or more functional modules in an information processing apparatus such as general-purpose processors or application specific chips, such as ASICs, FPGAs, PLDs, or other appropriate devices associated with the system of FIG. 3. These modules, combinations of these modules, and/or their combination with general hardware are included within the scope of protection of the disclosure. While one or more computing processors may be described as executing steps associated with one or more of the flowcharts described in this disclosure, the one or more computing device processors may be associated with the cloud-based computing platform 310 and may be located at one location or distributed across multiple locations. The one or more computing device processors (simply called processors elsewhere in the disclosure) may also be associated with other systems of FIG. 3 other than the cloud-computing platform 310.

In some embodiments, a computing system is provided that includes at least one processor, at least one memory, and one or more programs stored in the at least one memory, such that the programs comprise instructions, which when executed by the at least one processor, are configured to perform any method disclosed herein.

In some embodiments, a computer readable storage medium is provided, which has stored therein one or more programs, the one or more programs including instructions, which when executed by a processor, cause the processor to perform any method disclosed herein. In some embodiments, a computing system is provided that includes at least one processor, at least one memory, and one or more programs stored in the at least one memory for performing any method disclosed herein. In some embodiments, an information processing apparatus for use in a computing system is provided for performing any method disclosed herein.

Illustrative Environments

Examples of the different portions of the systems, workflows and methods are illustrated in the present application in the well integrity, reservoir and seismic domains but may be applied to other domains.

The context of the domains are therefore explained for clarification purposes below. The objective of well integrity is to monitor a barrier, for example, the interface between the well and the formation. The barrier generally includes a casing and cement linking the casing to the formation. However, the barrier between the formation and the well may be degraded due to corrosion of the casing or degraded quality of the cement, for instance. Therefore it is desirable in the oil and gas industry to monitor the barrier in order to make sure it is not degraded.

The operations in the reservoir domain may include the acquisition of parameter data from various tools, including sensors such as acoustic and electromagnetic sensors, caliper, etc. The objective of the reservoir or formation model is to have more information of the reservoir in one or more domains (formation geological properties such as dip, faults, rock type, etc. and formation petrophysical properties, such as porosity, permeability, reservoir properties relative to the reservoir fluids (water saturation, etc.), etc.) in order to ultimately understand reservoir performance, including quantity of oil that can be produced and how to produce it more efficiently. For example, reservoir performance may measure predicted oil/gas reserve versus actual and/or produced oil/gas reserve: a predicted reserve that is higher than actual and/or produced reserve (in terms of rate, cumulative, etc.) identifies reservoir underperformance. Indicators such as Hydrocarbon in Place (HiP), connectivity, deliverability, as well as flow assurance and processes are examples of objectives in the reservoir domain. The operations in the reservoir domain may include the acquisition of parameter data from various tools, such as sensor, probe, fluid analyzer, sampler carrier, and/or pump (e.g., water sensor, strain gauge, quartz gauge, SOI gauge, spectrometer, fluorescence sensor).

The seismic domain includes seismic, microseismic, borehole seismic, crosswell seismic, and crosswell electromagnetic acquisition surveys in order to have a first insight into the geological formation, in particular regarding its structure. Geophysical surveys have been quite successful in exploration and assessment of prospects over the past several decades but individual surveys should be designed for each specific acquisition exercise targeting a specific objective. A pre-job survey modeling may be necessary to assess that the acquisition geometry is conducive for a quality output that meets intended objectives, keeping in mind the geological, tectonics, hydrological, and depositional settings. The objective of the pre-job survey is to have a geological survey of optimal quality and reference to the seismic domain is made in particular to highlight how the methods according to the present disclosure are used to optimize the survey.

Detailed Process Workflow

Figure 4A:
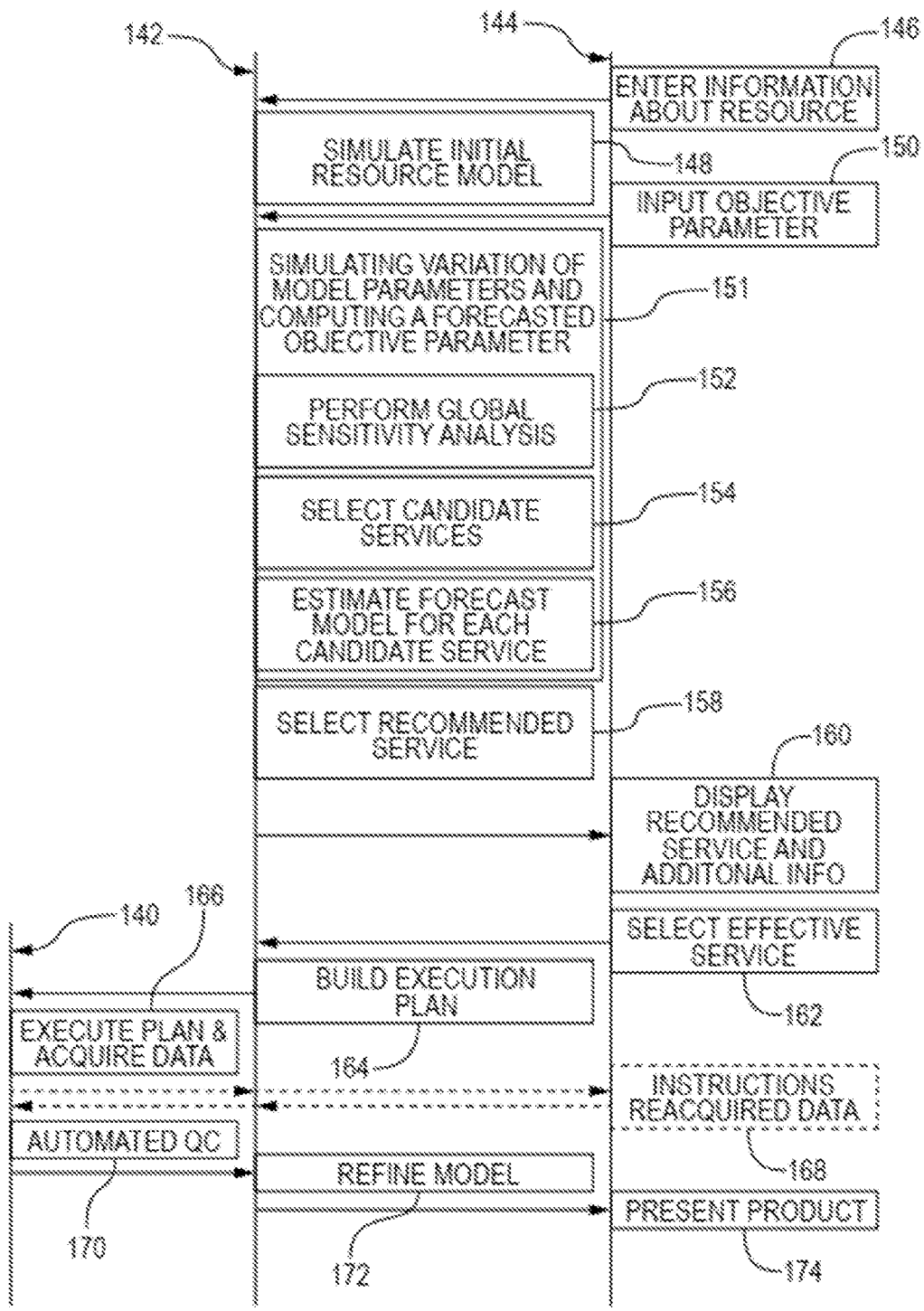
FIG. 4A illustrates an illustrative interaction of a user with the system of FIG. 3.

FIG. 4A illustrates an interaction of a user with the system of FIG. 3. As will be realized shortly, this user interaction, according to some embodiments, is based on the wireline process of FIG. 1.

As seen in the figure, Column 140 represents a location of a resource site (e.g., oil field 200). Column 142 represents services provided by the cloud-based computing platform 310 while column 144 represents a user or a customer interface.

At 146, the user/customer provides one or more inputs via a user interface. This input may include information about the resource site and may be transmitted to the cloud-based computing platform 310. In one embodiment, the input may include geophysical and/or geochemical properties of the resource site (e.g., oil field 200). The input may include data related to a reservoir or a wellbore structure, mud density, mud type, mud circulation, mud rate, data associated with oil and/or gas and/or brines or other chemical solutions in rock pore spaces of the resource site. In some instances, this data may be related to rock formation data, rock strength data, pore pressure data, drill-bit rock interaction data, directional analysis data of fluids downhole of the resource site, and downhole fluid pressure associated with a reservoir of the resource site. According to some implementations, the input may include parameters/parameter values derived from historical or real-time data associated with the resource site. As will be further discussed below, the input or inputs may be used to generate an initial resource model characterizing a wellbore and/or a reservoir at the resource site in order to initiate operations and/or simulate operations for actual operations at the resource site. In some cases, the initial resource model characterizes other properties or features of a resource site other than the reservoir and/or wellbore at the resource site. In one embodiment, the initial resource model may be simulated/tested to determine parameters (also referred to as parameter values) that enhance stability and/or safety of production operations executed at the resource site. In some embodiments, parameters determined from initial resource site operations may be used in conjunction with real-time sensor data from one or more sensors at the resource site to update the initial resource model and thereby optimize equipment performance during production at the resource site. These aspects are further discussed below.

At 148, a cloud-based processing/computing system generates the initial resource model based on the user inputs. In one embodiment, the initial resource model is a reservoir model or a wellbore model. In other embodiments, the resource model (e.g., initial resource model) includes a plurality of resource parameters or model parameters or parameter values that characterize geophysical and/or geochemical properties of a wellsite, an oil/gas reservoir, an aquifer, subterranean formations, or the like. In some cases the resource model includes one or more of a subsurface model including at least one of a wellbore and a geological formation, and an equipment model. The equipment model may include a parameterization of at least one equipment (e.g., sensor), such that one or more operations executed at the resource site includes parameterizing the at least one sensor based on the equipment model to capture data associated with the resource site. In other embodiments, the resource model is parameterized based on known information about oil or gas reservoirs, other subterranean minerals, etc., at the resource site. In some instances, each parameter value has an associated uncertainty data (e.g., an uncertainty value) as further discussed in association with step 152 of FIG. 4A. In some cases, a set of resource models may be provided such that each resource model in the set of resource models has a different set of parameter values and uncertainty values. This may be done to estimate a forecast uncertainty value for each resource model comprised in the set of resource models.

In some cases the resource model (e.g., initial resource model) may be provided by a user via a user interface which receives one or more inputs from the user. The one or more inputs may include at least one of a first parameter value and a first uncertainty value. As discussed elsewhere in this disclosure, the resource model may be generated based on data associated with the resource site. The data associated with the resource site may include previously acquired data from the resource site using one or more sensors at the resource site.

As previously discussed, the initial resource model may comprise an input provided via a graphical user interface. According to some implementations, the input may include at least one parameter value of one or more parameters comprised in the plurality of parameters of the resource model, and an uncertainty value (e.g., first uncertainty value) associated with each one of the one or more parameters. In some implementations, the resource model may be received by one or more computing device processors of the cloud-computing platform 310 by generating the resource model using data associated with the resource site. The data associated with the resource site may include previously captured data from the resource site using one or more sensors. In such instances, generating the resource model may include: receiving the previously captured data (e.g., model data) from a resource site (e.g. oil field 200) using the one or more sensors and analyzing the previously captured data to generate one or more parameter values for the resource site. In one embodiment, the data acquired from the resource site includes at least one of surface data and downhole data obtained from one or more locations within a wellbore at the resource site. The surface data may be analyzed to generate structural parameters (e.g., structural parameter values) including stratigraphic horizons and faults. In addition, the one or more parameter values may include a structural parameter value defining a rock formation at the resource site, and an intrinsic attribute of one or more locations of the rock formation. The intrinsic attribute may include at least one rock property. In some cases, the structural parameter includes data associated with at least one of a rock type, a dip, a fault, a bedding, a fracture, a surface, and horizons including location and orientation. According to some implementations, a structural model for the resource site may be generated based on the one or more parameter values and/or one or more uncertainty values of the resource model. Generating the structural model may include structuring the resource site into a plurality of zones based on the one or more parameter values such that each zone includes a homogeneous set of intrinsic parameters based on the intrinsic attribute. In some cases generating the property model includes associating each zone comprised in the plurality of zones of the resource site with at least an intrinsic parameter based on the homogeneous set of intrinsic parameters at the one or more locations of the resource site. Thus, the resource model may include on or more of a structural model and a property model.

Furthermore, the resource model, according to some implementations, includes possible services and/or actions of equipment (e.g., drills, pumps, pressure sensors, temperature sensors, etc.) at the resource site. In some instances, the resource model may be augmented with or based on one or more models from a repository of models (e.g., customer models stored in client servers 324) from prior experience, prior data associated with sites similar to the resource site, models generated by experts, models associated with specific resource exploitation equipment, public resource models (e.g., available to public), private resource models (e.g., available to users with credential access), subscription based models, etc. According to some embodiments, a set of resource models having different configurations and/or parameters associated with a given resource (e.g., reservoir)

may be simultaneously simulated to estimate or determine which resource model best approximates a given resource.

The initial resource model (e.g., a first iteration of a wellbore model or a reservoir model) may be visually structured using a grid divided into one or more zones. This grid may be provided to a user via a user interface so the user can interact with the resource model. For example, the resource model may be a reservoir model and may be characterized by parameters that can vary from one zone to another zone within a grid. In some instances, the user may vary the parameters from zone to zone using an input device communicatively coupled to and/or integrated into the user interface. In some cases, the format for visualizing the resource model and/or parameters of the resource model may vary depending on user-preferences. In some instances, the format for visualizing the resource model and/or parameters of the resource model may vary depending on a job description and/or other preferences of the user. Some embodiments may incorporate constraints into the resource model in order to obtain a more realistic result when simulations are run. For example, incorporating constraints into the resource model may include varying values of one or more parameters associated with the resource model by a threshold amount and/or varying one or more parameters within two or more neighboring zones to have values within a specified threshold using, for example, an input device (e.g., a graphical user interface, a keyboard, a mouse, or the like).

At 150, the user provides an input including a parameter of interest such as an objective parameter or an evaluation parameter. The objective parameter may be received via a user interface and communicated for processing by one or more remote computing device processors (e.g., processors of the cloud-computing platform 310). In some cases, one or more objective parameters may be simultaneously and/or independently received via the user interface and communicated for processing by the one or more remote computing device processors (e.g., processors of the cloud-computing platform 310). In some implementations, the objective parameter may be related to production operations at the resource site (e.g., oil field 200). For example, the objective parameter may represent Hydrocarbon in Place (HiP) at the resource site. In other embodiments, the objective parameter may be related to characterizations and/or other operations such as resource volume verification processes and/or safety processes and/or well integrity processes, and/or resource extraction stability processes at the resource site. In some embodiments, the objective parameter may define one or more operations at the resource site with one or more objective parameter values or objective values that quantify an optimality of said one or more operations. In some instances, the objective parameter defines one or more operations at the resource site with one or more uncertainties associated with the one or more operations. In some implementations, the objective parameter value and/or an uncertainty value of the objective parameter may be estimated based on the resource model. According to some embodiments, the objective parameter includes a function and/or an operation and/or a property to be determined at the resource site such that one or more model parameter values serve as inputs to the function or operation or property to be determined at the resource site. For example, the function or operation or property to be determined at the resource site may receive as inputs, one or more parameters (e.g., parameter values) of the resource model thereby characterizing or defining the function or operation or property to be determined at the resource site. The function or operation or property to be determined at the resource site may be used to generate one or more results associated with HiP, wellbore stability, flow capacity, wellbore dynamics, etc. In some embodiments, the objective parameter is associated with at least one of an intrinsic parameter of a subsurface formation, a structural parameter of the subsurface formation, and a parameter of a wellbore crossing the subsurface formation.

At 152, the cloud-computing platform 310 may perform a global sensitivity analysis. In one embodiment, the global sensitivity analysis includes performing one or more simulations/tests based on a plurality of different values of the plurality of parameters that characterize the resource model. For example, the one or more simulations could be performed to test the viability of a process to be executed at the resource site, and/or to test a production rate at the resource site, and/or to test safety measures to be implemented at the resource site. In any case, the simulations, according to some implementations, can facilitate pre-site (e.g., pre-well) planning processes/procedures before executing such processes and/or procedures at the resource site. In some instances, if a set of parameters associated with the resource model have certain degrees of uncertainties (e.g., uncertainty data associated with parameter values) or certain introduced measurement errors and/or manual errors, the simulations may be adapted by varying one or more values associated with the plurality of the parameters within specific ranges (e.g., range of possible values of a parameter that lead to optimum simulation results aligned with customer/client objectives). In some cases, the simulations may be performed based on the resource model.

In one embodiment, the cloud-computing platform 310 may execute one or more simulations/tests based on a plurality of scenarios or candidate services. The scenarios or candidate services may include specific equipment configurations for specific tasks executed at the resource site, specific resource model parameterizations for specific task executions at the resource site, etc. Thus, the global sensitivity analysis may involve testing and/or simulating a plurality of equipment configurations for specific tasks and/or testing specific resource model parameterizations for specific tasks or operations at the resource site.

The global sensitivity analysis may be performed so that the sensitivity of an objective parameter to one or more parameters of the resource model may be determined. In one embodiment, the global sensitivity analysis may generate a plurality of simulation results or sensitivity data based on at least a subset of a plurality of scenarios or candidate services. In such instances, the sensitivity data may indicate respective contributions of values (e.g., uncertainty values) of one or more parameter values of one or more parameters associated with the resource model to at least one value (e.g., an uncertainty value) of the objective parameter. In some cases, a first scenario of at least a subset of the plurality of scenarios is tested using one or more simulations to determine at least performance data of an available service comprised in the plurality of candidate services. The one or more simulations may include varying at least one of: a parameter value comprised in the plurality of parameter values of the resource model based on a first scenario, and an associated uncertainty value of the parameter value comprised in the plurality of parameter values of the resource model based on the first scenario. The performance data generated from such scenario tests may then be used to update at least one parameter value and/or at least one uncertainty value of the resource model. In some cases, a first parameter value may be identified such that the first parameter value has a higher level of contribution to at least one value of the objective parameter relative to a second parameter value of a second parameter that has a lower level of contribution to the at least one value of the objective parameter. A target scenario (discussed below) may be selected based on the first parameter value.

At 154, the simulation results or sensitivity data from the global sensitivity analysis 152 may be analyzed to identify and/or select one or more candidate services and/or operations and/or tasks that most closely align with the objective parameter inputted by the user at 150. In particular, the sensitivity data may be analyzed to determine one or more candidate services and/or operations and/or tasks that contribute in reducing or minimizing an uncertainty value of the objective parameter. It is appreciated that a candidate service or a recommended service, according to some implementations, includes tasks such as acquiring data from a resource site (e.g., a reservoir at oil field 200) using one or more downhole/subsurface sensors and/or surface sensors deployed at the resource site (e.g., oil field 200).

In some embodiments, sensitivity data based on a first plurality of scenarios tested or simulated may be analyzed. The sensitivity data, in this case, may indicate respective contributions of one or more parameter values of a resource model to at least one objective value and/or an uncertainty value of an objective parameter. One or more target model parameters may be identified based on analyzing the sensitivity data to generate a plurality of candidate services. In addition, one or more simulations based on one of a plurality of parameter values and/or an uncertainty value (e.g., a first uncertainty value) of the resource model may also be generated to determine performance data associated with at least one candidate service based on a second plurality of scenarios that is different from the first plurality of scenarios discussed above. The performance data may be used to update one or more values of the resource model. In addition, a third forecast uncertainty value for at least one objective parameter associated with each scenario of the second plurality of scenarios may also be generated such that a recommended service is selected based on the third forecast uncertainty value. It is appreciated that the one or more simulations described in this disclosure may account or otherwise compensate for an accuracy, a calibration, or a reliability of at least one sensor (e.g., downhole sensor and/or surface sensor) at the resource site. In one embodiment, a service comprised in the plurality of candidate services includes operations for acquiring data at the resource site using one or more sensors having a predetermined parameterization. The predetermined parameterization includes configuring one or more of a voltage, a gain, a processing time window, a sensitivity, an intensity, a signal processing filter, a frequency resolution, or a position of the one or more sensors. Furthermore, a first candidate service comprised in the plurality of candidate services may include a first operation for acquiring data in a reservoir using a first set of downhole sensors having a first parameterization at a first location of the reservoir. The first candidate service may also include a second operation for acquiring data in the reservoir using a second set of downhole sensors having a second parameterization at a second location of the reservoir.

According to some embodiments, sensitivity data may be analyzed to determine contributions of parameter values of a given resource model to at least one value (e.g., uncertainty value) of the objective parameter. The one or more parameter values (e.g., target model parameter values/target model parameters) that allow for the optimum realization of the objective parameter may also be generated or otherwise identified based on the sensitivity data. In some cases, one or more candidate services/scenarios may also be identified based on one or more target model parameters. One or more simulations may be further executed based on at least one candidate scenario comprised in a plurality of candidate scenarios. Such simulations may include varying at least one of a parameter value and/or an uncertainty value of a given resource model. In one embodiment, the at least one candidate scenario is selected based on a forecast model (see step 156 of FIG. 4A) and/or at least one uncertainty value of an objective parameter associated with the given resource model. In one embodiment, the resource model may be updated based on performance data generated from executing the one or more simulations.

Further, a first scenario/service of at least a subset of the plurality of candidate services may be tested to generate performance data for at least one candidate service comprised in a plurality of candidate services. The first scenario may be tested in at least a first simulation comprised of one or more simulations based on at least one of a first parameter value and a first uncertainty value of a resource model to generate the performance data. The resource model may be updated based on the performance data. In such cases, at least one simulation may be generated based on the plurality of scenarios for each candidate service comprised in the plurality of candidate services, each candidate service including at least one operation for acquiring data at the resource site. At least one service to be executed at the resource site may be identified based on an indicator associated with each candidate service comprised in the plurality of candidate services. The indicator may be generated based on averaging one or more forecast uncertainty values associated with the plurality of scenarios. In other embodiments, data acquired by executing at least one operation associated with each candidate service may be used to generate a second forecast uncertainty value for at least one objective parameter comprised in a set of one or more objective parameters. The second forecast uncertainty value may be used to minimize at least a second uncertainty value of at least one objective parameter comprised in the set of one or more objective parameters. In such instances, the objective parameter may be associated with one or more objective parameters such that each objective parameter of the set of one or more objective parameters is a function of one or more parameter values of a plurality of parameter values of the resource model. In addition, each objective parameter of the set of one or more objective parameters may have at least one objective value and a second uncertainty value.

In other embodiments, one or more target models may be generated based on one or more target model parameters such that at least one candidate service comprised in a plurality of candidate services may be identified based on the target model parameters. Further, one or more target model parameters may include at least one value substantially similar to an objective value of an objective parameter such that the one or more target model parameters include at least one uncertainty value that minimizes a second uncertainty value of a first objective parameter comprised in the one or more objective parameters discussed above. In addition, identifying at least one candidate service may include determining whether at least one target model parameter comprised in the one or more target model parameters includes data acquired by executing an operation at the resource site associated with the at least one candidate service. In some embodiments, a zone of interest of the resource site may be identified such that at least one service is identified based on a first forecast uncertainty value of at least one objective parameter associated with at least one scenario in the zone of interest. Identifying the zone of interest may include generating a visualization of a resource model, presenting the visualization of the resource model via a user interface and receiving a selection of at least a zone comprised in the visualization.

Of a plurality of simulations based on the resource model from 152, one or more parameters (e.g., resource parameters) associated with the resource model whose variance and/or error ranges contribute to an uncertainty value and/or an undesirable realization or execution of the objective parameter may be identified at 154 and subsequently modified to comply with or minimize the uncertainty value of the objective parameter. In some embodiments, an optimum realization or execution of the objective parameter may comprise minimizing a plurality of uncertainty values associated with the objective parameter.

At 156, one or more forecast models may be generated and tested/simulated to estimate effect data (e.g., sensitivity data) resulting from selecting and executing a given candidate service from one or more candidate services and/or target scenarios. According to some implementations, the one or more target scenarios and/or candidate services may include acquiring data at the resource site using one or more sensors to update at least one of a parameter value of a resource model, and/or update an uncertainty value associated with one or more parameter values of the resource model. In some cases, the one or more target scenarios include parameterizing one or more equipment at the resource site. In addition, the target scenario may be selected based on a forecast uncertainty value associated with the objective parameter. In one embodiment, one or more candidate services may include one or more operations including a seismic survey with a plurality of predetermined parameterization of the resource model. The seismic survey may be related to seismic data derived from captured seismic data at the resource site. Each predetermined parameterization comprised in the plurality of predetermined parameterizations may include at least one of a position of a seismic source and a position of a seismic receiver.

The one or more candidate services and/or target scenarios may be associated with one or more operations associated with executing the objective parameter. In some embodiments, estimating effect data of selecting a given candidate service may comprise: generating and ascribing updated values for one or more parameters of the resource model and associated uncertainty values due to the performance of one or more candidate services, computing updated objective values and uncertainties for the objective parameter, and ranking the candidate service based on the reduction of uncertainty value(s) of the objective parameter. According to some implementations, generation of forecast models may take into account one or more of accuracy, calibration and/or reliability of one or more sensors/equipment at oil field 200. In some embodiments, highly ranked services within the one or more candidate services may be provided to a user via a user interface for selection by the user.

At 158, one or more recommended services from the candidate services generated may be selected. According to some implementations, one or more recommended services may be selected at 158 for selection by a user such that varying degrees of approximation of the requirements of the objective parameter (in particular reduction of uncertainty of the objective parameter) is achieved. In other embodiments, an optimally recommended service may be automatically generated that best approximates the requirements of the objective parameter (e.g., a service that enables the greatest reduction of uncertainty of the objective parameter). At 160, one or more recommended services may be communicated to the user and displayed on the user's system (e.g., display device such as tablets, phones, phablets, laptops, monitors, etc.). According to some implementations, the one or more recommended services may be displayed on the user's system (e.g., display device) with additional information including one or more of an indicator of the updated uncertainty of the one or more objective parameters, the price of an effective service within the one or more recommended services, and a description of the effective service.

At 162, the user may select a recommended service (e.g., an effective service). In some cases, a user's selection of a recommended service may be communicated to the cloud-based computing platform 310.

In an alternative embodiment, the user identifies an effective service that is to be executed at the oil field 200 and does not use the Service Advisor. The operations based on the selected effective service may however still be performed. In other embodiments, the Service Advisor may identify candidate services or scenarios from which the user chooses directly (without performing operation 156) and/or does not perform a global sensitivity analysis for selecting a plurality of candidate services (operations 152, 154) but directly runs/tests that forecast models for one or more available services or scenarios.

At 164, the cloud-based computing platform 310 may generate an execution plan for the selected service or scenario and communicate the generated execution plan to the resource site and/or to the user's terminal 314 (e.g., graphical user interface associated with the user terminal 314). According to some implementations, generating the execution plan may comprise generating a digital execution plan that includes a LivePlan. This is further discussed in conjunction with the LivePlan of FIG. 9 below.

In some cases, the execution plan may be generated at a location that is remote relative to the resource site and transmitted to the resource site. Updated objective parameter values and/or acquired data from the resource site may also be transmitted from the resource site for remote processing at the remote location. According to some implementations, the execution plan includes one or more operations/tasks associated with executing the selected target service or scenario. These operations may include operations executed during the exploration, mining, and/or extracting of a resource at the resource site. In some cases, each operation is associated with a precondition variable, a success variable, and a failure variable as further discussed in this disclosure.

For example, the operations may include one or more control operations of one or more equipment and/or sensors at the resource site. In some implementations, the one or more equipment include at least a winch, a crane, a pressure-control equipment, flowhead, flow meter, flare, choke, valve, packer, perforating gun, a processor, a downhole tool, and components thereof (e.g., a trigger in a perforating gun, or a packer in a downhole tool, etc.). The one or more sensors may include at least one of an electromagnetic sensor, a resistivity sensor, an acoustic sensor, an optical sensor, a pressure sensor, an accelerometer, a magnetometer, a temperature sensor, a chemical sensor, a nuclear sensor, a pH sensor, a viscosity sensor, a density sensor, a fluorescence sensor, a volume sensor, a level sensor, a weight sensor, a torque sensor, a microseismic sensor, a seismic sensor or a flow sensor.

At 166, one or more systems and/or equipment at the resource site may execute, at least in part at the resource site, one or more operations associated with the execution plan. In one embodiment, executing the execution plan includes executing a digital execution plan such as the LivePlan discussed in FIG. 9. In some cases, data may be obtained during executing the execution plan by one or more site systems at the resource site. In some embodiments, this data may be captured by sensors or other measuring devices at the resource site in real-time as the execution plan is being implemented. In some instances, the data associated with executing the execution plan includes geophysical and/or geochemical properties associated with the resource site (formation, reservoir, casing, etc.) during or after the implementation of the execution plan. In some embodiments, sensor data measured during the implementation of the execution plan at the resource site is directly relayed in real-time and/or near real-time and/or within a reasonable amount of time (e.g., less than 24 hours, or less than 12 hours, or less than 5 hours, etc.) to the cloud-based computing/processing platform 310, which may update the initial resource model with such information, generate additional forecast models based on the updated initial resource model, revise the execution plan, and transmit the revised execution plan to the resource site and/or to the user's system during or after the implementation of the execution plan. In some embodiments, the revised execution plan may be substituted for the initial execution plan and subsequently implemented at the resource site.

In some embodiments, sensor data captured during implementation of the execution plan and/or revised execution plan at the resource site may be transmitted to the user so the user can provide updated inputs/instructions (e.g., at step 168). The updated instructions, in some embodiments, may include instructions to the cloud-computing platform 310 to update the initial resource model and re-execute steps 152-158 of FIG. 4A.

At 170, the one or more systems associated with the resource site may perform a quality control process. The one or more systems associated with the resource site (e.g., oil field 200) may be local and/or remote to the resource site. According to some embodiments, results from the quality control process including measurement data may be transmitted to the cloud-computing platform 310, which may refine or update, at 172, the resource model or revise the execution plan based on the new data as explained elsewhere in this disclosure. In some instances, the cloud-based computing platform 310 may store performance data of equipment used in implementing the execution plan and/or revised execution plan. This performance data may be used to provide models or update models of such equipment and other equipment at the resource site for future use. At 174, a product and/or service result and/or operation statistics/reports and/or resource production information/reports, etc., may be presented to the user based on the refined resource model (e.g., model generated from updating the initial resource model) and the objective parameter.

According to one implementation, one or more quality control operations may be executed on data acquired by at least one sensor deployed at a resource site (e.g., oil field 200) during the execution of one or more services associated with the resource site. In such cases, at least one parameter value of a model of the resource site may be updated based on the data acquired from the resource site to confirm an accuracy of the data acquired at the resource site. In some cases, one or more quality control operations on the acquired data may be executed at a remote location relative to the resource site and/or executed at the resource site. Further, at least one of the data acquired by at least one sensor at the resource site and an updated objective parameter value may be transmitted from the resource site to the location that is remote relative to the resource site responsive to determining from the quality control operation on the acquired data that the acquired data is valid or accurate. In one embodiment, data acquired (e.g., model data) by at least one sensor at the resource site includes model data comprising logs that are analyzed. The analyzed logs can be used to generate intrinsic attributes at one or more locations of the resource site. The analyzed logs can also be used to generate images in visualizations that may be analyzed to derive structural properties of a subsurface at one or more locations of the resource site. Further, the model data may be acquired from a plurality of wellbores at the resource site. The model data may be automatically analyzed independent of a user input. In some instances, the model data may be analyzed using one or more interpretation workflows of a set. The one or more interpretation workflows used for analyzing the model data may be selected from the set based on a property of the model data.

In other embodiments, quality control processes may also be executed on the acquired data responsive to executing an execution plan. For example, the execution plan may include a quality control model including an expected characteristic. The execution plan may further include one or more operations associated with executing a service at the resource site. The service may comprise one or more operations such that each operation comprised in the one or more operations may be associated with at least one of a failure variable and a success variable. As discussed elsewhere in this disclosure, a control operation associated with the execution plan may be executed at the resource site such that the control operation includes a data capturing operation at the resource site. The captured data may include sensor data. In response to the success variable indicating a successful execution of the data capturing operation, at least a first operation including a quality control operation on the captured data may be executed by one or more computing device processors. The quality control operation may include comparing at least one characteristic associated with the captured data to an expected characteristic and thereby generate quality state data. The quality state data may have one of an acceptable status and an undesirable status. In response to the quality state data indicating an acceptable status, at least a second operation may be executed at the resource site. Alternatively, in response to the quality state data indicating an undesirable status, a third operation may be executed at the resource site. In some cases, the quality state data may indicate an undesirable status for the quality control operation thereby leading to updating at least one of a resource model and an equipment model.

The data capturing operation may include acquiring sensor data from at least one first target location of the resource site and executing an operation that acquires sensor data from at least one second target location in response to the quality state data indicating an undesirable status. The second target location may be different from the first target location. The quality control operation may include evaluating an accuracy of the captured data using one of a machine learning system or an artificial intelligence system to confirm the accuracy of the captured data based on historical data associated with the resource site. In some embodiments, the quality control operation may be executed based on a quality control (QC) model of the execution plan including at least the expected characteristic. The quality control operation may also include evaluating an accuracy of one or more acquisition parameters used during the data capturing operation such that the acquisition parameters include one or more sensor parameters. At least one parameter of at least one sensor at the resource site may be updated in response to the quality state data indicating an undesirable status. Sensor data may be acquired from a second target location that is different form the first target location in response to the quality state data indicating an undesirable status for the quality control operation. The sensor data may be transmitted to one or more processors of a remote server (e.g., cloud platform) in response to the quality state data indicating the acceptable status for the quality control operation. The sensor data may be analyzed by the remote server to generate at least one parameter value and an uncertainty value for one or more parameters of a resource model (e.g., a resource model of a wellbore). The quality control operation may include evaluating an accuracy of at least one parameter value and an uncertainty value for one or more parameters of the resource model. The generated parameter value and/or uncertainty value may be transmitted to a remote server (e.g., cloud computing platform 310) responsive to the quality state data indicating an acceptable status for the quality control operation executed to evaluate the accuracy of the at least one parameter value and uncertainty value. The resource model may then be updated based on the transmitted parameter value and/or uncertainty value.

Furthermore, executing the execution plan may include capturing the sensor data using the at least one sensor in at least one target location. And in response to the success variable indicating a successful capturing of the sensor data, the quality control operation may be executed on the sensor data by comparing at least a characteristic associated with the sensor data to an expected characteristic to generate quality state data. The quality state data may indicate one of an acceptable or an undesirable status for the sensor data. In response to the quality state data indicating an acceptable status for the sensor data, the sensor data may be analyzed to generate at least one of a parameter value and an uncertainty for one or more parameters of a resource model. In response to a success variable indicating a successful generation of the at least one of the parameter value and the uncertainty value, a quality control operation may be executed on at least one of the parameter value and the uncertainty value by comparing at least a characteristic derived from the generated at least one of the parameter value and the uncertainty value. The quality state data of the quality control operation may indicate an acceptable status for at least one of the parameter value and the uncertainty value. In some instances, an updated execution plan including an updated set of operations may be updated at the resource site or may be received at the resource site for execution to control one or more equipment according to an updated set of operations in the updated execution plan. The updated execution plan may be transmitted to the resource site for execution during the execution of an initial execution plan. In one implementation, the execution plan includes executing a lowering operation to lower a downhole tool including the at least one sensor to a first location within a wellbore at the resource site. In response to a success variable of the lowering operation indicating a successful execution of the lowering operation, another operation comprising at least one of triggering at least one sensor and parameterizing the at least one sensor according to an equipment model comprised in the execution plan may be executed.

The processes outlined in FIG. 4A beneficially allow for error-detection and correction associated with parameters and/or constraints and/or equipment measurements and/or production processes at the resource site. For example, and as discussed elsewhere herein, uncertainty values associated with parameters and/or constraints can be quantified and/or confirmed using real-time measurements at the oil field based on initial execution plans prior to scaling production operations at the resource site. Further, machine learning and/or deep learning, and/or artificial intelligence tools can be used in the interpretation of the acquired data and/or refinement/updating of models to more accurately characterize operations and/or structures (e.g., geological formation, amount of resource, etc.) at the resource site as further discussed in conjunction with FIG. 4B. For example, simulation tools that may include machine learning or artificial intelligence may be leveraged to simultaneously run tens, hundreds, or thousands of simulations of production processes based on different model parameters to determine models and parameters that satisfy the requirements (in particular required uncertainty) of the objective parameter. Additionally, the processes of FIG. 4A may facilitate automatic and rapid execution of tasks such as drilling, logging, and other extraction and information analysis processes at the resource site.

In some cases, the processes of FIG. 4A can allow, for example, parallel execution and/or testing of models to rapidly determine stable operating parameters for specific operations at the resource site. For example, a reservoir model can be simulated in a parallel process showing concurrent flow and buildup sequences associated with a wellbore of a given reservoir such that optimum model parameters (e.g., model parameter values that improve overall production efficiency) associated with pump pressure, choke pressure, gas flow rate, and pit gain can be determined in conjunction with real-time measurements from the reservoir and/or wellbore. In some instances, simulating the reservoir model provides information such as free gas data, dissolved gas data, and data about pressure at casing shoe. In some embodiments, the information provided from simulating the reservoir model is used in conjunction with the model parameters to, for example, determine stable operating parameters for configuring production equipment of a reservoir at the resource site.

Figure 4B:
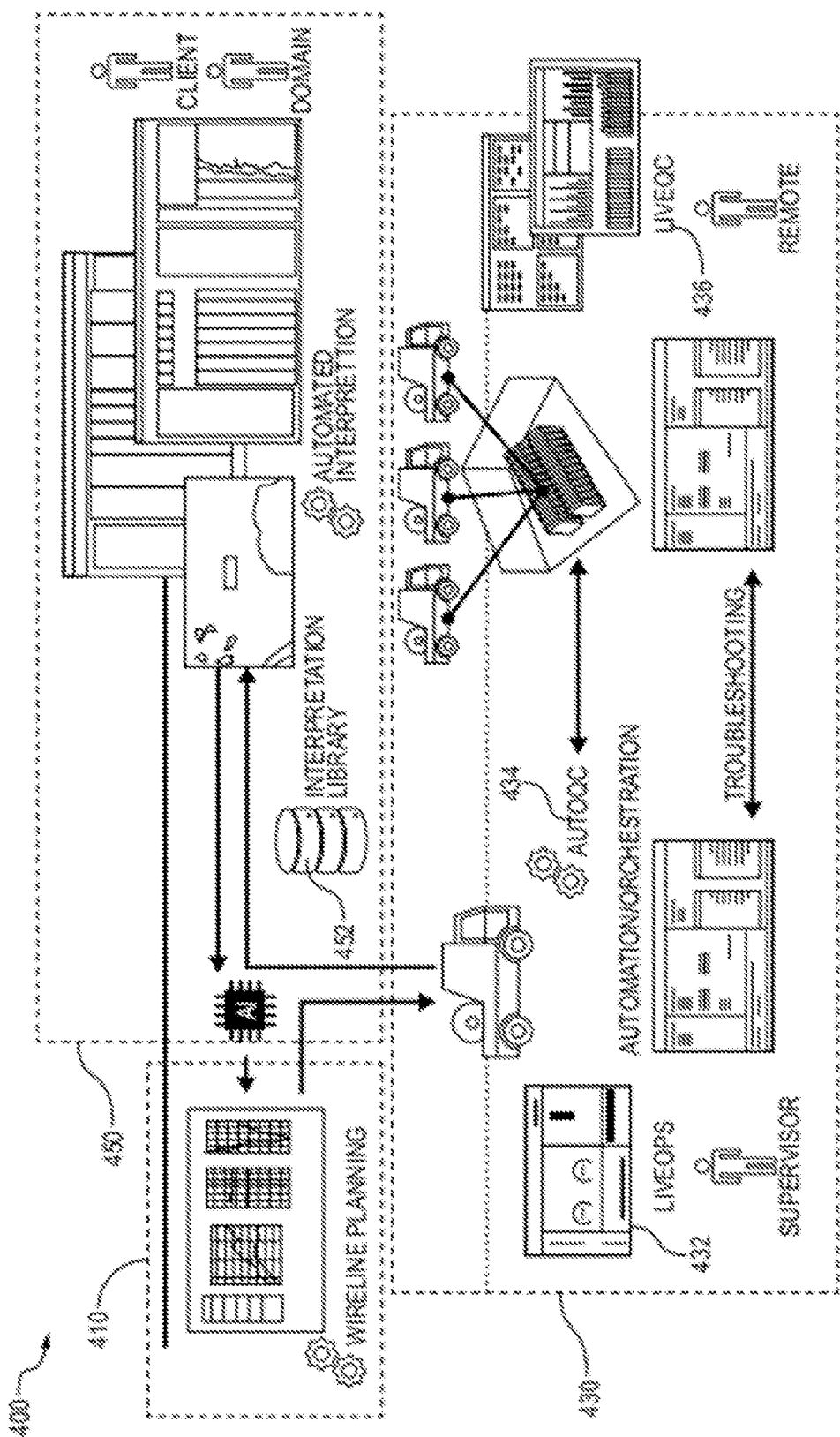
FIG. 4B provides further details and more context to the processes described above in conjunction with FIG. 4A.

FIG. 4B provides further details and more context to the processes described above in conjunction with FIG. 4A. In an embodiment, system 400 includes three main blocks, components, or modules including a planning module 410, an autonomous execution module 430, and a collaboration, validation, and learning module 450. These modules are for illustrative purposes only, as system 400 may be divided or characterized in other ways, and its modules may vary based on different domains (e.g., well integrity, reservoir, seismic), applications, and contexts. Each of the modules may be implemented by a set of processors and based on interaction with other elements of the system of FIG. 3. For instance, in the planning module 410, a set of processors can communicate with a user terminal of one or more user terminals 314 and/or with a client server 324.

Planning and Service Advisor

Planning module 410 facilitates job planning and may remain a live workspace throughout the life of an operation or a sequence of operations at the resource site. In an embodiment, planning module 410 includes a Service Advisor that allows a client (or customer) to assess the value of one or more services against the client's objectives. In some cases, use of the Service Advisor includes quickly obtaining sensitivity analysis results, evaluating impact of an operation at the resource site, and reducing uncertainty of a prediction regarding a resource and/or an operation at the resource site (in particular the client objectives). In an embodiment, the Service Advisor in planning module 410 conducts computations in a backend and provides a user interface in the frontend to a user with desired outputs, objectives (e.g., values for parameters of uncertainty, derisking elements, well producibility, deliverability, reservoir continuity, etc.), and/or other end products/services.

For example, the planning module 410 may receive and/or generate a model of a resource of interest. In some embodiments, the model may include one or more of a geological or earth model of an underground oil or gas reservoir, a model of an aquifer, a model of an underground Salar brine, a model of a well casing, and/or a model of equipment/devices that may be used in executing potential services at the resource site. In some cases, the model/resource model is a model estimated based on other models with attributes similar to those of the resource site. For example, the resource model may be estimated from a nearby wellsite and/or a geological formation similar to the geological formation of the resource site. In some instances, the resource model may be inputted into the planning module 410 by the user via a user interface. In an embodiment, a client may provide a customer model (e.g., subsurface or reservoir model stored in the memory of the client server 324) for a Service Advisor to use in derisking evaluations. In one embodiment, a resource model may be generated based on one or more inputs and may represent a current state of a resource at the resource site and may include various information such as model parameter values.

Alternatively or additionally, a client may share with the Service Advisor (via user inputs) certain contextual information about the resource site (e.g., information about a well or reservoir at the oil field 200 known to the client, such as reservoir location, wellbore location resource parameters (e.g., hole size, bit size, temperature, pressure, depth, well logs, reservoir information) or properties such as sandstone reservoir, number of zones, reservoir model sector with nearby well information, etc.). A proxy model may be built based on the information provided by the client via a user terminal through an interface or retrieved from a client server 324 and based on data that is known from other sources of information such as information about the geology of the region within which the resource site is located, seismic map of the resource site etc.

In a particular embodiment, the model is a formation/reservoir model generated by subsystem within the system of FIG. 3 (e.g., planning module 410) based on historical data obtained from the same area/field, for instance neighboring wells at a resource site. In this embodiment, data have already been acquired by tools in the same area, using one or more measurements, for example a surface measurement such as a seismic measurement or downhole measurements in the neighboring wells, such as acoustic measurements, resistivity measurements, imaging measurements, and nuclear measurements. It is appreciated that the planning module 410 may be utilized in various exploration and production operations, such as wireline, testing, and completions.

Generating the resource model may include storing data (see 530 of FIG. 5) relative to the formation/reservoir in the same area in one or more memories of the cloud servers. Such data have been uploaded when data have been acquired as part of previous operations in the same area; for instance if the former data has been acquired using the method as described above, i.e. data may be already stored in one or more repositories in memories 306a-306c when the resource model generation is requested by the user. In another embodiment, data is uploaded to one or more repositories in memories 306a-306c by the end user, i.e. the customer, for instance from a client server 324, specifically when the resource model generation for the planning of operation is requested. In another embodiment, a portion of the data used to generate the resource model may be already stored in one or more of the cloud servers and another portion is inputted by the end user.

Execution Module

Autonomous execution module 430 may conduct various activities such as data acquisition, computation, parameterization, evaluation, delivery, and contingency planning to be autonomously executed with little to no need for human intervention. For example, surface operational elements at the resource site may be automated (e.g., by live operations module 432). In an embodiment, operations such as deployment of a winch, a unit, spooling, cranes, pressure-control equipment (PCE), sensors, tool mechanics, tool firmware, etc. may be automated based on a digital execution plan. For example, downhole acquisition of sensor data may be automated such that downhole sensor data may be captured automatically, processed automatically for quality control (QC), interpreted automatically (e.g., using an interpretation library), and incorporated automatically via data transfer (DT) into a customer model (which as disclosed herein may be processed on a cloud-based computing platform 310 or an edge server) for simulation and/or decision making as explained above. Sensor data may be connected to the cloud computing platform 310, and an Internet of Things (IOT) architecture may be used to connect edge device(s) (e.g., devices at the resource site such as terminals 320) to the cloud-based platform 310 as well. Sensor data may be preprocessed, (e.g., transformed to be digestible and refined) for simulation.

In an embodiment, the autonomous execution module 430 may receive the digital execution plan generated by the Service Advisor and may execute the digital execution plan using the automated elements/systems/devices of the resource site (e.g., oil field 200). The autonomous execution module includes controllers that can trigger or activate each element (including a winch, one or more sensors, pumps, etc.) at the resource site to perform operations and workflows as outlined in the digital execution plan. The controllers of the autonomous execution module may also activate sensors for detecting preconditions, success indications, or failure indications of operations associated with the digital execution plan.

Edge intelligence associated with one or more computing devices at the resource site (e.g., one or more terminals 320) may be used where certain automated or guided data processing and task executions are conducted by a computing system at the resource site without the need to transfer data to a cloud server. The edge intelligence helps minimize the amount of data transferred to the cloud-based platform 310 and thereby reduce latency or bandwidth issues associated with communications between the resource site and the cloud-based platform 310 if necessary. This may allow the resource site, in some cases, to continue operations in the event of a network failure.

In an embodiment, the autonomous execution module 430 may receive the digital execution plan generated by the Service Advisor and may execute the digital execution plan using the automated elements/systems/devices of the resource site.

In an embodiment, instead of manually performing quality control operations, the workflow of FIG. 4B may automate the quality control operations via an AutoQC module 434 such that logging data may be acquired and processed automatically in real-time by the terminal 320 (FIG. 3) or at a user terminal 314 (FIG. 3) or in the cloud computing platform 310. In an embodiment, a LiveQC module 436 may obtain real time monitoring data being acquired at the resource site and may compare the acquired data to values within a planned job as planned in the digital execution plan. In the event of an error or a problem, an alert or flag may be generated and presented to the user (located at the resource site or remotely), and appropriate actions may be taken to resolve the error or problem, after which logging may resume or restart. Suppose, for example, a certain station was planned by planning module 410 to be pumped for a duration of 1.5 hours and until a contamination level of less than 5% is achieved. For example, the contamination level may be 100% at the time (e.g., time zero) the pumping starts. During the actual operation at the resource site, if a certain input needs to be changed to obtain the desired results (e.g., achieving a contamination level less than 5% after 1.5 hours), and if pressures, flow rates, and/or other parameters appear normal, then decisions and actions may be taken by a domain champion (e.g., data interpreter) and/or a remote operations field engineer monitoring the job and the digital execution plan may be accordingly updated in real-time or pseudo-real-time to achieve such a result. Alternatively, the domain champion or field engineer may validate the decision being taken automatically within the autonomous execution module 430.

Examples of AutoQC are given below. These examples are associated with very specific measurements but other examples related to the same or different measurements are also contemplated.

In a first example, a pulse-echo ultrasonic operation may be used to take one or more measurements in an open hole. Such measurements may be associated with: measurements of a standoff with a formation as well as properties of a formation, or measurements in a cased hole, or measurements in a casing, and/or measurements of cement properties to provide indications of well integrity. The pulse-echo measurement may be a measurement involving the use of a transducer that emits a signal towards a borehole wall such that the signal is reflected by the borehole wall and received by a receiver. Characteristics of the received signal are then analyzed and used to generate properties representative of the formation/well. Suppose, for example, that the well is logged to acquire ultrasonic waveforms from which information can be retrieved. The signal in this case may include only a portion of the received waveform such that the signal-bearing portion of the waveform needs to include all of the relevant information of the measurement. The first AutoQC example is therefore associated with waveform integrity. Indeed, in ultrasonic data acquisition, the entire waveform may not be recorded and transmitted to computing devices (e.g., terminal 320) at the resource site and/or to the cloud-based platform 310 for further processing. Only a portion of the waveform is generally recorded. Therefore, the time window during which the signal/waveform is recorded should be correctly set. However, depending on several parameters of the well (e.g., hole size, borehole fluid properties and in particular slowness, eccentricity), this time window may vary from job to job or from one location at the resource site to another location at the resource site. Such parameters may therefore be monitored as part of the autonomous acquisition and AutoQC process. In one embodiment, a default time window may be set in the digital execution plan based on well parameters that are known. The default time window may be set based on a waveform simulator that takes into account the well parameters. The AutoQC may include verifying the relevance of the time window by checking the portion of the waveform obtained in the time window against a waveform model. Similar AutoQC operations including verifying that the recorded information is relevant after a portion of the signal is captured may be provided in the digital execution plan for many sensors at the resource site. As mentioned above, if the results of the AutoQC show an unsuccessful measurement, the digital execution plan may be updated to perform the required measurement one more time at the same location, and possibly, refine or otherwise recalibrate parameters associated with the digital execution plan before performing the measurement as discussed in association with FIG. 7.

The second example of an AutoQC workflow relates to a pressure test measurement. Pressure test tools include packers and inlets that draw or sample fluid contained in a formation at a resource site. During a first drawdown phase the pressure test tools draw fluid via the inlets and then stop drawing the fluid during a buildup phase. For a given well at the resource site and at a given depth, the pressure test tool records a time series of pressure, in order to determine the formation pressure. The pressure of interest may be the pressure after a buildup phase. To obtain such pressure, it might take anywhere between about 10 to 15 minutes, or about 10 to 17 minutes, or about 10 to 20 minutes, for example. Depending on the type of formation, the outcome of a pretest operation associated with the pressure tool may not always be positive. For instance, in some cases (e.g., dry pretests), no formation fluid may enter the tool and pressure does not rise after drawdown stops. In other cases (e.g., tight pretest), little fluid enters the tool and the pressure rises very slowly after drawdown stops. When this happens, the pressure may not stabilize fast enough, thus leading to a very long wait time and thereby resulting in significant delays in some cases. The AutoQC workflow may therefore include assigning a label representative of a status of the pressure test (e.g., classifying the pressure test) based on one more extracted subsequences. If possible, a short sequence/subsequence of about 1 minute, using at least a predictive function may be tested. The predictive function may have been generated using a dataset of labelled pressure-time series. Such workflows may use machine learning or artificial intelligence to determine early in the measurement if the quality of the pressure measurements will be as expected. Embodiments of such AutoQC workflows are described in more detail in U.S. patent application Ser. No. 16/879,947, herein incorporated by reference. Such AutoQC workflows enable the determination of results, in this case stable pressure measurements, after only a short duration of the measurements during a "normal pretest" operation. As mentioned below in conjunction with FIG. 7, if the results of the AutoQC show an unsuccessful measurement, the digital execution plan may be updated to perform the measurements one more time at the same location, and/or at another location.

Those with skill in the art will appreciate that, while the term "real-time" is used herein to describe some data acquisition and systems control operations, "real-time" may also refer to near-real-time/pseudo-real-time or pre-determined or maximum response time, depending on factors related to the architecture of the systems (e.g., drilling equipment, data acquisition systems, and other onsite control systems) used at the resource site (e.g. one or more oil fields 200). In this disclosure, the use of "real time" or "real-time" may refer to actual real-time system responses, near-real-time system responses, or systems with pre-determined or maximum response times.

Interpretation and Collaboration

In an embodiment, planning module 410 and autonomous execution module 430 may interface with collaboration, validation, and learning module 450 to engage with a customer or user, for example to plan, re-plan, calibrate, re-calibrate or interpret collected results in real-time. For example, autonomous execution module 430 may automatically acquire sensor data downhole (e.g., petrophysics data, geology data, and formation testing data) and automatically process such data. Collaboration, validation, and learning module 450 may use machine learning and/or deep learning and/or AI-based models to automatically interpret and/or analyze the processed data using an interpretation library 452 and provide the interpretation in real-time. Examples of interpretation workflows have been given in association with the generation of the resource model. For instance, when the resource model is a formation model, the interpretation workflows may derive downhole petrophysical and/or geological properties based on data captured downhole and/or captured images and/or other surface measurements. Such interpretation workflows may include for instance dip picking, sedimentation analysis, etc. More generally such interpretation workflows used by the collaboration, validation, and learning module 450 may be the interpretation workflows used to generate the resource model.

Data obtained from the interpretation workflows may be quickly consumed and/or incorporated back into the resource models (e.g., a sub-surface model, a well model) as explained in association with generating the resource model. The resource model may then be updated based on the acquired data and provided for a user to assess the impacts of the acquired sensor data that is captured in real-time. In some cases, the updated resource model may be based on previously acquired data or historical data associated with the resource site. Results (e.g., in terms of impact such as sensitivity, uncertainty or certainty, etc.) from executing the collaboration, validation, and learning module 450 may be downloaded from a cloud-based platform 310 in real-time and may be presented to the user via a user interface. Therefore, system 400 may refine models in real-time and/or adapt data acquisition in real-time, according to some embodiments. A benefit of real-time adaptation of captured data is that the digital execution plan and or the acquisition program may be updated or otherwise modified (e.g., in real-time, or at an appropriate time) based on the captured data as the digital execution plan is being executed at the resource site (e.g., oil field 200). In an embodiment, actual acquired data from the resource site may be incorporated into a resource model. The resource model may be subsequently refined or otherwise updated such that uncertainty (e.g., an uncertainty value) associated with a given parameter of the resource is reduced or removed in subsequent simulations based on the refined or updated resource model. The user may assess the effects of the new data and may rely on updated resource model(s) to make quicker and more informed decisions. For instance, the user may decide in real-time to change data acquisition parameters, or configure additional data sampling points, and/or change other operational parameters such as pumping time as explained elsewhere in this disclosure.

Some interpretation workflows may be automatically performed to refine or update the resource model and the results from such updates may or may not be presented to the user.

Some interpretation workflows may be specifically requested by the user. In such cases, these interpretation workflows may be designated "products". In one embodiment, there are three levels of interpretation workflows: basic interpretation workflows, intermediate interpretation workflows, and final interpretation workflows. At least the final interpretation workflows may be designated "products". Examples of basic, intermediate and final interpretation workflows in the reservoir domain are provided below. The basic interpretation, in one embodiment, include workflows that represent parameters such as an outer diameter, a composition, a gas-to-oil ratio, a water density, a salinity, etc. These workflows may be converted in-real or in a relevant time (e.g., about 10-50 seconds, or about 15-55 seconds, or about 1-2 minutes, or about 1-5 minutes) to intermediate answer products. The intermediate interpretation workflows may represent more sophisticated parameters. There may be multiple levels of intermediate answer products. The intermediate interpretation workflows may be further converted in real-time or relevant time (e.g., about 10-50 seconds, or about 15-55 seconds, or about 1-2 minutes, or about 1-5 minutes or about 1-10 minutes) to final interpretation workflows or products which may include connectivity, zonal minimum connected HiP, etc.

Each product, may provide a user access to one or more updated parameters of a refined or updated resource model. Such access may be provided via one or more visualizations presented to the user via, for example, a user interface associated with the end user terminal 314 and may have an associated sensitivity and uncertainty analysis data. The presentation of the product may vary depending on the user. In particular, the presentation of the product to the user may depend on the job description and/or preferences of the user.

Examples of specific products that may be available to the user in the reservoir domain may include a skin model product generating a skin model characterizing a degree of connectivity between the well and the reservoir based on pressure transient data such as pressure tests. It is noted that pressure tests are described in more detail in connection with AutoQC. Such a product is described in more detail in U.S. Provisional Application No. 62/977,682. Specific reservoir products may also or alternatively include a flow capacity model product characterizing a capacity of a reservoir connected to the wellbore in which the downhole tool is installed to deliver fluids to the wellbore on the basis of pressure transient data as well as petrophysical data. Specific reservoir products may also or alternatively include a minimum hydrocarbon-in-place (HiP) model characterizing an amount of available hydrocarbons within at least a portion of the reservoir based on analyzing the petrophysical data taken with downhole sensors and pressure transient data.

Specific reservoir products may also or alternatively include a wellbore dynamics product that provides an indication regarding wellbore stability and flow patterns or migration patterns of hydrocarbons based on measurements such as hydrostatic pressure, formation fluid gas oil ratio, density, and composition associated with a sampling tool. Such a product is described in more detail in U.S. Provisional Application No. 62/950,143. Such a product provides easily understandable examples of how the digital execution plan may be updated based on the refined or updated resource model as has been already explained elsewhere in this disclosure. Indeed, results from the wellbore dynamics product may be incorporated into a formation model thereby adding migration or pressure data to the formation model with several operational parameters of the resource model. Moreover, augmenting the formation with migration data, pressure data, and other operational resource model parameters takes into account newly computed parameters of the resource model and at least one objective parameter. For instance if the objective parameter includes a flow of produced hydrocarbons, the resource model can simulated to test the operational parameters of the wellbore such as pumping or circulation parameters that maximize the produced hydrocarbons flow. The operational parameters in this case may be associated with operations like: pump more fluid, pump less fluid, circulate fluids within the wellbore at an earlier time, circulate fluids within the wellbore at a later time, etc. Optimal operational parameters comprised in the operational parameters may be transmitted to the unit that generates the digital execution plan so that the digital execution plan is updated with the optimal operational parameters.

Examples of specific products that are available to the end user in the well integrity domain may include a determination of the nature of the annular fill situated between the casing and the formation (cement, fluid, gas, etc.) based on an ultrasonic pulse-echo and flexural measurements. An embodiment of such a product is described in more detail in U.S. Provisional Application No. 62/936,666. Similarly, if the nature of the annular fill does not correspond to an expected plan, remedial actions may be automatically included in the digital execution plan or may be conditioned on validation by the user. The collaboration, validation and learning module 450 may include an example digital space for collaboration, validation, and learning during or after data acquisition. This module may present data that has been acquired and all or part of the refined or updated resource model, including updated parameters to the user. The digital space, which may be implemented as a collaboration dashboard or some other digital platform, may bring together people, expertise, software, and other processes. In some embodiments, this digital space allows people to connect to one another using different user interfaces from distant geolocations in real-time and/or near-real time. Users may also access data that has been previously provided by the collaboration, validation and learning module 450 offline. In some instances, the space may enable integration and/or displaying of data acquired at various times and from various sources. This data may have been incorporated into an initial resource model to create the refined or updated resource model thereby providing a traceable and collaborative analysis of the refined or updated resource model. This digital space, for example, may use data in combination with or in isolation from different forms of data that was previously acquired, and/or data that is being acquired in real-time. According to some implementations, the digital space may allow pre-loading of prior data from various sources such as well schematics, drilling data, logging while drilling (LWD) data, wireline logs, cementing information, and other data associated with the resource site. In one embodiment, the digital space may stream real-time data alongside prior data as an initial step towards an integrated and holistic analysis and present the consolidated streamed and prior data to the user via a user interface. The digital space may, in other embodiments, allow a time-lapse analysis of similar data. In some cases, the digital space may use a pre-defined or a customized template(s) either in the same user interface (e.g., a browser) or in different user interfaces. The digital space in some instances may allow synchronized displaying of streamed data and interactions/actions that have been performed or executed on the streamed data.

The digital space may include a collaboration space with certain points of interest or focal points (e.g., zones of interest) that help different people collaborate in arriving at certain conclusions related to the state of acquired data and/or processed data. The space may allow tagging inferences on the state of data (quality or outcome or assessment) to a complete set of data or a subset of data for a specific zone or a focal point. This allows cataloging raw data with respective processing, inference/interpretation that can be the basis of automation and machine learning.

The digital space may also include a collaboration dashboard (e.g., digital space) that may allow additional functions such as user interaction with data and validation of acquired data and results that may form the basis of a learning system. The dashboard may interrogate parameters or other values that have led to final data computations. The dashboard may highlight a specific focal point on acquired data to achieve various functions such as: flagging its state related to the nature of discussion (e.g., data quality, interpretation, inquiry), triggering a discussion on the focal point, arriving at a final collaborative conclusion on the focal point, and/or to finally resolving the focal point as validated with consensus on the focal point. The scope of a focal point may be a small section of acquired data (e.g., in depth or in time) to discuss specific and localized anomalies or points of interest. The scope may alternatively cover an entire well (e.g., on matters related to the entire well's data quality or completeness of interpretation).

The validated data may be a basis of a learning system and serve as a training database for data relative to other wells and acquired later. For instance, data related to the focal point may be stored in a structured manner.

Further, the collaborative dashboard may provide access to a final deliverable (computation) and also to raw data in order to use quality control tools on the raw data to change (e.g., manually or automatically) one or more parameters of the resource model (e.g., well or tool model) and to simulate deliverables using the raw data to update one or more parameters of the model. The collaborative dashboard may use multiple different processing techniques on the raw data and provide analysis of the results and/or provide results and/or integrate results for multiple logging tools used in a same section of a well on a same dashboard.

In some instances, collaboration, validation, and learning module 450 may work in conjunction with planning module 410 and autonomous execution module 430 to use artificial intelligence (AI) and/or machine learning, and/or deep learning processes, for example, to incorporate data back into a resource model and/or update parameters of the resource model in real-time. For example, validating a parameter and/or an updated parameter associated with a resource model may include using acquired data and/or other validated/updated parameters in a machine learning tool and or artificial intelligence tool. The autonomous system may be open to third parties such as to a client/user who may develop products/services in collaboration with a service provider/a service advisor (e.g., Service Advisor discussed herein) and may have access to resource models, sensor data, metrology data, etc. In some implementations, real-time, collaborative dashboards may be implemented on a cloud infrastructure for data monitoring and automated processing. In an embodiment, catalogs (e.g., reference resource models) may use labeled focal points stored in the interpretation library 452.

The disclosed principles may be combined with a computing system to provide an integrated and practical application to achieve autonomous operations. For instance, the disclosed systems and methods improve client/user experience. As an example, system 400 may provide access (e.g., credential access) to a client, allow the client to locate an asset or assets associated with the oil field 200, and allow the client to identify or capture client objectives such as parameters of uncertainty, derisking elements, well producibility, deliverability, reservoir continuity, etc. In some instances, the client/user may either provide or select a customer resource model or may enter certain data that allows the system 400 to build a proxy model (e.g., by importing data from a preexisting well). The system may determine the client objectives such as uncertainty values of an objective parameter, and the client may make decisions based on the determined client objectives. As another example, system 400 may grant more flexibility to a client by allowing the client to look up (e.g., within the client's own database or knowledge base or from other sources available to the client) resource models or contextual information in order to plan optimal services that meet the client's objectives. A list of options (e.g., parameters, resource models, execution plans, etc.) may be created, ranked, and made available to the client to allow the client to make real-time, informed decisions on the choice of technologies and/or services (e.g., to add, remove, or change) in order for the client's objectives to be achieved. For example, if important information about a reservoir is missing from a current well, another well may be drilled to supplement such information. Oil field operations, for example, may be changed dynamically during data acquisition. This quick response reduces or eliminates waste in time and provides ready access to resources associated with approaches where sensor data is acquired. In areas that lack any real-time monitoring or feedback, the data may be analyzed at a delayed time. With the integrated approach presented in this disclosure, sensor data may be updated (e.g., using an Evergreen model) that is regularly monitored to determine if results are as expected. Data acquisition may be changed in real-time if results are not as expected.

System 400 may provide completion design verification of a well or reservoir associated with a resource site (e.g., oil field 200). Based on a planned completion design, a user may calculate production from a well or reservoir at the resource site, and by changing some completion components (e.g., entry points, number of pump stages, pump rate, etc.), the user may improve the completion design and/or operational parameters associated with the resource site. In some embodiments of a given completion design, a user may predict the production that a well with a certain completion may deliver at a particular choke (e.g., device incorporating an orifice that is used to control fluid flow rate) configuration. According to some implementations of system 400, products (e.g., candidate services) may be proposed and delivered in real-time with the aid of the interpretation library 452 that translates the candidate services and digital execution plans into consumable data such as result plots and other interpreted forms/interpreted results and presents the consumable data (e.g., interpreted results) in real-time or pseudo-real-time via a collaboration dashboard accessible by one or more users simultaneously and/or via similar or dissimilar display devices and/or via user terminals associated with the respective users. This beneficially offers significant advantages over approaches where products/services are delivered only after advanced post-job analysis of data using other information available about the resource site (e.g., wellsite and/or oil field 200). In some instances, whereas a manual process may take days to get to a reasonably accurate result, and the turnaround time of days may be too late for customers/users to make informed decisions on the wellsite at the time of executing a service (e.g., drilling) at the resource site, the systems and methods disclosed herein decrease, in some embodiments, the wait time to make such site planning decisions in a relatively short amount of time (e.g., 2-50 minutes, 1-2 hours, 1-8 hours, 1-12 hours, etc.).

Collaboration, validation, and learning module 450 works in conjunction with planning module 410 and autonomous execution module 430 to realize functions and capabilities described herein. Collaboration, validation, and learning module 450 may use artificial intelligence (AI), for example, for incorporating data back into a resource model and updating parameters of the resource model in real time. The autonomous system may be open to third parties such as a client who may develop products in collaboration with a service provider and may have access to resource models, sensor data, metrology, etc. Real time, collaborative dashboards may be implemented on a cloud infrastructure for data monitoring and automated processing. In an embodiment, catalogs or reference models may be used to label focal points stored in interpretation library 452.

In an embodiment, from a client's perspective, system 400 allows a client to log in to the autonomous system, locate an asset or assets, identify or capture client objectives such as parameters of uncertainty, derisking elements, well producibility, deliverability, reservoir continuity, etc. The client either may provide or select a customer resource model or may enter certain data that allow the system to build a proxy model (e.g., by importing data from a preexisting well). The system may determine the client objectives from one or more objective parameters, and the client may make decisions based on the determined client objectives such as uncertainty associated with executing a particular service.

System 400 may be used in various domains relevant to the exploration of subterranean recovery of oil and gas. Well integrity and reservoir analysis are examples that have been discussed throughout the application but other systems and methods described above may be applied to other domains relying on the same type of measurements and/or models as the ones described above. A reservoir domain sometimes involves considerations that may differ from the well integrity domain. For instance, geometry-wise, a reservoir may be 3D and 2D, while well integrity may be wellbore centric. During implementation, the reservoir domain may use hardware and/or software that differ from the well domain. A reservoir may consider multiple wells (if available), or multiple reservoir properties away from a wellbore (e.g., up to hundreds of feet away). Those with skill in the art will appreciate differences and similarities between various domains while using the disclosed embodiments.

Figure 5:
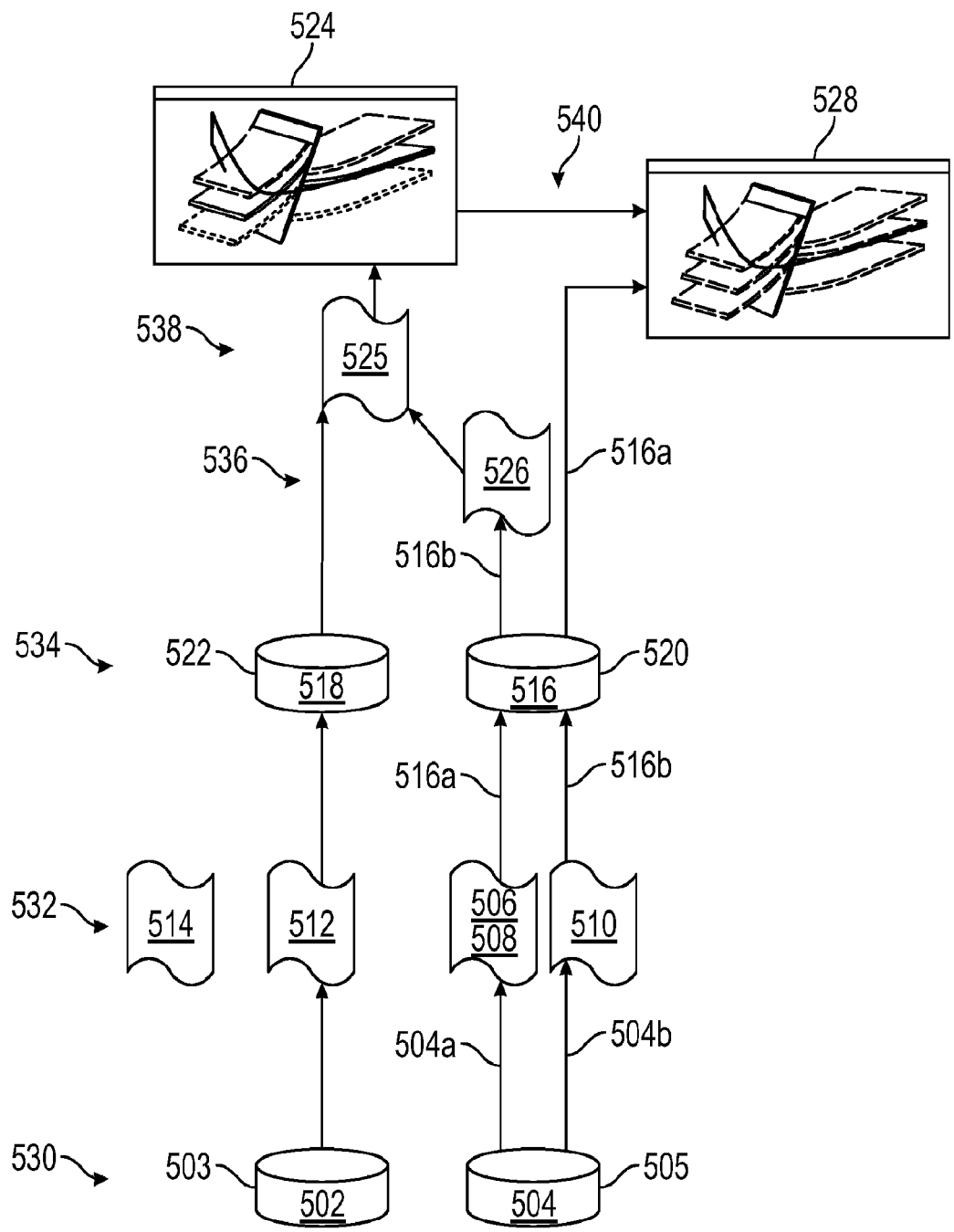
FIG. 5 illustrates a block diagram of an illustrative workflow for generating a model according to an embodiment of the disclosure.

In the example shown on FIG. 5, data representative of surface measurement (such as seismic survey) 502 may be uploaded in repository 503 and data representative of local downhole measurement 504—e.g. taken in one or more wells—may be stored in repository 505. The data representative of the local downhole measurement may include log data 504*a* (representative of a measurement in one dimension, i.e. depth) or image data 504*b* (representative of a measurement taken in two dimensions, namely depth and azimuth). However, any other storage configuration may be used to carry out the disclosures herein. The resource model may be generated based on available data and if no surface or downhole data is available the resource model may be built using with less input.

The data from 502 and 504 may be interpreted (block 532) using available interpretation workflows 506-514. The interpretation may be performed using one or more computing device processors 302*a*-302*c*. This may enable the derivation of the acquired data from one or more properties of the formation or from the wellbore. The interpretation may be performed after the user has uploaded the data. Alternatively all or part of the interpretation workflows may have been performed after the data has been acquired using the above-mentioned method and before the user's request. The interpretation may use one or more interpretation workflows to obtain, based on the downhole log data 504a, one or more logs parameters 516a representing one or more subsurface parameters along the depth of the one or more wells and/or, based on the one or more image data 504b, one or more image interpreted results 516b representative of one or more parameters (for instance, resistivity or standoff) of the one or more wells taking into account the variation according to depth and azimuth. Examples of downhole parameters that can be obtained using one or more interpretation workflows 506-508 include intrinsic (such as petrophysical) attributes/parameters 516a including gamma-ray, photoelectric effect, resistivity, density, porosity, water saturation and/or permeability. Examples of downhole parameters based on downhole image data 504b that can be obtained using one or more interpretation workflows 510 include one of more image interpreted results 516b of structural (such as geological) parameters for instance dip or faults such as fractures. Examples of seismic interpreted results 518 based on seismic data 502 that can be obtained using one or more interpretation workflows 512 include structural properties of the formation such as stratigraphic horizons and fault framework.

For clarification purposes, the structural properties of the formation may include an arrangement/configuration of rocks within the formation (layers, faults, etc.) whereas the intrinsic parameters or attributes are associated with properties of a particular rock at the resource site. Moreover, the structural properties may be analyzed before a subsurface model is generated by one or more operations discussed in this disclosure. Analyzing the structural properties may include one or more of sedimentology, interpretation and correlation of stratigraphic data, and analyzing fault tops.

A set of interpretation/analysis workflows may be available on the cloud servers, on memories 306a-306c and a subset of the interpretation workflows (here 506-512) may be selected and run on the data, based on the nature of the uploaded/acquired data 502, 504. For instance, if no image is available, the interpretation workflows relative to image interpretation will not be used to generate the resource model.

The interpretation workflows are configured to limit the interaction with the user and perform as many operations as possible in an automated way. An example from such automated interpretation for dip picking is described in more detail in U.S. patent Ser. No. 10/121,261. However, user input may be requested before generating the resource model to validate the interpretation workflow results. In another embodiment, a user input may be required before the interpretation workflow provides results.

The interpretation workflows may include physical modelling of the formation, including for instance calculations, inversion methods, etc. or may include machine-learning methods including statistical determination of properties using for instance, clustering or classification techniques based on historical data.

The interpreted results corresponding to the structural and intrinsic properties 516 (including 516a, 516b), 518 of the formation obtained using the interpretation workflow are stored in repositories 520, 522 (block 534).

The interpreted results may comprise all or part of the following: density log, gamma ray log, porosity log, etc. (Petrophysics), surfaces, fracture and dip azimuth, sedimentology, structures, etc. (Geology), formation velocity, attenuation, layering, checkshot, zero-offset vertical seismic profile, fracture images, horizons, geological structures and volumes (e.g., salt bodies, faults, karsts, etc.) (Geophysics), near wellbore sonic slowness, anisotropies (Acoustics), 3D far field sonic information and fractures, etc. Other data that can be generated at the resource model may include well construction information (e.g., well head locations, deviation surveys, casing design, hole size, etc.)

The structural parameters of a structural model may include information associated with at least one of a rock type, a dip, a fault, a bedding, a fracture, a surface, and one or more horizons such as location and orientation. Moreover, the structural model may be based on one or more model types such that the one or more model types may be selected based on historical data associated with a reservoir at the resource site. In one embodiment, a first model type comprised in the one or more model types is a 1-dimensional model type while a second model type comprised in the one or more model types is a 3-dimensional model type. The second model type may be selected responsive to determining that information associated with an interpreted horizon is available. A third model type comprising a 2-dimensional model type is also contemplated by this disclosure. Furthermore, generating at least one of a structural model and a property model may be based on well construction data such that the well construction data includes at least one of a well-head location data, a deviation survey data, a casing design data, and a hole size data.

Furthermore, an objective parameter may be generated based on one or more of the structural model and the property model such that the structural model and the property model include a plurality of parameters respectively having parameter values and uncertainty values of a resource model. The objective parameter may include at least an objective value and an uncertainty value. The objective parameter, as previously noted may be a function of at least one parameter comprised in the plurality of parameters of the resource model. At least one service to be performed at the resource site based on at least one of the structural model, the property model, and the objective parameter may be identified. The at least one service may include acquiring new data using at least one sensor deployed at the resource site. In such cases, the new data may be used to update at least one parameter value and one uncertainty value associated with at least one parameter of the structural model and/or the property model, and one or more of an objective value and an uncertainty value of the objective parameter. A visualization including the updated objective value and/or the updated uncertainty value of the objective parameter may be generated. This visualization may be displayable for viewing on a user interface. Furthermore, an execution plan based on the at least one identified service may be generated. This execution plan may include a set of operations associated with executing an identified service.

The structural model and/or the property model may be updated by interpreting the newly-acquired data to generate at least one of an additional structural parameter and an additional intrinsic attribute. At least one of the structural model and the property model may be updated based on the at least one of the additional structural parameter and the additional intrinsic attribute.

The intrinsic parameters or intrinsic attributes may include at least one of gamma ray, photoelectric effect, resistivity, dielectric effect, density, porosity, water saturation, permeability, acoustic impedance, slowness, or attenuation.

Turning to block 538 a structural model 524 may be generated using available structural properties such as the seismic interpreted results 518 and/or the downhole image interpreted results 516b. The structural model may highlight the structure of the geological formation, i.e. the spatial arrangement of rocks and includes features such as layers, faults, folds, fractures, bedding, etc. This may identify boundaries between rocks in which the rocks are considered to have homogeneous intrinsic parameters or attributes to associate a rock type to each zone.

Generating the structural model 524 (FIG. 5) may include applying (block 536) post-processing techniques 526 on the wellbore images 516b to obtain information on the structure of the geological formation/subsurface based on the local information obtained in a wellbore when borehole images are available. Such post-processing may include sedimentology interpretation as described in more details in PCT Application No. PCT/US2020/022131. In some embodiments correlation of stratigraphic and fault tops that may use a method such as the method provided in U.S. Pat. No. 6,012,017 may be used to apply the post-processing techniques when information in several wellbores are available. All available information from different sources may be combined to obtain the structural model of the formation as accurately as possible. The structural model 524 may be generated (block 538) using implicit function modelling, as described for instance in PCT application WO2020/112974. Such techniques may enable the creation of a volumetric 3D model having zones of identified rocks.

Once the structural model is obtained, a property model 528 may be generated (block 540) that relies on the structural model 524 as well as on a local intrinsic attribute or parameter 516a to infer the intrinsic parameters/attributes of the formation in each zone, and hence scale the identification of the intrinsic parameters or attributes. The location of the zone and zone type may be leveraged to generate the property model. In some cases, the property model may be generated by correlating a location of an intrinsic attribute with a location of each zone having a specific rock type. The intrinsic attribute, according to some embodiments, may include at least one of a gamma ray, a photoelectric effect, a resistivity, a dielectric effect, a density, a porosity, a water saturation, a permeability, an acoustic impedance, and a slowness or attenuation.

A resource model may characterize inputs, outputs, results, and impacts of different sensor technologies. The resource models may be used by a service provider to determine outputs according to client or user objectives such as determining, for example, whether reservoirs are connected and how the reservoirs are connected, how much uncertainty is associated with such a determination, and how to reduce or minimize such an uncertainty. Therefore, the service provider improves the client's experience by addressing issues raised in the client objectives in order not to overburden the client with detailed and complex backend information. In some embodiments, the client may have access to backend results, for instance upon request. Such backend results may be displayed to the user via a user interface or via some other medium as required by the client or user.

Based on testing or simulating a resource model simulating associated with a resource of interest (e.g., wellbore or formation) using one or more objective parameters of the resource provided by the client, the client may receive results of a global sensitivity analysis (GSA) automatically (e.g., via cloud computing on a cloud server) and view such result on, for example, a user interface of a user terminal. Sources of uncertainty that may affect the resource model include, for example, lack of information for all or a portion of the reservoir, tools capturing the measurement, errors involved in the interpretation of captured data, errors in computational methods, uncertainties (e.g., uncertainty values) due to assumptions made, and uncertainty (e.g., uncertainty values) due to the resolution of data acquired while drilling or logging. As a result, these uncertainties may propagate into forecasts or estimates made of the resource of interest based on the resource model. GSA may quantify the uncertainty of input parameters (e.g., parameter values) and provide a possible range for which a forecast lies. Sensitivity analysis may describe how the uncertainties (e.g., uncertainty values) in the output of a resource model or system (here, one or more objective parameters) can be apportioned to different sources of uncertainties (e.g., uncertainty values) in its (e.g., parameters) comprised in the resource model. In some instance, sensitivity analysis may identify the contribution of different parameters in the resource model to the uncertainty value(s) of the objective parameters. For example, the sensitivity analysis may determine a degree to which one or more uncertainty values of one or more parameters of the resource model contribute to an uncertainty value of the objective parameter.

It is appreciated that uncertainty analysis may also be conducted to assess technical contributions to resource model selections and/or selecting objective parameter values and thereby facilitate automatic decision-making through the quantification of uncertainties in one or more variables. For instance, uncertainty analysis may determine the reliability of model predictions, accounting for various sources of uncertainty in resource model input and design.

The Service Advisor may conduct sensitivity analysis relative to the objective parameters in order to determine which parameters of the resource model have the highest contribution of the uncertainty to the objective parameter. For example, global sensitivity analysis may include varying some or all parameters of the resource model across ranges of their respective uncertainties and between constraints that have been provided in the resource model (for instance, the porosity cannot exceed a certain value, due to general knowledge or parameters measured in neighboring zones). Simulations may be performed to obtain values for the objective parameter based on the different possible values for the resource model parameters. The results of the simulations can be analyzed and ranked to identify which parameters of the resource models are leading to the most significant variations in the uncertainty of the objective parameter. Through multiple simulations that may be run in parallel, the cloud-based computing platform 310 may determine which parameters have a highest level of contribution to variations of one or more objective parameter values (i.e., values of the one or more uncertainties of the objective parameters) and also determine a magnitude of such contributions. For example, if the porosity varies between minimal and maximal constrained values, sensitivity analysis may evaluate the extent to which this impacts the objective parameters.

As discussed above, simulation data may be analyzed to identify what resource model parameters are causing the highest uncertainties or what parameters have the biggest impact to changes in uncertainty values of the objective parameter. As an example, if a set of parameters has an uncertainty range from x % to y %, parallel processing may be used to simulate scenarios for the range x % to y %. Based on the results, parameters associated with a relatively high amount of uncertainty may be identified and ranked higher (compared to other parameters that cause relatively less uncertainty) as parameters for which data measurements can remove the most uncertainties. Data acquisition to stabilize such objective parameters may be identified as a priority in service planning to reduce the overall output uncertainty.

An example of global sensitivity analysis including modelling of different scenarios is detailed below.

For individual factors (e.g. model parameters) of a plurality of factors (any number of factors may be included):
   a. Conduct a single-factor sensitivity test based on the factor that has a certain range of values.
      i. Estimate a base case (50%), e.g., likely value of the factor in view of model constraint (for instance average value of possible range)
      ii. Estimate 10% and 90% extremes, e.g., possible extreme value of the factor in view of the resource model
   b. Vary the factor with others kept at base value.
   c. Calculate the objective parameters for each scenario.
Determine which factors the analysis is sensitive to relative to other factors, e.g., to which model parameters at least one of the objective parameters is particularly sensitive to, e.g., the factors that have the highest contributions in the uncertainties of the objective parameters. This might be done by variance analysis, i.e. Sobol method. More details on such determination of sensitivity index are disclosed in U.S. Pat. No. 10,203,428, herein incorporated by reference.

In some embodiments, simulating the resource model may include equipment modeling in addition to earth modeling. For example, a model of pump performance or sensor response may be included within the resource model to be simulated. The combination of modeling earth models with expected behavior of equipment provides a better estimation of the result generated after performing a certain service. The performance of the equipment on reducing the uncertainty of an objective parameter, in performing a specified service, or in measuring a sensed value may be recorded and added to a repository of models stored on, for example, the cloud computing platform 310. When the Service Advisor later performs a sensitivity analysis, it may retrieve the data within the repository of models and incorporate expected behavior of the equipment into new resource models to be simulated. The Service Advisor may leverage cloud-based storage to access and store other equipment models not previously available for simulations. In some embodiments, the equipment behavior may be relatively independent of the earth model and the repository equipment models may be reasonably accurate regardless of where they are deployed. In some embodiments, the equipment behavior is dependent on the earth model (e.g., an earth model characterizing pressure of the geological formation, fluid type of the geological formation, and a rock type associated with the geological formation) and the Service Advisor may retrieve equipment models associated with similar conditions to the earth model. Thus, the Service Advisor allows for the realization of new simulations that take into account not only the parameters of the earth model but also the modeled responses of equipment used in services to provide improved and previously unavailable results.

In some embodiments, simulations/tests of well models/ tool models/reservoir models may be conducted via cloud computing (e.g. cloud computing platform 310) and/or with machine learning and/or artificial intelligence (AI), and/or deep learning technologies. Some embodiments may provide simulation results quickly to be incorporated into a proxy model to evolve/adapt and improve the quality and accuracy of the resource models being simulated. Cloud computing and AI technologies may enable access to greater relevant contextual and/or historical data and may allow for better integration of both the Service Advisor and the client's knowledge bases. Further, information may be fed back to an end-user quickly with little to no delay in time, thus allowing quicker updates and decision making by the end-user. Furthermore, cloud computing may avoid the need for complex computation capabilities of wellsite equipment which improves processing and simulation capabilities of the overall system (e.g., thousands of simulations may be conducted and interpreted each second).

When there is less information available it is possible to simulate several resource models of the resource, such as the reservoir, each simulation being associated with a possible resource configuration. The workflows and systems disclosed hereinafter may be run in parallel on all of the resource models representing different reservoir configurations (such as with or without a fold). For example, the simulation may be containerized and cloud-based services providing processing or software as a service may be leveraged to institute multiple instances of the container. Using this approach, more simulations can be run and the results from the simulations can be obtained in a much faster timeframe as compared to other technologies. Where a simulation might have taken days using local processing, multiple simulations can be run in minutes or hours providing useful results in real time or near real time to improve decisions associated with production at the resource site.

In an embodiment, and as indicated above, a resource model (e.g., a customer model or a proxy model), when focused on a formation and/or a reservoir (e.g., seismic or reservoir domain), includes multiple parameters such as heterogeneity, reservoir elements (e.g., faults), petrophysical parameters (e.g., porosity, viscosity, permeability, water saturation (SW)), compartments, geological objects, other information, and combinations thereof).

In another embodiment, a resource model (e.g., a customer model or a proxy model), when focused on a well integrity domain, includes a well barrier model comprising information about the configuration of the well (well geometry), composition of borehole fluid and of cement, recent well operations, well deviation and state of the casing or cement if available. The objective parameter may be a state of a barrier and the initial resource model may have several barriers in several locations, each barrier having a different state, i.e. a state that meets accepted barrier criteria, a degraded state, or a failed state that does not meet the accepted barrier criteria. In the context of well integrity, an objective may be to limit uncertainties regarding the state of well barriers in one or more wellbores. For example, the objective may be to limit or minimize uncertainties with the help of barrier monitoring sensors that monitor if the barrier meets acceptance criteria and, if not, monitor the level of degradation of said well barrier. If a barrier does not meet the accepted barrier criteria, the state of such a barrier may be improved based on the performance of one or more services for repairing the barrier in question.

The Service Advisor may use objective parameters provided by the client/user as an objective in order to conduct analyses such as these. The objective parameters (e.g., objective values and or uncertainty values associated with the objective parameter) may be provided by the client via a user interface of a user terminal and thereafter sent to the cloud-based computing platform 310 for processing by one or more servers.

In some cases, an updated objective parameter value may be presented, via the user interface of the user terminal that is located at a first location that is different from a second location of the resource site (e.g., oil field 200) and from a third location having one or more computing device processors executing at least one process provided by the flowchart of FIG. 4A. As discussed elsewhere in this disclosure, the updated objective parameter value may also be provided via a collaboration dashboard accessible by one or more users from a plurality of distributed user interfaces associated with user terminals. A user may also provide an objective parameter and/or an updated objective parameter which is subsequently transmitted to one or more computing device processors of the cloud-computing platform 310. In another embodiment, a service (e.g., a candidate) may be identified by one or more processors (e.g., cloud processors) at a first location that is remote relative to the resource site. The service may be presented to the user via the user interface at a second location that is remote relative to the resource site and different from the first location such that the one or more computing device processors remain in communication with at least one or more of the user interface and an equipment at the resource site. The identified service may be executed at the resource site and/or executed in one or more simulations.

Based on the simulation and the global sensitivity analysis, the Service Advisor may identify one or more candidate services with a likelihood of reducing the uncertainty on the objective parameters, or otherwise improving, the objective parameters. The identified candidate services may be communicated to the user, for example by transmitting and displaying the candidate services via visualizations on user interfaces associated with the user terminal (e.g., display device) of the user. In some cases, such visualizations may include an indicator for a forecast uncertainty value associated with each resource model comprised in a set of resource models. The candidate services may be identified based on the knowledge of the factors having the highest contribution to the uncertainties of the objective parameters. In particular, the candidate services are the services that are mapped as reducing the uncertainty value of one or more of said factors.

In some embodiments, one or more candidate services may be identified to be executed at the resource site based on a resource model and/or an objective parameter associated with the resource model. The one or more candidate services may include using a sensor deployed at the oil field to acquire data. At least one candidate service of the one or more candidate services may be executed at the resource site to acquire data at the oil field such that the acquired data may be used to update one or more of: at least one parameter value of at least one parameter comprised in the plurality of parameters of the resource model, a first uncertainty value of the at least one parameter comprised in the plurality of parameters of the resource model, and the at least one objective value and second uncertainty value of the objective parameter. The system may then generate an execution plan based on the updates to the at least one parameter value, and/or an update to the first uncertainty value, and/or an update to the objective value, and/or an update to the second uncertainty value. A visualization may also be generated based on the updates such that the visualization includes data associated with an update to one or more of the objective parameter and the second uncertainty value. Moreover, at least one service may be provided on the user interface through a visualization. Such a visualization may include at least one of an indicator for a forecast uncertainty value, a cost associated with at least one identified service, and one or more descriptors of at least one identified service as discussed elsewhere in this disclosure.

Moreover, data may be acquired from the resource site based on a set of operations associate with a given execution plan. Such data may be analyzed to provide an updated objective value and an updated uncertainty value for an objective parameter. A visualization may be generated of the updated objected value and/or the updated uncertainty value for the objective parameter. This visualization may be presented for viewing by a user on a user interface.

In some embodiments, identifying one or more candidate services includes generating, using the one or more computing device processors, one or more simulations based on at least one of: a parameter value of at least one parameter comprised in a plurality of parameters associated with a resource model, and a first uncertainty value of at least one parameter of the resource model. The one or more simulations may be used to generate a plurality of forecast models. It is appreciated that a first forecast model comprised in the plurality of forecast models is associated with testing a first plurality of scenarios based on the one or more simulations. Further, the system may generate, using the one or more computing device processors, a forecast uncertainty value for at least one objective parameter associated with each scenario comprised in the first plurality of scenarios and determine, based on the simulations, whether executing the at least one service minimizes a second uncertainty value of an objective parameter. In one embodiment, the at least one service is a first service such that a second service that is different from the first service may be identified based on updates to at least one parameter value and/or an update to at least one uncertainty value of a resource model. An existing execution plan may then be updated to have a second set of operations derived from the second service. The existing execution plan may be updated during executing the existing execution plan. The updated execution plan may be transmitted to the execution site to be executed independently and/or concurrently with the existing execution plan. The first service may include operations comprising acquiring data from a reservoir using a set of downhole sensors configured with a first parameterization and positioned at a first location associated with the reservoir while the second service may include operations comprising acquiring data from the reservoir using the set of downhole sensors, the set of downhole sensors being configured with a second parameterization and positioned at a second location associated with the reservoir.

According to some embodiments, at least one candidate service may be identified from a plurality of candidate services by acquiring data using a sensor deployed at the resource site and determining whether the at least one candidate service minimizes a second uncertainty value of an objective parameter based on the first forecast uncertainty value associated with at least one scenario comprised in a plurality of scenarios. A visualization may then be generated such the visualization includes the identified service and is displayable for viewing on a user interface. In particular, an identified candidate service or recommended service may be presented on the user interface for selection by a user. The user may select an effective service (e.g., a candidate service) using the user interface associated with a user terminal such that the user's selection may be communicated to one or more remote processors (e.g., cloud platform) for processing.

The system may further determine sensitivity data based on at least a subset of the first plurality of scenarios. As discussed elsewhere in this disclosure, the sensitivity data may indicate respective contributions of one or more parameter values of parameters associated with the resource model to at least one value of the objective parameter. The system may identify, using the one or more computing device processors, a first parameter value having a higher level of contribution to the at least one value of the objective parameter relative to a second parameter value that has a lower level of contribution to the at least one value of the objective parameter. The identified service may then be based on this first parameter value.

For each scenario comprised in a subset of a first plurality of scenarios, at least one of: a parameter value comprised in one or more parameter values of a resource model may be varied during executing, one or more simulations, to test the subset of the first plurality of scenarios. A corresponding associated uncertainty value associated with the one or more parameter values of the resource model may be varied during executing the subset of the first plurality of scenarios. In some cases, each scenario of at least the subset of the first plurality of scenarios may be tested to determine performance data of an available service using one or more simulations. The one or more simulations may include varying at least one of: a parameter value associated with at least one parameter comprised in the plurality of parameter values of the resource model, and a first uncertainty value associated with the at least one parameter value comprised in the plurality of parameter values of the resource model based on the first scenario. Performance data may be generated based on varying the parameter value and/or the first uncertainty value. This performance data may be used to update at least one parameter value of the resource model.

According to one implementation, candidate services may include different operations associated with technologies such as sensors at the resource site that acquire data associated with a resource (e.g., reservoir in a particular downhole) at the resource site. Services may be identified by the user and/or the Service Advisor and selected as candidate services that acquire data associated with parameters of the resource model (e.g., measurement parameter) such that the identified services are determined to have a high contribution to an uncertainty value of one or more objective parameters. In some cases, the identified services are selected because they have the highest contributions to one or more uncertainty values of one or more objective parameters relative to the contributions made by uncertainty values of the one or more objective parameters based on other services that are different from the recommended services. As an example, a "high contribution" to an uncertainty value of an objective parameter may include contributions of at least XX % (e.g., about 20%-40%, or about 40%-70%, or about 60%-90%, or about 50%-99.9%, etc.) by at least one uncertainty value of the resource model to at least one uncertainty value of the one or more objective parameters based on a given recommended service.

In an embodiment, the system 400 may automatically generate/simulate a set of scenarios such that each scenario may, for example, test one or more candidate or recommended services. Optionally, each candidate service may be executed or otherwise tested/simulated using different parameterizations or different operational elements of the resource model, and/or with different values for the data (e.g., parameter data including uncertainty values). In one embodiment, each candidate service may be executed by generating a plurality of simulations for one or more scenarios in order to estimate a forecast model associated with each scenario comprised in the plurality of scenarios that has an updated parameter value and or an updated objective value. In some instances, each candidate service may be executed to generate one or more simulations that assess effects of one or more uncertainty values associated with one or more parameters of a resource model and/or uncertainty values associated with one or more objective parameters. Results from such simulations or tests may be incorporated into, or be otherwise used to update each scenario as needed. In some embodiments, each scenario comprised in the set of scenarios may include equipment models and/or operations associated with the equipment models. The equipment models and/or operations associated with the equipment models may include an expected response of an equipment associated with the equipment model to an operation, and/or property, and/or an environment associated with the candidate service. The set of scenarios may be simulated or tested using one or more simulations that account for one or more uncertainty values associated with the acquired data (e.g., data captured using sensors at the resource site).

In another embodiment, during the testing of a first scenario comprised in a subset of a first plurality of scenarios, at least one of: a parameter value comprised in a plurality of parameter values of a resource model may be varied during testing or simulating the subset of the first plurality of scenarios. In addition, a corresponding associated uncertainty value of the parameter value may be varied during executing/testing the subset of the first plurality of scenarios. Furthermore, a first scenario of at least the subset of the first plurality of scenarios may be tested to determine performance data of an available service. The one or more simulations in this case may include varying at least one of: a parameter value comprised in the plurality of parameter values based on the first scenario and varying an associated uncertainty value of the parameter value comprised in the plurality of parameter values based on the first scenario. The one or more simulations may also generate performance data based on varying the parameter value and/or the associated uncertainty value such that the performance data is used to update at least one parameter value of the resource model.

According to some embodiments, data captured at the resource site may be used to update at least one parameter value comprised in a plurality of parameter values of a resource model to generate an updated resource model in response to executing a first execution plan at the resource site. The captured data may also be used to update at least one uncertainty value associated with at least one parameter value comprised in the plurality of parameter values responsive to executing a first execution plan at the resource site to generate an updated resource model according to some implementations. In such cases, at least one simulation based on at least one of an updated parameter value and/or an updated uncertainty value may be generated based on a second plurality of scenarios. One or more of a second forecast model and a second uncertainty value of the objective parameter may then be generated. In some cases, a second execution plan based on one or more of the second plurality of scenarios, the second forecast model, and the second uncertainty value may also be generated. This second execution plan is an update of a first execution plan. The first execution plan may include a first set of operations while the second execution plan may include a second set of operations that are different from the first set of operations. In some cases, the second execution plan may be transmitted to the resource site (e.g., the oil field 200) during execution of the first execution plan, such that the second set of operations of the second execution plan are executed at the resource site subsequent to terminating execution of the first set of operations. In one embodiment, the second execution plan is executed concurrently or in conjunction with the first execution plan. In other embodiments, a forecast uncertainty value for at least one objective parameter associated with a scenario comprised in the second plurality of scenarios may be generated and used to identify at least one candidate or recommended service from a plurality of candidate or recommended services. Further, the candidate service may also be identified based on, at least one objective parameter associated with a scenario comprised in the second plurality of scenarios.

In one embodiment, one or more scenarios may be simulated/tested to determine faulty equipment calibration and/or tested to evaluate or otherwise assess a reliability of data used to generate uncertainty values and/or parameter values of a resource model. Faulty equipment calibration may include errors associated with drift calibrations while reliability of the data may be associated with influences of environmental and/or operational parameters of the resource model. In some cases, the data used to generate the uncertainty values and/or parameter values may include real-time data captured at the resource site, historical data associated with the resource site, model data derived from one or more stored models, etc. A large number (e.g., tens, hundreds, or even thousands) of simulations or tests may be conducted using a plurality of varying scenarios in the backend (e.g., within the cloud computing platform 310) so that a client/user is effectively isolated from the rigors and/or minutia associated with the large number of simulation operations. In some cases, the simulations may be fully automated based on candidate services. The simulations may also be containerized and executed in parallel, for example using a cloud-based engine or a software as a service platform of the cloud-based platform 310. In this way, significant computing power can be leveraged to conduct multiple concurrent simulations in parallel thereby significantly reducing the overall execution time for the multiple simulations. AI-based technologies and/or machine learning technologies and/or deep learning technologies may be used to improve the efficiency, effectiveness, and accuracy of simulations. The simulation may validate the radius of an investigation associated with the resource site, resolve quantification errors of resources at the resource site (e.g., oil field 200), estimate a capacity of a resource at the resource site, provide a visualization (e.g., image) of such capacity estimates, execute derisking operations at the resource site, etc. For instance, the system 400 may automatically rank scenarios based on their comparative performances over one or more objective parameters and propose an optimal technology solution to be executed at the resource site. The optimal technology solution may include operations associated with selecting and using specific sensors, executing a specific acquisition strategy, executing parameterization operations, etc.

One or more effective services may be manually or automatically selected based on one or more forecast models and/or one or more objective parameters. In one embodiment, a first uncertainty value of one or more objective parameters may be determined for each forecast model, such that one or more effective services may be selected using an indicator of the first uncertainty value. When a forecast model associated with one or more candidate services is estimated, the indicator may characterize just one uncertainty of the forecast model. When several forecast models associated with the one or more candidate services are estimated, the indicator may characterize, for instance, an average of the uncertainty values associated with the forecast models relative to the candidate service. In one embodiment, the indicator may characterize a highest uncertainty value comprised in a plurality of uncertainty values associated with the forecast models relative to the candidate services. In some embodiments, estimating one or more forecast models may be based, at least in part, on one or more of an accuracy, a calibration, and/or a reliability of a sensor at the resource site (e.g., oil field 200). In some cases, estimating the forecast models may be based, in part, on an uncertainty value of one or more updated parameters of the resource model.

In an embodiment, an effective service may be selected directly by the cloud computing platform 310 based on, for example, the indicator of uncertainty discussed above. In another embodiment, one or more candidate services may be displayed to a user on a user interface of the terminal 314. The one or more candidate services may be displayed with additional information such as the above-mentioned indicator, the costs associated with the service, and/or with other characteristics and/or with other descriptors of the service. When several resource models representing several configurations are selected to represent a resource, additional information such as the indicator of uncertainty of one or more objective parameters for other resource configurations may also be provided and/or displayed on the user interface as additional information. The user may therefore select one or more candidate services based on the displayed information.

For a given set of objectives (or objective parameters), and a given set of pre-populated information (e.g., initial resource model), the Service Advisor may predict or otherwise estimate an amount of uncertainty that each parameter of the resource model contributes to the objective parameter. A user/customer may then design/select acquisition services (e.g., such as formation testing) to reduce such uncertainties (e.g., uncertainty value) based on the operations described above.

As an example in the reservoir domain, suppose a customer's objective is to determine Hydrocarbon in Place (HiP) for a given resource site (e.g., oil field 200) based on available information about the resource site. The HiP may be calculated to have a capacity of about 100,000 barrels but with an uncertainty of 20%. However, various parameters which may have been used to calculate this capacity may also have associated uncertainties (e.g., uncertainty values). Suppose the uncertainty value for a first parameter (e.g., permeability) is 70%, and suppose that simulations of a resource model (e.g., a reservoir model) associated with the resource site indicate that reducing the uncertainty value of the first parameter to 5% can reduce the uncertainty value of the HiP by 10%. The uncertainty of the first parameter may be identified by the Service Advisor as being the highest or as being the most significant amongst a plurality of resource model parameters that have substantially less uncertainty values relative to the uncertainty value of the first parameter. In this case, the customer/user may select an initial digital execution plan (e.g., a digital execution plan that includes formation testing operations) that includes measuring an actual value for the first parameter to reduce the uncertainty value of the first parameter from 70% to a value much lower (e.g., 5%) and thus significantly minimize the uncertainty of the objective parameter to fulfil an objective of the customer.

Other objective parameters may also be selected and their uncertainty values minimized as needed.

As mentioned above in association with FIG. 4A, the Service Advisor may execute a first simulation operation (e.g., Global Sensitivity Analysis), to identify candidate services and then execute a second operation that estimates a forecast model by simulating or testing one or more scenarios associated with the candidate services. This may be done to identify which service(s) among the candidate services will enable a user to have the highest positive impact associated with executing operations of the objective parameter. The first simulation operation and the second operation may not always be performed in combination. The Service Advisor may, in an alternative embodiment, perform the first operation without performing the second operation. For instance, the Service Advisor may perform a global sensitivity analysis to determine candidate services that will have an impact on the objective parameter. The recommended services may then be provided as candidate services so that a user can select one or more candidate services based on the user's own objectives without the candidate services being ranked. Alternatively, the Service Advisor may execute only the second operation without the first operation. For example, the Service Advisor may execute simulations for each available service without initially providing any recommended or candidate services to the user. Such operations may necessitate more time and/or computing power to compute the ranked services for the user's selection.

In an alternative embodiment, the user or the Service Advisor may identify an effective service to be performed at the resource site without using the Service Advisor. Once the effective service is selected, a digital execution plan (simply called execution plan elsewhere in this disclosure) may be built/generated and may comprise a comprehensive plan of operations and/or tasks associated with successfully executing the selected effective service at the resource site. In one embodiment, the execution plan comprises one or more tasks executed to complete a selected service. The digital execution plan may be built or developed or generated or created on one or more servers associated with the cloud-computing platform 310 with an effective service selection being made by a user input. In some embodiments, the digital execution plan may be transmitted using a wired and/or a wireless communication link to the resource site.

Figure 6A:
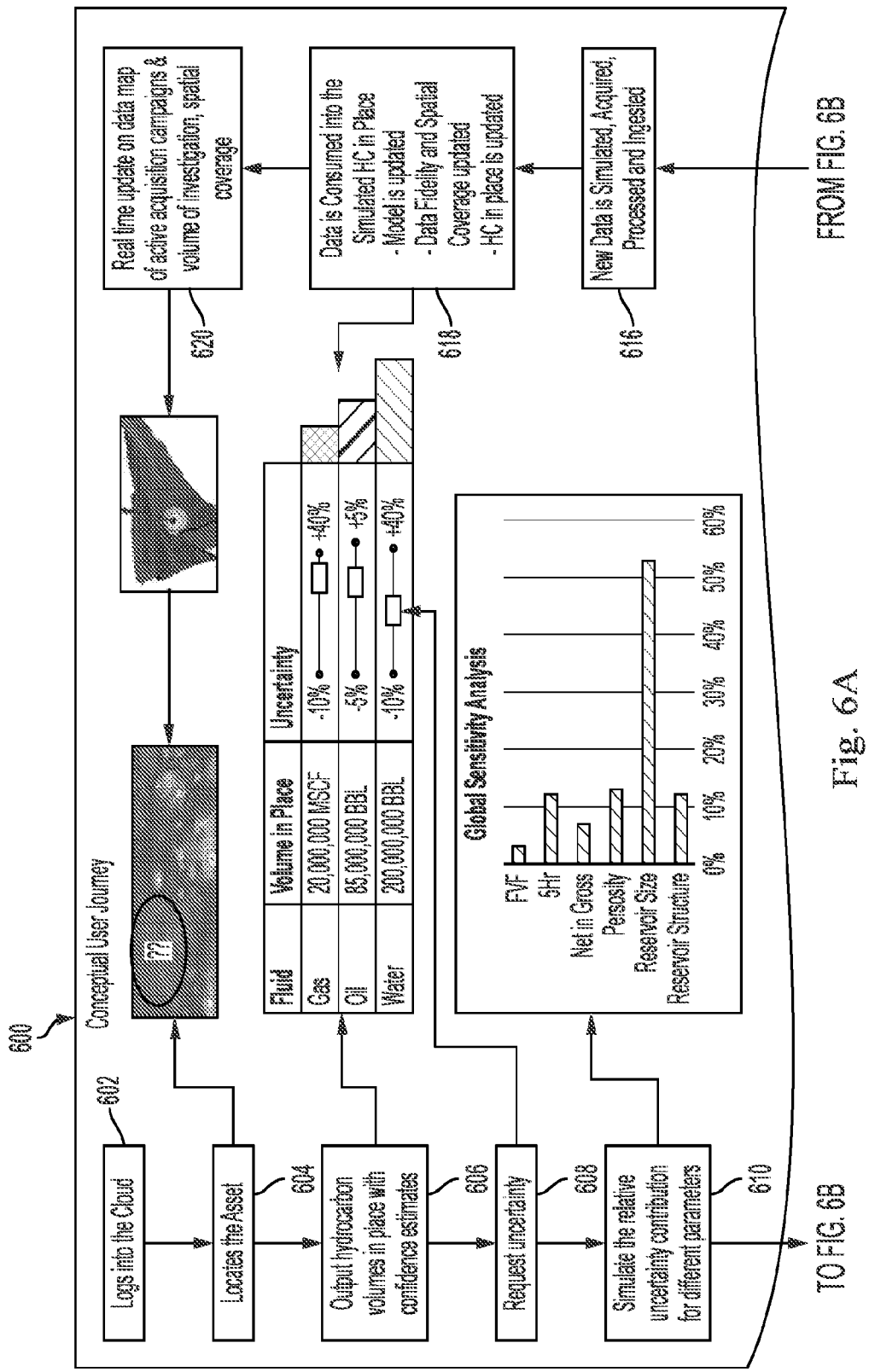
FIGS. 6A and 6B illustrate a block diagram of an illustrative workflow for determining reservoir performance indicators.
Figure 6B:
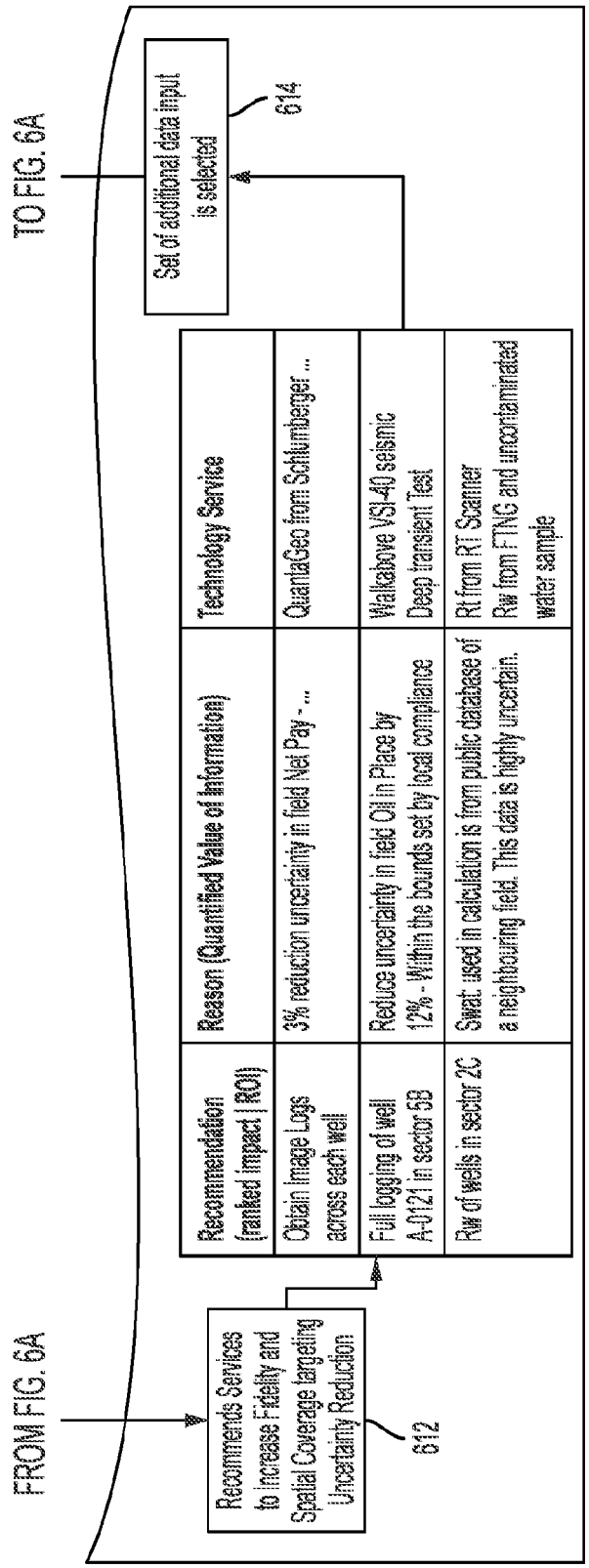

An example of workflow 600 for selecting and executing a service using a Service Advisor is discussed in association with FIGS. 6A-6B. In the workflow 600 of FIGS. 6A and 6B, a user may be provided access (e.g., credential access via a login window) to one or more applications of the cloud-computing platform 310 at 602. In one embodiment, the user may, at 604, locate an asset for the purpose of modeling. For example, the user may select a reservoir of interest to model. The user (e.g., client/customer) may also select one or more desired outputs, objectives, and/or end products/services associated with the reservoir of interest. For example, a client objective may be to calculate Hydrocarbon in Place (HiP) or refine/update a previous HiP calculation (e.g., from an existing reservoir model, offsite wells, etc.). At 606, the user may specify what the objective parameter is. For example, the user may specify that the objective parameter is HiP and may, in some embodiments, specify a current uncertainty value for the objective parameter(s) at 608. With a defined objective regarding an objective parameter (i.e., HiP for example), the Service Advisor may conduct simulations to identify one or more sources of uncertainty at 610 and suggest service(s) to achieve a desired objective at 612. Further, when more information becomes available, a well or reservoir model may be refined/updated based on the new information. For example, if another well log (e.g., an image log) is acquired in a well, then the well model associated with the well in question may be updated with the acquired data (e.g., dips, sand count, etc.).

At 614, a user's selection of a candidate service may be received and communicated to the cloud computing platform 310, which may generate a digital execution plan that is subsequently transmitted to resource site for execution. At 616, new data may be acquired, processed and/or ingested by the cloud-computing platform 310. At 618, the cloud-computing platform 310 may update the resource model to incorporate the new data (e.g., sensor measurements associated with the reservoir, new customer constrains, new equipment parameters, etc.). At 620, real-time updates may be provided (for example using the collaboration, validation, and learning module 450) on a data map (e.g., geospatial data, topographic base data, geochemical data, geophysical data, etc.) associated with the reservoir in question.

Digital Execution Plan

This section describes generating and executing the digital execution plan. In one embodiment, an automated planner of the cloud-based platform 310 and/or another planner associated with one or more computing devices at the resource site or user location may develop a plan for execution by one or more controllers at the resource site to run or otherwise execute an effective or selected service including at least one control operation at the resource site. The digital execution plan discussed in this disclosure provides greater independence and flexibility for executing one or more resource site operations than prior planning systems.

The digital execution plan according to one embodiment includes one or more events (e.g., one or more operations or tasks). In some cases, the digital execution plan includes a set of preceding events, a set of following or successor events, and at least one condition descriptor that determines whether an event is a preceding event or a successor event. The condition descriptor may also detect whether an event has already occurred or whether to authorize the commencement of a new operation action. In one embodiment, the digital execution plan does not rely on execution time of events when executed. In such cases, the digital execution plan includes events that are independent of time. In alternative embodiments, the digital execution plan factors in an amount of time to execute a given operation. In some instances, the digital execution plan is based on event interdependencies and detected conditions associated with events within the digital execution plan. In some embodiments, the digital execution plan does not define event start times, event stop times, and/or event durations. As will become apparent from the following description, the digital execution plan executed in accordance with the principles of the present disclosure may be time-independent and can therefore be executed based on logical constraints having both planned and unplanned constraints and executed to incorporate flexibility of time and resources availability when carrying out the operations of an event of the digital execution plan.

Figure 7:
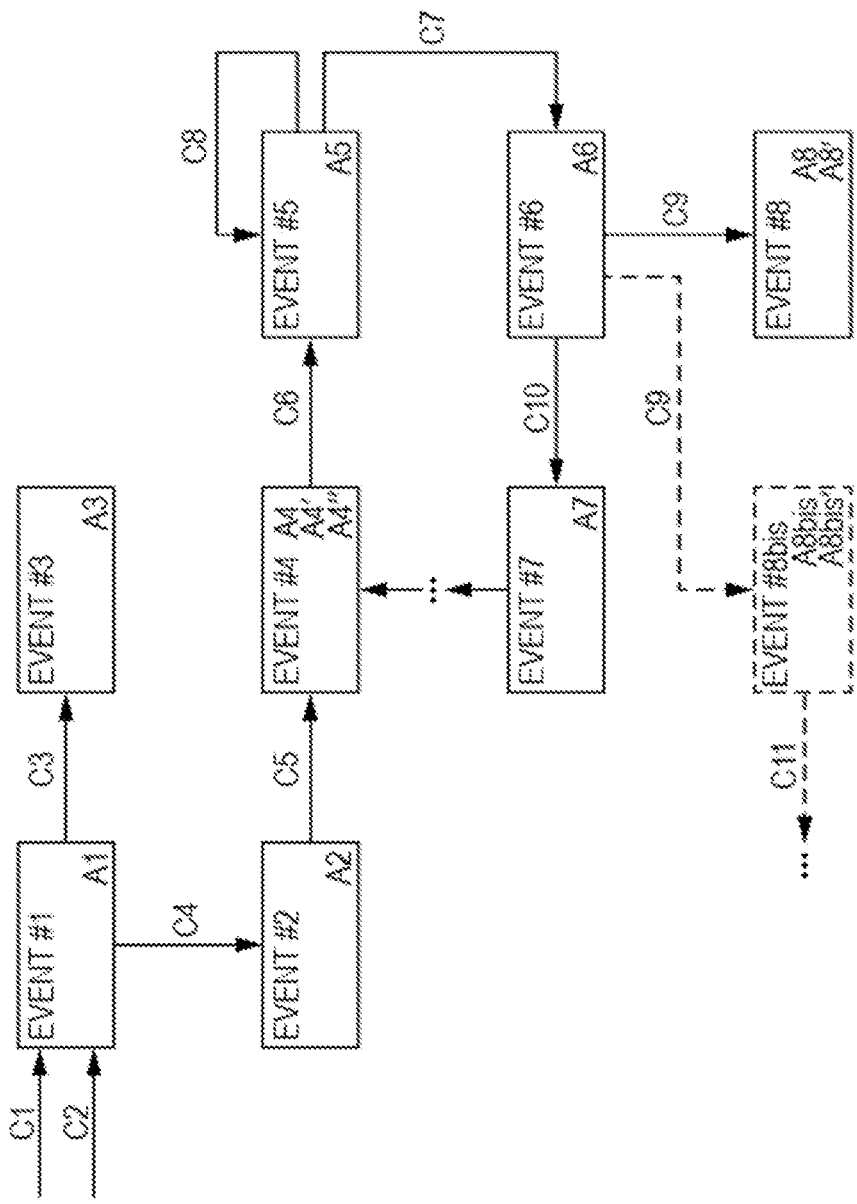
FIG. 7 illustrates an example of a digital execution plan as per an embodiment of the current disclosure.

The digital execution plan of FIG. 7 starts with a task/ Event #1. Event #1 may include lowering a tool into a borehole of the resource site until an identified target depth is reached. The digital execution plan may also include other events/operations such as: pumping a fluid into a wellbore including starting and stopping one or more pumps having similar or dissimilar flow rates; triggering an action on a downhole tool using, for example, an expanding packer; or triggering a perforating gun or withdrawing fluid from a formation at the resource site with a probe. The digital execution plan may also include events associated with initiating a measurement operation from the surface of the resource site including launching a light pulse into a fiber optic cable and recording the backscattered data. The digital execution plan may also include operations associated with seismic data transmissions from a seismic source and reception of seismic data by a seismic receiver. The digital execution plan may also include operations associated with transmitting data between a downhole source (e.g., wellbore) and the surface of the resource site. The digital execution plan may also include data storage and other data manipulation (e.g., data deletion) operations on one or more computing devices at the resource site. According to some embodiments, the digital execution plan may include operations associated with activating and/or releasing pressure control equipment tool catchers at the resource site. The digital execution plan may further include operations associated with opening and closing a wellbore valve, operating a winch to spool or unspool a cable at the resource site, changing the parameterization of at least one surface/subsurface equipment, monitoring parameter values of one or more sensors and/or sensor models associated with the resource site. The digital execution plan may further include logic for preparing and transmitting data (e.g., sensor data, status data, status reports, etc.) associated with one or more resource models and/or equipment models associated with the resource site. The digital execution plan may further include operations associated with monitoring and/or modifying the fluid in the wellbore (e.g. rate of circulation, density, gas-to-oil-ratio, flow rate). The digital execution plan may further include operations associated with surface production (e.g. monitoring emissions from well test burning, monitoring flow of multiphase produced fluids). The digital execution plan may further include operations associated with modifying power supplied at the surface and downhole.

In some cases, a specific event or task in the digital execution plan may include one or more successor events such that the specific event or task is executed subsequent to executing the one or more successor events. For example, Event #2 and Event #3 may be executed after executing Event #1 thereby making Events #2 and #3 successor events to Event #1. Since Event #1 does not have any predecessors, Event #1 is not a successor event. It is appreciated that each event or task has an event identifier. For example, Event #1 has an event identifier A1, Event #2 includes an event identifier A2, Event #3 includes an event identifier A3, and so on. In some cases, each event identifier may further include contextual information that further clarifies or makes identifying each event within the digital execution plan easy. Such contextual information may include task/operation names such as LowerTool, LiftTool, StartPump, StopPump, StartDrill, StopDrill, etc. In some embodiments, each event may include a plurality of operations. Moreover, each event within the execution plan may be parameterized with one or more parameters to control or otherwise define or regulate the event in question. For example, assuming Event #1 is contextually identified as a LowerTool event, then Event #1 may include a speed parameter that controls the speed with which the tool is lowered by a controller (e.g., manual and/or automatic controller). In such a scenario, the speed parameter may be defined by a status such as SpeedHigh thereby indicating that the controller should aim to achieve a high speed for lowering the tool.

Further, one or more precondition variables may be set or otherwise provided for executing an event/task within the digital execution plan. For example, the one or more precondition variables may define configuration values and/or configuration conditions to which one or more equipment may be subjected to before executing an event within the digital execution plan at the resource. Turning to Event #1 for example, a precondition variable C1 of Event #1 may have a "connected" status that indicates that the tool is mechanically and/or electrically connected to a cable. The status of the precondition variable C1 may be detected, for example, by a sensor (e.g., pressure and/or electrical sensor) coupled to the tool (e.g., a sensor in a logging head of the tool) that senses tension in the cable, etc. The status of the precondition variable C2 may indicate that the system is not currently being moved, and may be defined by a 'notmoving' status, which can be detected by, for example, an output from a winch motor, torque sensors, or other suitable means coupled to the tool. Event #1 may, for example, include a lowering process and so in response to detecting Event #1, the controller may begin a lowering operation. This example is simplified for ease of reference and conciseness, but in a practical implementation, other tasks/operations associated with Event #1 may be executed in conjunction with Event #1.

In some embodiments, each event/task within the execution plan nay include a failure variable which may have a True or False status. For example, the failure variable C3 may be generated responsive to a process failure or task failure associated with executing Event #1. More specifically, during the execution of Event #1 (i.e., lowering a tool into a borehole), a malfunction may cause, for example, the tool not to be lowered to a target depth. This may cause a failure variable C3 to be generated such that the failure variable C3 has a contextual identifier 'notmoving', for example. As a result, a troubleshooting even (e.g. Event #3) may be initiated to resolve the issues flagged in the failure variable C3. As can be appreciated, a plurality of failed conditions may be generated during the execution of one or more events in the execution plan. It is further appreciated that failure associated with a single event within the digital execution plan may be indicative of a localized failure event that can be locally resolved. In some embodiments, a localized failure may lead to a distributed failure within the digital execution plan.

Referencing Event #1, a physical situation which can cause the controller to know that the lowering operation is complete/successful is that the target depth has been reached (condition C4) responsive to executing Event #1. This might be measured for instance by measuring the length of an unwound cable coupled to the tool. Such successful results/conditions may be captured by a success variable. For example, the success variable C4 for Event #1 may be generated responsive to the successful completion of Event #1. When the success variable C4 is obtained, the digital execution plan allows for the detection of the successful completion of Event #1 at Event #2. Event #2 may include one or more tasks A2 that may be based on the success variable C4. For example Event #2 may include a stopping task or a stopping operation that is executed in response to reaching the target depth after executing the lowering operation of Event #1. In some cases, no time constraint is placed on Event #2. Thus, Event #2 may be executed after the execution of Event #1 based on the success variable generated after executing Event #1.

Event #4 may then be initiated when Event #2 is successfully completed by generating success variable C5 which is detected by Event #4. Generation of success variable C5 may be based on, for example, monitoring a movement of the winch at the surface (e.g., when the winch motor torque is zero). Event #4 may include event identifiers A4, A4', and A4", each event identifier being associated with a given operation. For example, each event identifier A4, A4', A4" may correspond to one parameterization operation thereby making Event #4 an event for executing three parameterization operations of an equipment (e.g., sensor, tool, etc.) at the resource site. For example, parameterizing the tool discussed above in association with Event #1 may include customizing/configuring the tool based on a well model and/or a formation physics model associated with physical properties of a well at the resource site. For instance, in the well integrity domain, parameterizing a sensor may include configuring a firing voltage of the sensor, adjusting resolution window settings of the sensor, and activating and/or selecting appropriate filters of the sensor. Such configurations of the sensor, for example, may be further optimized based on one or more parameters of a resource model. Assuming the resource model is a well model having parameter values associated with resonance frequency range, pipe dimensions, mud impedance, and velocity, the sensor and/or tool may be configured or parameterized based on the parameter values as well. Thus, the success variable C6 may be generated in response to executing the parameterization operations of Event #4.

Event #5 may be initiated responsive to Event #5 detecting the success variable C6. Event #5 may include executing a measurement operation A5 with the tool and/or sensor(s) discussed in association with Event #4. As previously noted, Event #4 may be executed to parameterize a given sensor at a first target location. This correctly parameterized sensor may be used to execute the measuring operation A5. The measuring operation A5 may include measuring an electric current (or some other property) that has a non-zero value or measuring an electric current that has a value above a certain threshold. Responsive to a successful measure of such an electric current, the success variable C7 may be generated. If the electric current is zero or below the required threshold, a failure variable C8 may be generated thereby indicating a failure in one or more operations associated with Event #5 and/or Event #4. Event #5 may be restarted and if the failure variable persists or is regenerated, Event #4 may be re-executed prior to re-executing Event #5. If the failure variable C8 persists in spite of the re-executing Events #4 and #5 at least once, other operations may be initiated other than those provided in FIG. 7.

If a signal (e.g., the measured current) has been detected, the digital execution plan may move to Event #6. In one embodiment, Event #6 may be initiated in response to Event #6 detecting the success variable C7. Event #6 may include one or more quality control operations that may be executed on the measured signal. In one embodiment, the quality control operation may include comparing a characteristic of the acquired signal to an expected characteristic that may be stored in a quality control model of the digital execution plan. A parameter that may be included in such a quality control model may include a signal-to-noise ratio value, an expected signal gain value, an expected frequency value, and/or other parameter values that allow for the assessment of an accuracy of the received signal (e.g., the measured current). Upon a completion of the quality control operation of Event #6, the success variable C9 may be generated. For instance, the quality control operation may determine that the signal-to-noise ratio of the received signal is within an acceptable range of the signal-to-noise ratio value of the quality control model and based on this determination, the success variable C9 may be generated.

If the Event #6 is considered as failed (e.g., the signal-to-noise ratio is not within an acceptable range of the signal-to-noise ratio value associated with the model), a failure variable C10 may be generated to initiate execution of Event #7. Event #7 may include calibration operations A7 that may be comprised in several events (not shown) such as acquiring data in the same location or in a different locations, or other events that may be connected to Event #4. If Event #6 is considered successful, the controller may move to #Event 8 where the tool/sensor may be pulled using the extraction operation A8 of Event #8 and transmitting the measured signal (e.g., measured current) that has successfully undergone the quality control operation of Event #A6 to the cloud-based platform 310 for further processing. This transmission of the measured signal to the cloud-based platform 310 may be achieved using the transmission operation A8' of Event #8.

In some embodiments, data may be processed as part of executing events of the digital execution plan so that uncertainty data (e.g. uncertainty values) of one or more parameters of a resource model may be updated. In such cases, the digital execution plan may also include a quality control model for evaluating an accuracy of the one or more parameters. If the accuracy of one or more parameter values are determined to be acceptable by the operations associated with the quality control model, the resource model may be updated and/or the quality controlled data may be transmitted to a remote server for further processing. The remote server may include the cloud-processing platform 310 or some other third-party server associated with a user. The analysis operations and quality control operations may be part of the digital execution plan executed at the resource site. In some embodiments, the analysis operations and quality control operations associated with the digital execution plan may be executed in a location that is remote from the resource site.

As can be seen from the foregoing description, the execution of the various operations provided in this disclosure may be governed by logical connections and/or associations between events of the digital execution plan and/or by preconditions which may be detected or undetected, either at the beginning of, or during, the execution of certain operations at the resource site and or by the cloud-based platform 310. The controller executing the digital execution plan may parse the digital execution plan prior to executing any event therein. In one embodiment, the controller may execute the digital execution plan based upon the logical connections and preconditions set out in steps associated with each event comprised in the digital execution.

A digital execution plan of one embodiment may be associated with an operational file and a domain file. The operational file may contain operational data about each of the available service or operation in a given domain for which the planning is being executed. The domain in such cases may include a logging domain. The domain file may be generated using a Planning Domain Definition Language and may include definitions of the environment in which the operation is taking place. The plan definition may be based on the domain and operational files described in more detail in Patent Application No. US2017/0370191 which is herein incorporated by reference.

The above-described processes may also be iterated and updated in real-time. As digital execution plans are developed and executed or data about a resource becomes available from sources (such as from other measurements from nearby resource sites or the like), the resource models and/or simulations may be updated and recommended candidate services also updated. For example, with additional parameter measurements during a wireline formation-testing job, the uncertainty values of one or more parameters (e.g., permeability) may continuously decrease. Whether or not such uncertainty values are incorporated into the digital execution plan does not matter in some embodiments, since additional information can be applied to a set of resource models being simulated to account for such uncertainty value changes. In an embodiment, new information can be used to reduce uncertainty and/or update an uncertainty value without performing additional further analysis of certainties. Thus, once the simulations have been performed, results can be stored and further determinations made by terminals/computing systems/computing devices that may have a low computation power relative to the cloud-computing platform 310 thereby mitigating against incurring the costs of requisitioning the cloud-computing platform 310 again. For example, if a parameter had an uncertainty in the range of 5-20% with a resolution of 1, fifteen simulations may have previously been performed to cover the range of 5-20. If new information becomes available that a given parameter value is actually within the range of 15-20, then the simulations associated with the range 5-14 may be removed from the set. With a reduced set of simulations, the contribution of uncertainty can be reassessed and re-ranked. In view of this information, a different candidate service targeting a different objective parameter values or a different and less costly or less time-consuming digital execution plan may be selected since the most significant source of the uncertainty may change.

An example of how such model refinement may be used to update the digital execution plan is described in more detail below. For instance, in the illustrated embodiment shown in dotted line on FIG. 7, if the Event #6 is considered successful (success variable C9), the data acquired using the sensor and/or the tool may be sent to the cloud using the data transmission operation A8*bis* of #Event 8*bis* and tool may be stopped at a target depth using a halting operation A8*bis'* until a notification is received from the cloud server. A successful reception of such a notification may be indicated by the success variable C11.

Once the acquired data is received by the cloud-based platform 310, the data may be analyzed and the resource model is updated. Based on the foregoing example, the resource model may be updated by limiting a range of one or more model parameters at the target location based on the acquired data. The cloud-based platform 310 may determine an updated uncertainty value for the objective parameter based on the updated resource model. If the uncertainty value is over a certain threshold, the cloud-based platform 310 may estimate a remaining uncertainty associated with one or more additional measurements with the tool/sensor (for instance at a different target depth) using forecast models (as explained above) and recommend one or more options to the user. If the user validates one or several of the presented options, the digital execution plan may be updated to account for the validated option(s).

The cloud-based platform 310 may notify the surface unit (e.g., one or more terminals 320) when results associated with the cloud-processing are available. Such notifications may include updated digital execution plans. Based on the updated digital execution plan, the tool/sensor may execute one or more measurements at one or more target locations and/or at different target locations. In another embodiment, user-validation may not be necessary. For instance, the user may have entered preset acceptance criteria (e.g., gain in uncertainty versus time/cost of the additional measurement) and options and/or results associated with the cloud-processing may be automatically selected and results subsequently transmitted to the resource site based on such acceptance criteria. Alternatively, based on the results, the user may initiate a request for additional measurement at which point the digital execution plan may be updated based on the user-request.

In one embodiment, a set of processors associated with the cloud-based platform 310 may be configured for receiving a resource model associated with a resource site such that the resource model includes a plurality of parameters respectively having parameter values and associated uncertainty values. The set of processors may be also configured for receiving an objective parameter that is a function of at least one resource model parameter. The set of processors may also be configured for generating an objective value and a first uncertainty for the objective parameter using the resource model and identifying at least one service to be executed at the resource site based on the resource model and the at least one objective parameter. The at least one service may include using at least one sensor deployed at the resource site to acquire data at the resource site. The set of processors may be further configured for updating, based on data acquired at the resource site during executing the at least one service, at least one of the parameter value comprised in the plurality of parameter values of the resource model, one uncertainty value of at least one associated uncertainty value of the resource model, and the objective parameter. The set of processors may also be configured for presenting the objective value of the objective parameter and the first uncertainty value for the objective parameter to a user. In some embodiments, the set of processors includes a first set of processors situated remotely from the resource site and a second set of processors situated at the resource site. The first set of processors may be configured for generating the execution plan and transmitting the execution plan to the second set of processors. The second set of processors may be configured for receiving the execution plan, and executing control operations on one or more equipment at the resource site.

Furthermore, the digital execution plan may not be conditioned on reception of model refinement results. In one embodiment, the digital execution plan may can continue being executed based on an initial digital execution plan depending on a user's preference and/or model refinement calculation times. In such cases, the initial digital execution plan may be updated when a request from the user or model refinement results are generated. For instance, the updated plan may include lowering the tool to a second target depth and subsequent events enabling the tool to perform additional measurements with the same sensor may be executed. If the tool includes several different sensors, a different sensor may be used to capture the additional measurements if the additional sensor is assessed as contributing a lower uncertainty value to the objective parameter and or minimize one or more uncertainty values of the resource model and thereby lower the uncertainty value of the objective parameter.

Thus, the principles provided in this disclosure may enable updating the digital execution plan automatically and/or conditionally based on user-preferences and/or based on user-validation operations. Such updates may optimize or otherwise refine resource models by refining or selecting optimal uncertainty values and thereby optimize digital execution plans if required. The digital execution plan may be updated while the tool is in a wellbore based on model refinement obtained following a first measurement operation. Additional measurements by the tool may be based on refinements to the resource model based on the first measurement operation.

A particular example of an update to the digital execution plan has been provided for the downhole tool. However, the digital execution plan may takes into account all elements at the well site (pumps, winch, etc.) while the updated digital execution plan may modify the workflow of one or more operations comprised in the digital execution plan. Such updates might not just affect the tool but may also affect other equipment at the resource site.

Figure 8:
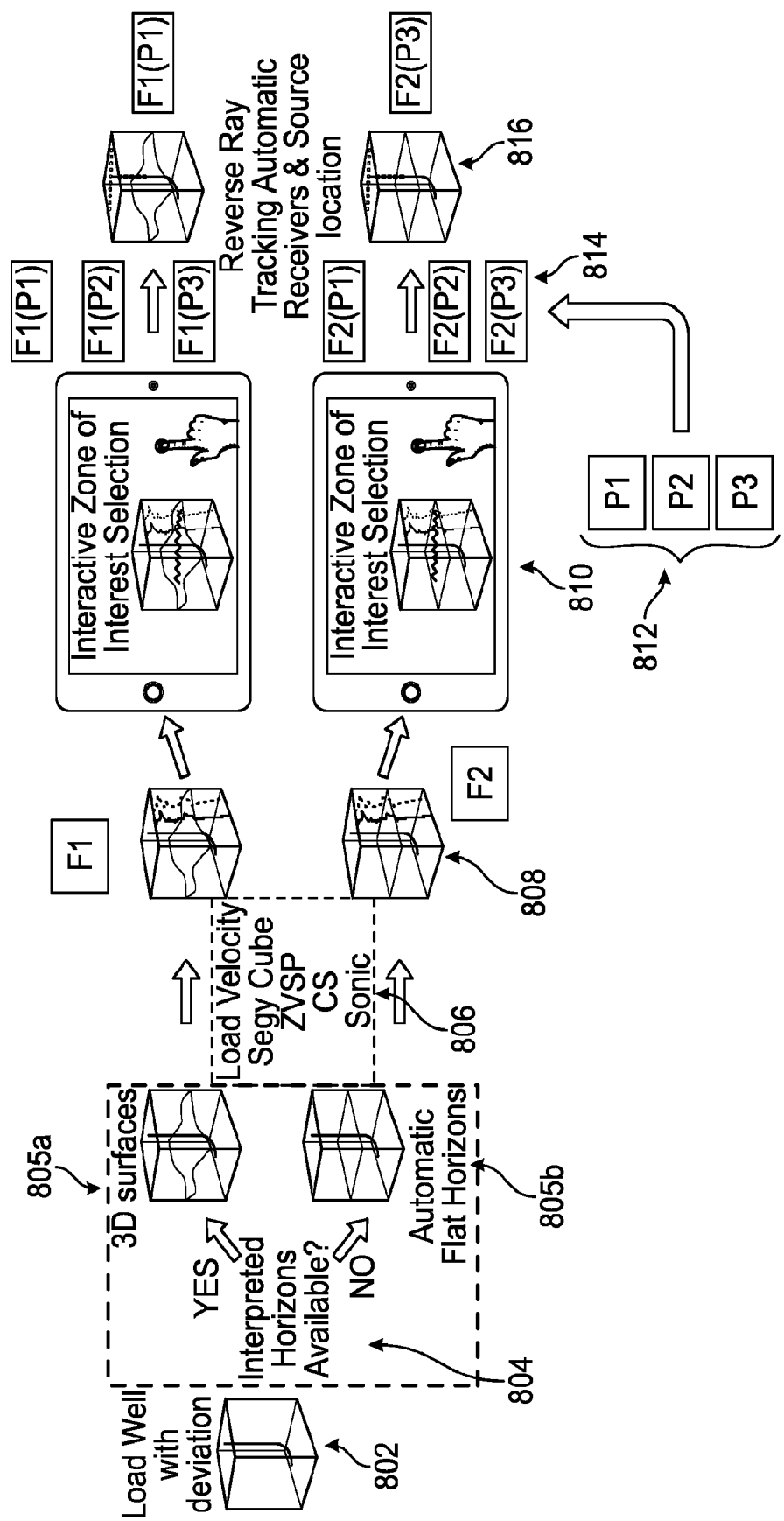
FIG. 8 illustrates an example seismic survey design, according to an embodiment of this disclosure.

FIG. 8 shows an example seismic survey according to one embodiment of this disclosure. As mentioned elsewhere in this disclosure, geophysical surveys may be configured in various ways by quantifying or otherwise characterizing one or more parameters to address a wide range of objectives of a user at a desired resolution and/or with an appropriate level of confidence. Most geophysical methods use surface and/or downhole measurements with sensors deployed on a temporary and/or semi-permanent basis on the ground surface or below the surface and in a minimally invasive fashion as shown in FIG. 2 (e.g., 202a-202d of FIG. 2).

The example shown in FIG. 8 relates to an autonomous seismic survey design using the planning module 410 and Service Advisor. The design of the seismic survey first comprises obtaining data associated with a subsurface as provided by block 146 of FIG. 4A. This data may be acquired from one or more data sources such as customer data sources (e.g., user inputs) and other model data sources (e.g., proxy models, forecast models, historical resource models, and other models stored in storage devices of the cloud-based platform 310, etc.). The data acquisition operation 802 and/or 806 of FIG. 8 may be automatic or manual as the case may require.

In some cases, the acquired data may be gathered from domains associated with the resource site such as Petrophysics, Geology, Geophysics, Acoustics, Well placement, and Drilling. Based on the gathered data, the planning module 410 may automatically generate and simulate at 808, an initial resource models F1 and F2 associated with a reservoir at the resource site using block 148 of FIG. 4A. Depending on the nature of user inputs, the initial resource models F1 and F2 may be configured to be simple or complex. According to some implementations, the resource models F1 and F2 may be 1-dimensional, 2-dimensional, 3-dimensional, or have other multi-dimensions other than the aforementioned dimensions. For example, the resource models F1 and F2 may be 1-dimensional if little information is available about the resource site. For instance, if the resource site has only data such as density logs, zero-offset vertical seismic profiles, hole size and deviation survey data, a 1-dimensional (1D) resource model may be generated for resource models F1 and F2. If however, additional information about the resource site such as dipping horizons data and/or salt bodies data, and/or other reservoir data, a 3-dimensional (3D) model may be generated for resource models F1 and F2. In a preferred embodiment, the example of FIG. 8 may require little to no user input to automatically generate one or more of a 1D model, and/or a 2D model, and/or a 3D model, or a combination thereof for the resource models F1 and F2 as the case may require. In the illustrated embodiment of FIG. 8, the operation 804 of selecting and/or generating resource models F1 and F2 may depend on an availability of analyzed/interpreted data associated with a dipping and/or one or more horizons of the resource site. If such data is available, a first model type 805a (e.g., 3D model type) may be selected to generate resource model F1. If such data is unavailable, a second model type 805b (e.g., 1D model type) may selected to generate resource model F2. In some cases, both model types are selected and tested to generate performance data that can be subsequently analyzed.

In the embodiment of FIG. 8, data may be imported into the resource models F1 and/or F2 at 806, after the resource models F1 and/or F2 have been selected based on availability of predetermined data. However, other techniques for appropriately generating resource models F1 and/or F2 such as selecting and importing a specific model type or importing a specific model type before selecting appropriate configurations for the resource models F1 and/or F2 are also contemplated. The resource models F1 and/or F2 may therefore represent a reservoir (or some other physical or equipment property of the resource site) and may characterize specific properties of the reservoir using one or more parameters having parameter values and uncertainty values.

Once the type of resource model selected and populated with available data or data provided by the user, a visualization of the initial resource models F1 and/or F2 of the reservoir may be provided to a user via a user interface. In some embodiments, no visualization of the resource models F1 and/or F2 are to the user. The user may provide one or more inputs including at least one evaluation parameter or at least one objective parameter as required by step 150 of FIG. 4. Here, the evaluation parameter may relate to at least identifying a zone of interest for a pre-job survey at the resource site (e.g., oil field). The user may be able to interactively select, at 810, the zone of interest directly by drawing the zone on the visualization of resource models F1 and/or F2 that is provided to the user. Other evaluation parameters that might be selected by the user include an objective parameter that relates, for instance, to a resolution and/or one or more properties of the resource model.

Candidate services may be automatically selected 808 as required by step 154 of FIG. 4A. In this case, the type of candidate services has been already decided (e.g. seismic survey) but the planning module 410 may focus on determining parameterization of the candidate service, namely, positions of sources and receivers (at the surface and/or downhole) at the resource site. The candidate services may therefore include different parameterizations P1-P3 of the survey. The candidate services may be parameterizations P1-P3 that are stored in a database that can be automatically accessed. The parameterizations P1-P3 may also be received via one or more user inputs. In some cases, the parameterizations P1-P3 may be automatically generated based on parameterization templates stored in the database. In some cases, the parameterizations P1-P3 may be automatically generated on model parameters including the zone of interest. In the case where the parameterizations P1-P3 are based on the zone of interest, the generated parameterizations P1-P3 may be job-specific and correlated to a parameterization template with parameters of the initial resource model. Such parameters of the initial resource model may include the zone of interest for a current job. The parameterization template may comprise, for instance, an indication of where to place the sources and receivers based on zone parameters such as depth, location of boundaries, and dimensions.

Once the candidate services have been selected, the system (e.g., cloud-based computing platform 310) may automatically estimate 814 at least a forecast model for each candidate service. This may be done using one or more simulations including varying at least one resource model parameter based on a scenario corresponding to the selected candidate service. The forecast models F1(P1), F1(P2), F1(P3), F2(P1), F2(P2), and F2(P3) depend on the one or more parameters of the initial resource models F1 and/or F2 of the reservoir by taking into account the survey parameterizations P1-P3 to simulate different properties of the zone of interest. According to some implementations, the resource model incorporates results from the simulations associated with the survey into selected parameterizations of the corresponding candidate service.

The forecast model (e.g., derived from the simulations) may be obtained by performing an inversion operation, such as a reverse ray tracing operation or the like. The results of the inversion operation may be linked to uncertainty values or calculations involving uncertainty values at each step of the inversion process. Each parameterization may then be evaluated based on at least the one or more forecast objective parameter values and/or uncertainty values of the forecast objective parameter for the identified zone. A service may be automatically recommended for selection as required by block 158 of FIG. 4A. In the present case, the objective parameter may be related to the coverage of the zone of interest by the pre-job survey. The objective parameter may also be a function of one or more resource model properties or parameter values of the zone of interest. As explained in conjunction with the general wireline workflow, uncertainty values may be weighted to help with the decision-making process of selecting the recommended service(s).

One or more recommended services and/or optimal parameterizations may be automatically displayed 816 to the user via, for example, a user interface. Depending on the initial resource model, the parameterization that may be selected may include varying parameterizations. For instance, P1 may be selected when the initial resource model is F1 while P3 may be selected when the initial resource model is F2.

In an embodiment, the optimal parameterization may be displayed with additional information such as costs associated with executing operations involving each parameterization. The additional information may be considered when selecting the recommended service with or without a user input. For instance, a multi-factor logic using several evaluation factors may consider the additional information when selecting the recommended service with or without a user input. The multi-factor logic may, for instance, take into account a minimization of budget associated with the parameterization based on, for example, an acquisition time, a number of receivers, a number of sources, etc. of the resource site. The recommended service may be generated and/or selected and/or ranked as a function of the budget. In some embodiments, the multi-factor logic may consider an evaluation factor that includes an overall budget for performing the job. The multi-factor logic may then calculate the cost associated with each parameterization based on evaluation factor. In some cases, a visualization of the reservoir including the position or location of the sources and receivers based on the recommended service may be displayed to the user via a user interface so that the user can interactively visualize the reservoir and expected job results. A report may also be generated after the recommended services are selected. The report may include all the user inputs, uncertainty values generated, every step involved in the process of FIG. 8, and final parameterizations selected.

Thus, the pre-job survey is able to take advantage of the immense power of cloud-based data storage and cloud-based data processing to quickly and efficiently analyze the zone of interest and determine an optimal survey design using available data associated with the resource site as well as one or more user inputs to meet the survey objectives of a user. At the various processing and analysis stages of the example of FIG. 8, one or more users may interact with the data being processed or analyzed and/or interact with one or more results from the data processing and analysis stages. These techniques beneficially allow a user to meet survey objectives while optimizing usage of the overall budget (e.g., financial, data needed, tool deployment (type and quantity) and mobilization time, etc.)

LivePlans

As context, the services disclosed herein may be planned and executed at a given resource site using a static execution plan (e.g., a static digital execution plan) that merely executes a set of operations based solely on the tasks outlined in the execution plan. In one embodiment, acquisition deliverables derived from executing such execution plans may be automatically, semi-automatically, and/or manually prepared and communicated to a user (e.g., a client/user of the user terminals 314). While generating and executing static execution plans have some benefits, the principles and systems presented in this disclosure are further optimized to make execution plans more organic or otherwise adaptable, in some embodiments, to improve process efficiencies at the resource site during the performance of one or more operations of the static execution plan. This approach allows execution plans to be adjusted or otherwise updated during execution. According to one embodiment, such updates may occur real-time and/or near real-time and/or within a reasonable amount of time (e.g., less than 24 hours, or less than 12 hours, or less than 5 hours, etc.). Another benefit to updating an execution plan during execution is that opportunities for both a user and/or the Service Advisor may be leveraged to further improve the execution plan when insightful data and/or other valuable findings are discovered during execution of a given execution plan. For example, receiving measured data indicative of certain conditions might prompt or suggest certain service changes to the execution plan. Such changes to an execution plan in execution might include changing location parameters at the resource site where data is currently being captured; changing equipment types executing a given operation; varying the duration of an operation, flow rate, fluid composition, and other parameters or other configurations based on detected changes occurring at the resource site, etc.

The present disclosure provides a framework that identifies opportunities to provide more value to a user based on measurements and other information obtained during the executing a first execution plan. When such opportunities arise, systems associated with FIG. 3 (cloud-based platform 310, terminal 320, etc.) may automatically update or reconfigure the first execution plan to take advantage of such detected opportunities. In one embodiment, the user/client may be prompted to authorize any proposed changes to the first execution plan prior to executing a second execution plan that is an update of the first execution plan. Operations outlined in the second execution plan may be used to reinitiate one or more operations in the first execution plan, and/or be used to execute entirely new operations altogether at the resource site, and/or be used to execute certain aspects of the first execution plan while executing some of the new operations, etc., and thereby exploit the detected opportunity. This degree of flexible automation reduces, according to some embodiments, non-productive time during executing one or more operations of the execution plan, increases process efficiencies at the resource site, and critically provides more information, value, and opportunities for the user. The foregoing indicates that an execution plan being executed may be revised or otherwise adapted to generate an updated execution plan in real-time, near real-time, or within a reasonable amount of time. For the purposes of this disclosure, we refer to such an adaptable execution plan as a "LivePlan."

Figure 9:
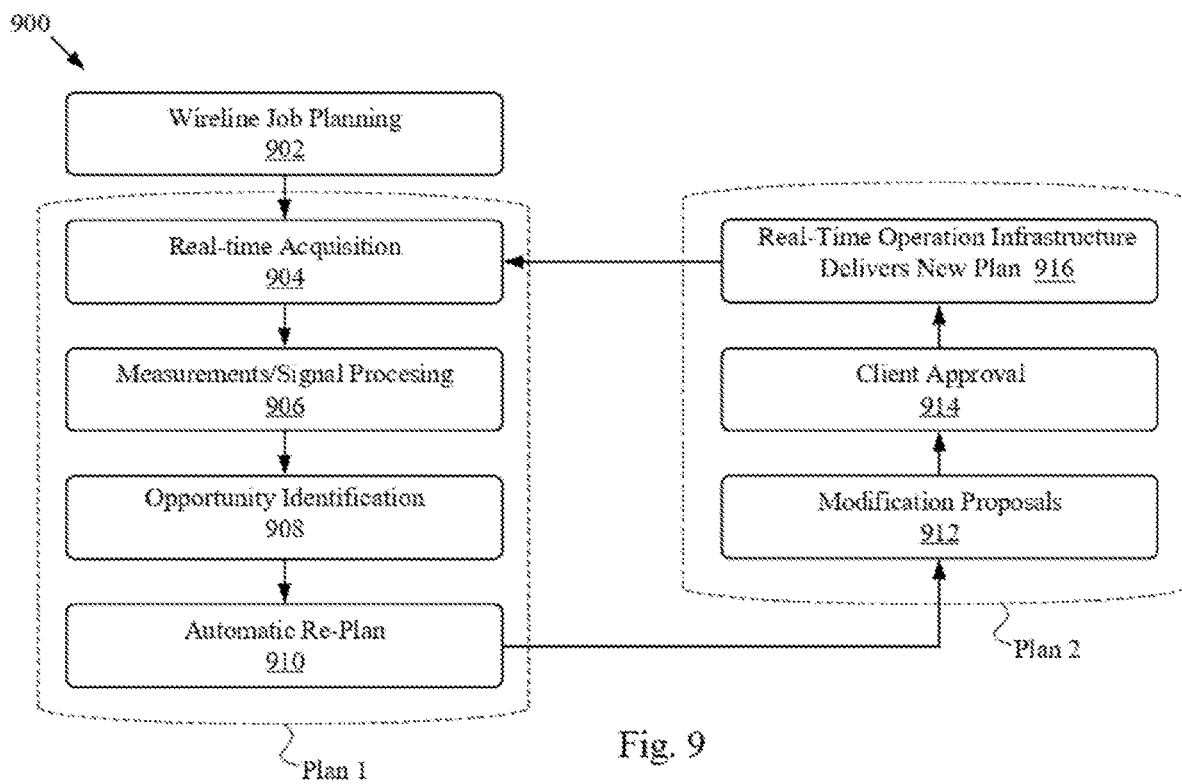
FIG. 9 illustrates an example flowchart for generating and executing LivePlans, according to one embodiment of this disclosure.

Referring to FIG. 9, flowchart 900 illustrates a non-limiting example of one implementation of a LivePlan. An initial digital execution plan may be created at 902 and transmitted to be executed at the resource site by a controller as previously discussed. In one embodiment, the controller communicatively is coupled to the cloud-based platform 310 such that both the cloud-based platform 310 and the controller are comprised in an acquisition system configured to efficiently execute one or more operations/processes at the resource site. The acquisition system may initiate, at 904, data acquisition while executing the initial digital execution plan. In some embodiments, the acquisition system uses real-time or near real-time acquisition of various measurements as part of executing the initial execution plan. The acquisition system may process the acquired measurements at 906 and may execute one or more signal processing operations including quality control operations such as noise filtering, signal-to-noise ratio analysis, etc., to confirm the accuracy of the captured measurements and format, in some cases, the captured measurements for further processing. The foregoing operations may be concurrently executed with other operations in the initial execution plan according to some embodiments.

After the processing at 906, the acquisition system at 908 may further identify opportunities to further optimize or improve, at 908, the initial execution plan. When an opportunity is identified, the acquisition system may automatically revise at 910, the initial digital execution plan and optionally propose for approval, at 912, the updates to the user. At 914, the user may review, using a graphical user interface (e.g., graphical user interface of user terminal 314), update proposals to the initial execution plan. According to one embodiment, a real-time operation infrastructure subsystem of the acquisition system may transmit, at 916, the updates to the initial execution plan for execution at the resource site. In some instances, the real-time operation infrastructure subsystem of the acquisition system may transmit, at 916, a new execution plan to supplement or replace the initial digital execution plan such that the new execution plan is executed at the resource site in conjunction with and/or independent of the initial execution plan. The operations outlined in FIG. 9 may be executed in real-time or near real-time according to some embodiments.

In some cases, the concepts of Flowchart 900 may be implemented in accordance with the following process of an acquisition system: receive a digital execution plan at a resource site; initiate the digital execution plan to perform a service and receive data; during execution of the digital execution plan, analyze captured data for opportunities; when an opportunity is identified, perform an automatic revision of the digital execution plan based at least in part on the opportunity; provide a notice regarding the identified opportunity and revised digital execution plan to a user; resuming execution of the service with the revised digital execution plan in response to the user authorizing the revised execution plan. In some cases, the acquisition system includes optimization technology such as machine learning tools and/or artificial intelligence tools that identify opportunities and automatically update the initial execution plan based on the client's objectives. In such cases, the user's authorization/input for such optimizations may be minimal or non-existent at all. The optimization technology may therefore transmit the updated execution plan for execution with little to no user input.

Furthermore, identifying opportunities in received data may be based on the quality control and/or signal processing operations executed at block 906 of FIG. 9. In some embodiments, in response to providing notices or proposals to the user for approval, the acquisition system may resume execution of the service with the revised digital execution plan that has been authorized by the client. In one embodiment, multiple revised digital execution plans may be recommended to the user such that the user selects at least one of the recommended revised execution plans. Responsive to the user's selection, a revised or updated execution plan, which may comprise a single revised execution plan or a consolidation of one or more execution plans, may be executed by the acquisition system. In some embodiments, analyzing data for opportunities includes using a first set of analytical workflows and/or signal processing routines to identify the opportunities. In some embodiments, during execution of the revised digital execution plan, the data may be analyzed for opportunities using a second set of signal processing routines and/or analytical workflows.

Figure 10:
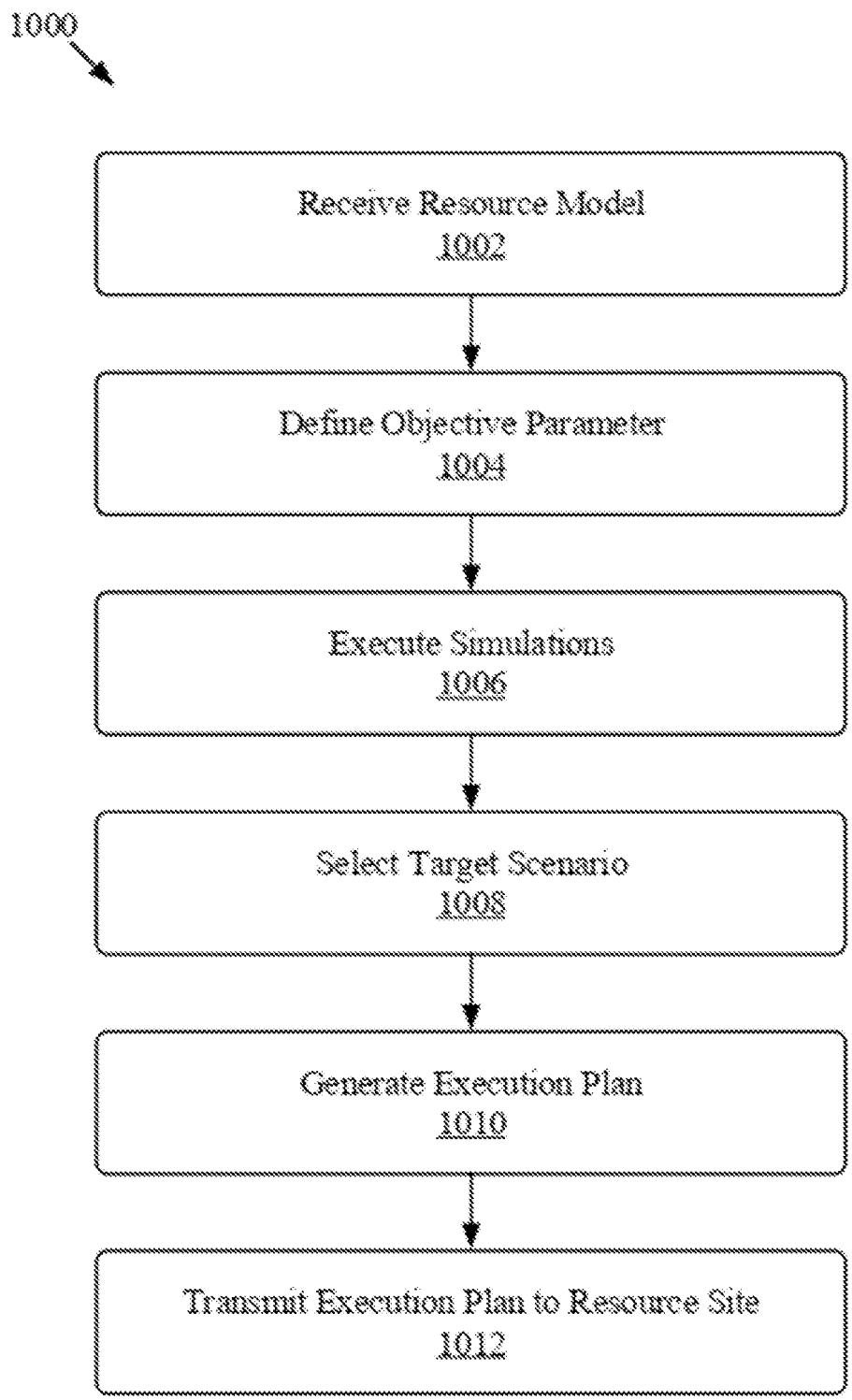
FIG. 10 illustrates an example flowchart for generating a digital execution plan based on client objectives, according to one embodiment of this disclosure.

FIG. 10 illustrates an example flowchart 1000 for generating a digital execution plan based on client objectives, according to one embodiment of this disclosure. At block 1002, a resource model may be received by, for example, one or more computing device processors of the system shown in FIG. 3. The resource model may be associated with a resource site and may include a plurality of parameter values such that each parameter value has an associated uncertainty value. At block 1004 the one or more computing device processors, may define, an objective parameter. The objective parameter is a function of one or more parameter values comprised in the plurality of parameter values. The one or more computing device processors, may execute, at block 1006, one or more simulations based on the plurality of parameter values to generate a first plurality of forecast models. It is appreciated that a first forecast model comprised in the first plurality of forecast models may be associated with testing a first plurality of scenarios based on the one or more simulations. The one or more computing device processors may select, at block 1008, a target scenario comprised in the first plurality of scenarios based on at least one of the first forecast model and a first uncertainty value of the objective parameter. The first uncertainty value of the objective parameter may be based on at least one uncertainty value of one parameter value comprised in the plurality of parameter values. At block 1010, the one or more computing device processors, may generate a first execution plan based on the target scenario. The first execution plan (e.g., digital execution plan and/or LivePlan) may include at least one operation comprised in one or more operations associated with executing the target scenario. The one or more computing device processors may transmit, at block 1012, the first execution plan to the resource site for execution. According to one embodiment, the one or more computing devices include processors associated with the cloud-based platform 310 of FIG. 3. In other embodiments, the one or more computing device processors include processors associated with the terminals 320 and/or the user terminals 314 of FIG. 3.

The systems and methods described in this disclosure provide improvements in autonomous operations at resource sites such as oil and gas fields. The systems and methods described allow an ordered combination of new results in autonomous operations including wireline and testing operations with existing results. The systems and methods described cannot be performed manually in any useful sense. Simplified systems may be used for illustrative purposes but it will be appreciated that the disclosure extends to complex systems with many constraints thereby necessitating new hardware-based processing system described herein. The principles disclosed may be combined with a computing system to provide an integrated and practical application to achieve autonomous operations in oil and gas fields.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

A benefit of the present disclosure is that more effective methods for downhole operations may be employed. It will be appreciated that the application and benefit of the disclosed techniques are not limited to subterranean wells and reservoirs and may also be applied to other types of energy explorations and/or other resource explorations (e.g., aquifers, Lithium/Salar brines, etc.).

While any discussion of or citation to related art in this disclosure may or may not include some prior art references, Applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to use the invention and various embodiments with various modifications as are suited to the particular use contemplated.

What is claimed is:

1. A method for performing a service at a resource site, wherein the service includes capturing sensor data at the resource site using at least one sensor, the method comprising:
receiving an execution plan at the resource site, the execution plan including one or more operations associated with executing the service, each operation comprised in the one or more operations being associated with at least one of a failure variable or a success variable;
executing the execution plan, at least in part, at the resource site, wherein executing the execution plan comprises:
executing a lowering operation to lower a downhole tool comprising the at least one sensor to a first location within a wellbore at the resource site; and
executing a control operation comprised in the one or more operations on one or more equipment to trigger an action by the one or more equipment, the control operation including a data capturing operation of data associated with the resource site, the captured data including the sensor data;
in response to a success variable indicating a successful execution of the data capturing operation, executing at least a first operation including a quality control operation on the captured data, the quality control operation including comparing at least one characteristic associated with the captured data to an expected characteristic to generate quality state data, the quality state data having one of an acceptable status and an undesirable status;
in response to the quality state data indicating an acceptable status, executing at least a second operation; and
in response to a second success variable of the lowering operation indicating a successful execution of the lowering operation, executing at least a third operation comprising at least one of triggering the at least one sensor or parameterizing the at least one sensor according to an equipment model comprised in the execution plan.

2. The method of claim 1, wherein the execution plan includes at least one of:
a resource model representative of the resource site including at least one of a parameter value or an uncertainty value of one or more parameters of the resource model; or
an equipment model, including at least a parameterization of the one or more equipment.

3. The method of claim 2, wherein the equipment model includes a parameterization of the at least one sensor, wherein the one or more operations includes parameterizing the at least one sensor based on the equipment model to capture data associated with the resource site.

4. The method of claim 2, wherein the one or more operations include updating at least one of the resource model or the equipment model in response to the quality state data indicating an undesirable status for the quality control operation.

5. The method of claim 1, wherein the data capturing operation includes acquiring sensor data from at least a first target location of the resource site, wherein executing the execution plan further comprises executing an operation that acquires sensor data from at least a second target location in response to the quality state data indicating an undesirable status, wherein the second target location is different from the first target location.

6. The method of claim 1, wherein the quality control operation includes evaluating an accuracy of the captured data using one of a machine learning system or an artificial intelligence system to confirm the accuracy of the captured data based on historical data associated with the resource site.

7. The method of claim 1, wherein the quality control operation is executed based on a quality control (QC) model of the execution plan including at least the expected characteristic.

8. The method of claim 1, wherein:
the data capturing operation includes acquiring the sensor data using the at least one sensor at least at a first target location of the resource site; and
the quality control operation including evaluating an accuracy of one or more acquisition parameters used during the data capturing operation, wherein the acquisition parameters include one or more sensor parameters.

9. The method of claim 8, wherein executing the execution plan includes at least one of:
updating a parameter of at least one sensor, in response to the quality state data indicating an undesirable status; or
acquiring sensor data from at least a second target location in response to the quality state data indicating an undesirable status, wherein the second target location is different from the first target location.

10. The method of claim 8, wherein executing the execution plan includes at least one of:
transmitting the sensor data to a remote server in response to the quality state data indicating the acceptable status; or
analyzing the sensor data to generate at least one of a parameter value or an uncertainty value for one or more parameters of a resource model.

11. The method of claim 1, wherein:
the data capturing operation includes analyzing the acquired sensor data to generate at least one of a parameter value or an uncertainty value of one or more parameters associated with a resource model of a wellbore; and
the quality control operation includes evaluating an accuracy of the parameter value and the uncertainty value of the one or more parameters.

12. The method of claim 11, further comprising at least one of:
transmitting at least one of the generated parameter value or the uncertainty value of the one or more parameters to a remote server in response to the quality state data indicating an acceptable status for the quality control operation; or
updating the resource model.

13. A method for performing a service at a resource site, wherein the service includes capturing sensor data at the resource site using at least one sensor, the method comprising:
receiving an execution plan at the resource site, the execution plan including one or more operations associated with executing the service, each operation comprised in the one or more operations being associated with at least one of a failure variable or a success variable;
executing the execution plan, at least in part, at the resource site, wherein executing the execution plan comprises:
executing a lowering operation to lower a downhole tool comprising the at least one sensor to a first location within a wellbore at the resource site; and
executing a control operation comprised in the one or more operations on one or more equipment to trigger an action by the one or more equipment, the control operation including a data capturing operation of data associated with the resource site, the captured data including the sensor data;
in response to a success variable indicating a successful execution of the data capturing operation, executing at least a first operation including a quality control operation on the captured data, the quality control operation including comparing at least one characteristic associated with the captured data to an expected characteristic to generate quality state data, the quality state data having one of an acceptable status and an undesirable status;
in response to the quality state data indicating an acceptable status, executing at least a second operation, wherein executing the the at least the second operation includes:
capturing the sensor data using the at least one sensor in at least one target location;
in response to a success variable indicating a successful capturing of the sensor data, executing the quality control operation on the sensor data by comparing at least a characteristic associated with the sensor data to an expected characteristic to generate quality state data, the quality state data indicating one of an acceptable or undesirable status for the sensor data;
in response to the quality state data indicating an acceptable status for the sensor data, analyzing the sensor data to generate at least one of a parameter value or an uncertainty for one or more parameters of a resource model; and
in response to a success variable indicating a successful generation of the at least one of the parameter value or the uncertainty value, executing a quality control operation on the at least one of the parameter value or the uncertainty value by comparing at least a characteristic derived from the generated at least one of the parameter value or the uncertainty value, wherein a quality state data of the quality control operation indicates an acceptable status for at least one of the parameter value or the uncertainty value.

14. The method of claim 13, further comprising:
receiving an updated execution plan including an updated set of operations; and
executing the updated execution plan to control the one or more equipment according to the updated set of operations.

15. The method of claim 14, wherein:
the execution plan is a first execution plan; and
the updated execution plan is transmitted to the resource site during execution of the first execution plan.

16. The method of claim 13, wherein the at least one sensor includes at least one of an electromagnetic sensor, a resistivity sensor, an acoustic sensor, an optical sensor, a pressure sensor, an accelerometer, a magnetometer, a temperature sensor, a chemical sensor, a nuclear sensor, a pH sensor, a viscosity sensor, a density sensor, a fluorescence sensor, a volume sensor, a level sensor, a weight sensor, a torque sensor, a microseismic sensor, a seismic sensor or a flow sensor.

17. The method of claim 13, wherein the one or more equipment includes at least one of a winch, crane, pressure-control equipment, flowhead, flow meter, flare, choke, valve, packer, perforating gun, a downhole tool and components thereof, the at least one sensor, or a processor.

18. A system for performing a service at a resource site, wherein the service includes capturing sensor data at the resource site using at least one sensor, wherein the system includes one or more processors and memory storing instructions that are executable by the one or more processors to:
receive an execution plan, the execution plan including one or more operations associated with executing the service, each operation comprised in the one or more operations being associated with at least one of a failure variable or a success variable;
execute a control operation on one or more equipment based on the one or more operations of the execution plan, wherein the execution plan includes executing a lowering operation to lower a downhole tool including the at least one sensor to a first location within a wellbore at the resource site, wherein executing the execution plan comprises executing a control operation comprised in the one or more operations on one or more equipment to trigger an action by the one or more equipment, wherein the control operation comprises a data capturing operation associated with the resource site, the captured data including the sensor data;

in response to a success variable of the data capturing operation indicating a successful execution of the data capturing operation, execute at least a first operation including a quality control operation by comparing at least one characteristic of the captured data to an expected characteristic to generate quality state data, the quality state data having one of an acceptable status and an undesirable status; and in response to the quality state data indicating an acceptable status for the quality control operation, executing at least a second operation; and in response to a success variable of the lowering operation indicating a successful execution of the lowering operation, executing at least a third operation comprising at least one of triggering the at least one sensor or parameterizing the at least one sensor according to an equipment model comprised in the execution plan.

19. The system according to claim 18, wherein the one or more equipment includes at least one of a winch, crane, pressure-control equipment (PCE), flowhead, flow meter, flare, choke, valve, packer, perforating gun, a downhole tool and components thereof, the at least one sensor, or a processor.

20. The system of claim 19, wherein the execution plan includes at least one of:
a resource model representative of the resource site including at least one of a parameter value or an uncertainty value of one or more parameters of the resource model;
an equipment model, including at least a parameterization of at least one equipment at the resource site; or
a quality control model, including the expected characteristic.

21. The system of claim 18, wherein the execution plan comprises of one of more operations comprising at least one of pumping a fluid into a wellbore, triggering an action on a tool, triggering a perforating gun, or withdrawing fluid from a formation at the resource site.

* * * * *